United States Patent
Yamamura et al.

(10) Patent No.: US 11,707,678 B2
(45) Date of Patent: Jul. 25, 2023

(54) STORAGE MEDIUM, GAME APPARATUS AND GAME CONTROL METHOD

(71) Applicant: NINTENDO CO., LTD., Kyoto (JP)

(72) Inventors: Tomohiro Yamamura, Kyoto (JP); Kodai Matsumoto, Kyoto (JP); Shinya Saito, Kyoto (JP); Hiroyuki Takahashi, Tokyo (JP); Shugo Takahashi, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 77 days.

(21) Appl. No.: 17/534,893

(22) Filed: Nov. 24, 2021

(65) Prior Publication Data

US 2022/0184497 A1 Jun. 16, 2022

(30) Foreign Application Priority Data

Dec. 11, 2020 (JP) ................................ 2020-205507
Feb. 15, 2021 (JP) ................................ 2021-021529

(51) Int. Cl.
*A63F 13/573* (2014.01)
*A63F 13/5375* (2014.01)

(52) U.S. Cl.
CPC ........ *A63F 13/573* (2014.09); *A63F 13/5375* (2014.09); *A63F 2300/305* (2013.01); *A63F 2300/306* (2013.01)

(58) Field of Classification Search
CPC .......... A63F 13/22; A63F 13/23; A63F 13/25; A63F 13/40; A63F 13/44; A63F 13/45;
(Continued)

(56) References Cited

U.S. PATENT DOCUMENTS 7,270,601 B2  9/2007  Takahashi et al.
10,576,382 B2 * 3/2020  Onishi ................... A63F 13/80
(Continued)

FOREIGN PATENT DOCUMENTS

JP      4213011      11/2008
JP      2010-246610  11/2010
JP      2012-065776  4/2012

OTHER PUBLICATIONS

Extended European Search Report dated Apr. 12, 2022 in corresponding European Application No. 21212226.1, 7 pages.

*Primary Examiner* — Omkar A Deodhar
(74) *Attorney, Agent, or Firm* — Nixon & Vanderhye PC

(57) ABSTRACT

A non-limiting example game system includes a processor incorporated in a main body apparatus, and the processor makes a player character hit a ball according to an operation of a player. A movement gauge is displayed in a parameter determination screen, and the movement gauge includes a belt-shaped basic area and a risk area outside the basic area. A first index image is moved inside the basic area, and a hitting power is determined at a position that the movement is stopped by an operation of the player. The hitting power affects a flight distance of a ball. After the hitting power is determined, a position of a deviation indication image displayed along the first index image is determined at random. A deviation amount is made larger as the deviation indication image is moved away from the center of the first index image. The risk area is enlarged toward an upper end of the movement gauge. That is, if the flight distance of the ball is made longer, the deviation amount may become larger. The player plays a golf game in consideration of whether the flight distance of the ball is prioritized or the directionality is prioritized.

17 Claims, 48 Drawing Sheets

(58) Field of Classification Search
CPC .......... A63F 13/50; A63F 13/55; A63F 13/56; A63F 13/57; A63F 13/573; A63F 13/58
See application file for complete search history.

(56) References Cited

U.S. PATENT DOCUMENTS

2004/0180709 A1\* 9/2004 Takahashi ............... A63F 13/45
 463/3
2012/0077557 A1 3/2012 Miki
2012/0309478 A1\* 12/2012 Kotsugai ............... A63F 13/812
 463/31
2017/0216729 A1\* 8/2017 Onishi .................. A63F 13/812
2021/0060428 A1\* 3/2021 Imai ...................... A63F 13/211

\* cited by examiner

FIG. 11A
FIG. 11B
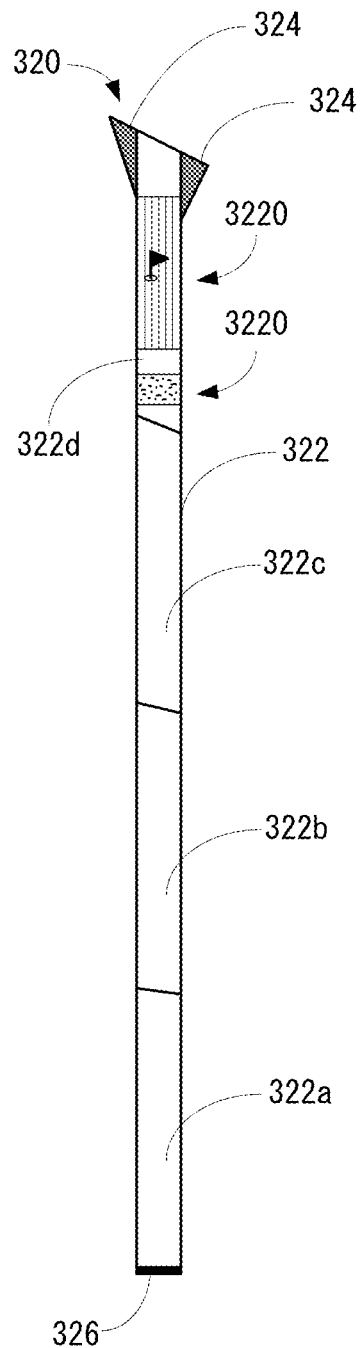
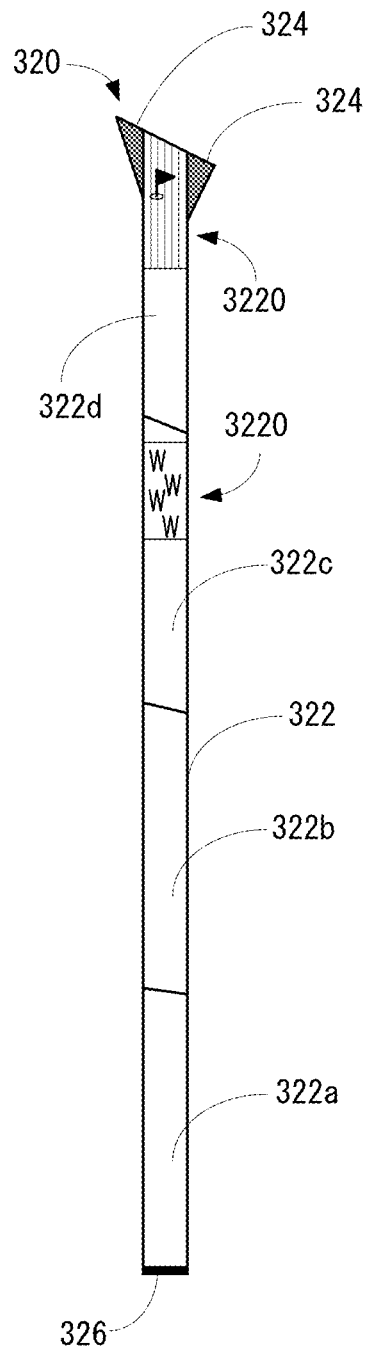

IN BASIC AREA

IN BASIC AREA AND RISK AREA

PARAMETER DETERMINATION SCREEN 300

FIG. 20A

DIRECTION INPUTS FOR EACH FRAME

| NUMBER OF OPERATION FRAMES | 1 | 2 | 3 | ... | p | p+1 | ... | $p_{max}$ |
|---|---|---|---|---|---|---|---|---|
| VERICAL DIRECTION | 0.2 | 0.1 | 0 | ... | 0.1 | 0.1 | ... | 0 |
| HORIZONTAL DIRECTION | 0.8 | 0.9 | 1.0 | ... | 0.9 | -0.9 | ... | -1.0 |

FIRST OPERATION SECTION — SECOND, THIRD AND FOURTH OPERATION SECTIONS

UP, RIGHT: POSITIVE NUMBER
DOWN, LEFT: NEGATIVE NUMBER

FIG. 20B

AVERAGED DIRECTION INPUTS

| NUMBER OF OPERATION FRAMES | 1 | 2 | 3 | ... | p | p+1 | ... | $p_{max}$ |
|---|---|---|---|---|---|---|---|---|
| VERTICAL DIRECTION | 0.1 | 0.1 | 0.1 | ... | 0.1 | 0.1 | ... | 0 |
| HORIZONTAL DIRECTION | 0.9 | 0.9 | 0.9 | ... | 0.9 | -0.9 | ... | -1.0 |

FIRST OPERATION SECTION — SECOND, THIRD AND FOURTH OPERATION SECTIONS

FIG. 21

CORRESPONDENCE TABLE

| NUMBER OF MOVING FRAMES | 1 | 2 | 3 | ... | n | ... | $n_{max}$ |
|---|---|---|---|---|---|---|---|
| HORIZONTAL DISTANCE | $d_1$ | $d_2$ | $d_3$ | ... | $d_n$ | ... | $d_m$ |

FIG. 28

```
            DATA STORAGE AREA 854
        ┌────────────────────────────────────┐ 854a
        │         OPERATION DATA             │
        ├────────────────────────────────────┤ 854b
        │      IMAGE GENERATION PROGRAM      │
        ├────────────────────────────────────┤ 854c
        │         CHARACTER DATA             │
        ├────────────────────────────────────┤ 854d
        │           GAME DATA                │
        ├────────────────────────────────────┤ 854e
        │      LAUNCH DIRECTION DATA         │
        ├────────────────────────────────────┤ 854f
        │      CURVE INFORMATION DATA        │
        ├────────────────────────────────────┤ 854g
        │     DISPLAY TARGET OBJECT DATA     │
        ├────────────────────────────────────┤ 854h
        │       HEIGHT INFORMATION DATA      │
        ├────────────────────────────────────┤ 854i
        │       HITTING POWER VALUE DATA     │
        ├────────────────────────────────────┤ 854j
        │     REFERENCE TRAJECTORY DATA      │
        ├────────────────────────────────────┤ 854k
        │           DEVIATION DATA           │
        ├────────────────────────────────────┤ 854m
        │        DIRECTION INPUT DATA        │
        ├────────────────────────────────────┤ 854n
        │           STRENGTH DATA            │
        ├────────────────────────────────────┤ 854p
        │      CORRESPONDENCE TABLE DATA     │
        ├────────────────────────────────────┤ 854q
        │      CORRESPONDENCE RANGE DATA     │
        ├────────────────────────────────────┤ 854r
        │          BALL POSITION DATA        │
        ├────────────────────────────────────┤ 854s
        │        HIGHLIGHTING TARGET DATA    │
        ├────────────────────────────────────┤ 854t
        │              3D FLAG               │
        ├────────────────────────────────────┤ 854u
        │   FIRST PARAMETER DETERMINATION FLAG │
        ├────────────────────────────────────┤ 854v
        │  SECOND PARAMETER DETERMINATION FLAG │
        ├────────────────────────────────────┤ 854w
        │          BALL MOVEMENT FLAG        │
        ├────────────────────────────────────┤
        │                 ⋮                  │
        └────────────────────────────────────┘
```

UNDULATION DISPLAY SCREEN 450

STORAGE MEDIUM, GAME APPARATUS AND GAME CONTROL METHOD

CROSS REFERENCE OF RELATED APPLICATION

This application claims priorities to Japanese Patent Application No. 2020-205507 filed on Dec. 11, 2020 and Japanese Patent Application No. 2021-021529 filed on Feb. 15, 2021, and the entire contents of which are incorporated herein by reference.

FIELD

This application describes a storage medium, a game apparatus and a game control method, and more specifically, describes a storage medium, a game apparatus and a game control method, in which movement of a moving object is instructed.

SUMMARY

It is a principal object of an embodiment(s) to provide a novel storage medium, game apparatus and game control method.

Moreover, it is another object of the embodiment(s) to provide a storage medium, game apparatus and game control method, capable of preventing interest of game from being reduced as much as possible.

A first embodiment is a non-transitory computer-readable storage medium storing a game program executable by a computer provided with one or more processors, wherein the game program causes the one or more processors to execute: determining a movement start direction of a ball object based on progress of a golf game or a user operation; advancing a power index from one end to another end of a gauge inside or along the gauge, the gauge being displayed on a display portion so as to be extended from the one end to the another end with a width; stopping an advance of the power index according to a user operation; determining, at random, a position of a deviation index that is displayed on the display portion corresponding to a width direction of the gauge at a stop position of the power index having been stopped; and executing movement processing that moves the ball object so that a movement distance of the ball object becomes longer as the stop position of the power index is nearer a side of the another end of the gauge, wherein the gauge includes a risk area that length in the width direction or a rate in the width direction is increased as being closer to the another end, and the game program further causes the one or more processors to execute: changing, when the position of the deviation index being determined is within the risk area, the movement start direction of the ball object or a movement direction after the movement start in comparison with a case of being outside the risk area.

According to the first embodiment, since a possibility of changing the movement start direction or the movement direction after the movement start becomes high as the movement distance of the ball object becomes longer, there occurs a strategic characteristic whether the movement distance is prioritized or the directionality is prioritized. According to the first embodiment, decline of interest can be prevented as much as possible compared with a conventional golf game in which there is tendency that if a suitable operation timing has been memorized once in a hitting operation using a power gauge, interest of golf game declines.

A second embodiment is the storage medium according to the first embodiment, wherein the game program causes the one or more processors to execute: displaying the gauge so that a line of the another end is slanted with respect to a line of the one end; displaying the power index so as to be slanted in the same direction as the line of the another end toward the another end; and changing the movement distance of the ball object according to a determined position of the deviation index within the width of the gauge.

According to the second embodiment, it is possible to change the movement distance of the ball object according to determination of the position of the deviation index.

A third embodiment is the storage medium according to the first embodiment, wherein the game program causes the one or more processors to execute: displaying the gauge so that a size of the risk area with respect to an entire size of the gauge differs dependent on a state of a point that the ball object exists.

According to the third embodiment, it is possible to express difficulty of hitting the ball object by changing the size of the risk area with respect to the entire size of the gauge dependent on a lie of the ball object.

A fourth embodiment is the storage medium according to the first embodiment, wherein the game program causes the one or more processors to execute: displaying the gauge so that the risk area is formed outside a basic area having a predetermined width of the gauge.

According to the fourth embodiment, since the risk area is provided outside the basic area, it is possible to make the user intuitively recognize that the longer the movement distance, the larger the deviation.

A fifth embodiment is the storage medium according to the fourth embodiment, wherein the game program causes the one or more processors to execute: displaying the gauge so that a color of the basic area is changed according to the advance of the power index while not changing a color of the risk area.

According to the fifth embodiment, it is possible to improve distinctiveness or visibility between the basic area and the risk area.

A sixth embodiment is the storage medium according to the fourth embodiment, wherein the game program causes the one or more processors to execute: displaying, at a position corresponding to a distance from the ball object in the basic area of the gauge, a target image corresponding to at least one of display targets including a green object, a pin object, a bunker object, a hazard object and a rough object existing in a movable range of the ball object.

According to the sixth embodiment, since a target image corresponding to a predetermined display target is displayed at a position corresponding to the distance from the ball object within the gauge, it is possible to use the target image as a guide when determining the hitting power. That is, it is possible to provide an interface that is easy to use.

A seventh embodiment is the storage medium according to the first embodiment, wherein the game program causes the one or more processors to execute: displaying on the display portion a manner that the position of the deviation index is determined at random from a time that the advance of the power index is stopped to a time that the movement processing is started.

According to the seventh embodiment, since a manner determining the position of the deviation index at random is displayed, it is possible for the user to have interest of the game even in the time of period between a time of stopping the advance of the power index and a time of starting movement of the ball object.

An eighth embodiment is the storage medium according to the first embodiment, wherein the game program causes the one or more processors to execute: displaying the gauge so as to be curved according to a determined movement start direction and a slant with respect to the movement start direction at a point that the ball object exists. That is, the gauge is curved in a direction that it is predicted that the ball object curves.

According to the eighth embodiment, since the gauge is curved in a direction that it is predicted that the ball object curves, it is possible to intuitively know a trajectory when the ball object is moved.

A ninth embodiment is the storage medium according to the first embodiment, wherein the game program causes the one or more processors to execute: displaying a trajectory prediction image that predictably indicates a predicted trajectory when moving the ball object in a determining movement start direction on the display portion, the trajectory prediction image being a belt-like image that is extended linearly in the movement start direction or extended along the prediction trajectory, wherein a curve condition of the prediction trajectory of the ball object is expressed by a shape or slant of the belt-like image or a constituent of the belt-like image.

According to the ninth embodiment, since the curve condition of the ball object is expressed by the belt-like trajectory prediction image, it is possible to intuitively know the trajectory when the ball object is moved.

A tenth embodiment is the storage medium according to the ninth embodiment, wherein the game program causes the one or more processors to execute: displaying the belt-like image with a plurality of quadrilaterals as the constituent; and changing shapes of the plurality of quadrilaterals to indicate the curve condition.

According to the tenth embodiment, it is possible to intuitively know the trajectory when the ball object is moved based on the shapes of the constituents of the trajectory prediction image.

An eleventh embodiment is the storage medium according to the tenth embodiment, wherein the game program causes the one or more processors to execute: displaying the plurality of quadrilaterals so as to be moved in the determined movement start direction, respectively.

According to the eleventh embodiment, it is also possible to intuitively know the trajectory like the tenth embodiment.

A twelfth embodiment is the storage medium according to the first embodiment, wherein the game program causes the one or more processors to execute: displaying the gauge by a three-dimensional representation with depth.

A thirteenth embodiment is the storage medium according to the twelfth embodiment, wherein the game program causes the one or more processors to execute: displaying, on the display portion along the gauge, height information of an obstacle object that becomes an obstacle for movement in a front direction when moving the ball object in a case of determining the movement start direction.

According to the thirteenth embodiment, since the height information is displayed along the gauge, it is possible to change the movement start direction based on the height information by a strategy.

A fourteenth embodiment is the storage medium according to the twelfth embodiment, wherein the game program causes the one or more processors to execute: displaying the gauge with two-dimensional representation; and switching according to a user operation between the two-dimensional representation and the three-dimensional representation with depth.

According to the fourteenth embodiment, it is possible to change the gauge in the two-dimensional representation or the three-dimensional representation according to user preference.

A fifteenth embodiment is a non-transitory computer-readable storage medium storing a game program executable by a computer provided with one or more processors, wherein the game program causes the one or more processors to execute: determining a movement start direction of a ball object based on progress of a golf game or a user operation; advancing a power index being displayed at an initial position that is an arbitrary position in a predetermined direction up to a predetermined movable length; stopping an advance of the power index according to a user operation; determining, at random, a position of a deviation index that is displayed on the display portion corresponding to a width direction of a gauge determined based on a stop position that is a position of the power index having been stopped and the initial position, at the stop position; and executing movement processing that moves the ball object so that a movement distance of the ball object becomes longer as the stop position of the power index is closer to the movable length, wherein the gauge includes a risk area that length in the width direction or a rate in the width direction is increased as being closer to the movable length, and the game program causes the one or more processors to further execute: changing, when a determined position of the deviation index is within the risk area, the movement start direction of the ball object or a movement direction after the movement start compared with a case of being outside the risk area.

A sixteenth embodiment is a game apparatus executing a virtual golf game, wherein one or more processors of the game apparatus execute: determining a movement start direction of a ball object based on progress of a golf game or a user operation; advancing a power index from one end to another end of a gauge inside or along the gauge, the gauge being displayed on a display portion so as to be extended from the one end to the another end with a width; stopping an advance of the power index according to a user operation; determining, at random, a position of a deviation index that is displayed on the display portion corresponding to a width direction of the gauge at a stop position of the power index having been stopped; and executing movement processing that moves the ball object so that a movement distance of the ball object becomes longer as the stop position of the power index is nearer a side of the another end of the gauge, wherein the gauge includes a risk area that length in the width direction or a rate in the width direction is increased as being closer to the another end, and the one or more processors execute changing, when the position of the deviation index being determined is within the risk area, the movement start direction of the ball object or a movement direction after the movement start in comparison with a case of being outside the risk area.

A seventeenth embodiment is a game apparatus executing a virtual golf game, wherein one or more processors of the game apparatus execute: determining a movement start direction of a ball object based on progress of a golf game or a user operation; advancing a power index being displayed at an initial position that is an arbitrary position in a predetermined direction up to a predetermined movable length; stopping an advance of the power index according to a user operation; determining, at random, a position of a deviation index that is displayed on the display portion corresponding to a width direction of a gauge determined based on a stop position that is a position of the power index having been stopped and the initial position, at the stop position; and executing movement processing that moves the ball object so that a movement distance of the ball object becomes longer as the stop position of the power index is closer to the movable length, wherein the gauge includes a risk area that length in the width direction or a rate in the width direction is increased as being closer to the movable length, and the one or more processors execute changing, when a determined position of the deviation index is within the risk area, the movement start direction of the ball object or a movement direction after the movement start compared with a case of being outside the risk area.

An eighteenth embodiment is a game control method of a game apparatus executing a virtual golf game, executing: (a) determining a movement start direction of a ball object based on progress of a golf game or a user operation; (b) advancing a power index from one end to another end of a gauge inside or along the gauge, the gauge being displayed on a display portion so as to be extended from the one end to the another end with a width; (c) stopping an advance of the power index according to a user operation; (d) determining, at random, a position of a deviation index that is displayed on the display portion corresponding to a width direction of the gauge at a stop position of the power index having been stopped in the step (c); and (e) executing movement processing that moves the ball object so that a movement distance of the ball object becomes longer as the stop position of the power index is nearer a side of the another end of the gauge, wherein the gauge includes a risk area that length in the width direction or a rate in the width direction is increased as being closer to the another end, and the step (e) changes, when a determined position of the deviation index is within the risk area, the movement start direction of the ball object or a movement direction after the movement start in comparison with a case of being outside the risk area.

A nineteenth embodiment is a game controlling method of a game apparatus executing a virtual golf game, executing: (a) determining a movement start direction of a ball object based on progress of a golf game or a user operation; (b) advancing a power index being displayed at an initial position that is an arbitrary position in a predetermined direction up to a predetermined movable length; (c) stopping an advance of the power index according to a user operation; (d) determining, at random, a position of a deviation index that is displayed on the display portion corresponding to a width direction of a gauge determined based on a stop position that is a position of the power index having been stopped in the step (c) and the initial position, at the stop position; and (e) executing movement processing that moves the ball object so that a movement distance of the ball object becomes longer as the stop position of the power index is closer to the movable length, wherein the gauge includes a risk area that length in the width direction or a rate in the width direction is increased as being closer to the movable length, and the step (e) changes, when a determined position of the deviation index is within the risk area, the movement start direction of the ball object or a movement direction after the movement start compared with a case of being outside the risk area.

According to any one of the fifteenth embodiment to the nineteenth embodiment, decline of interest of golf game can be prevented as much as possible like the first embodiment.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 11A is a view showing a non-limiting example movement gauge, and FIG. 11B is a view showing another non-limiting example movement gauge.

FIG. 20A is a table showing a non-limiting example of a direction input for each frame, and FIG. 20B is a table showing a non-limiting example a direction input averaged for each operation section.

FIG. 21 is a view showing a non-limiting example correspondence table of a moving time on a reference trajectory and a horizontal distance.

FIG. 28 is a view showing a non-limiting example data storage area shown in FIG. 27.

DETAILED DESCRIPTION OF NON-LIMITING EXAMPLE EMBODIMENTS

First Embodiment

A non-limiting example game system according to the first embodiment will be described in the following. The non-limiting example game system 1 according to this first embodiment comprises a main body apparatus (an information processing apparatus that functions as a game apparatus main body in this first embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this first embodiment will be described, and then, the control of the game system 1 of this first embodiment will be described.

Figure 1:
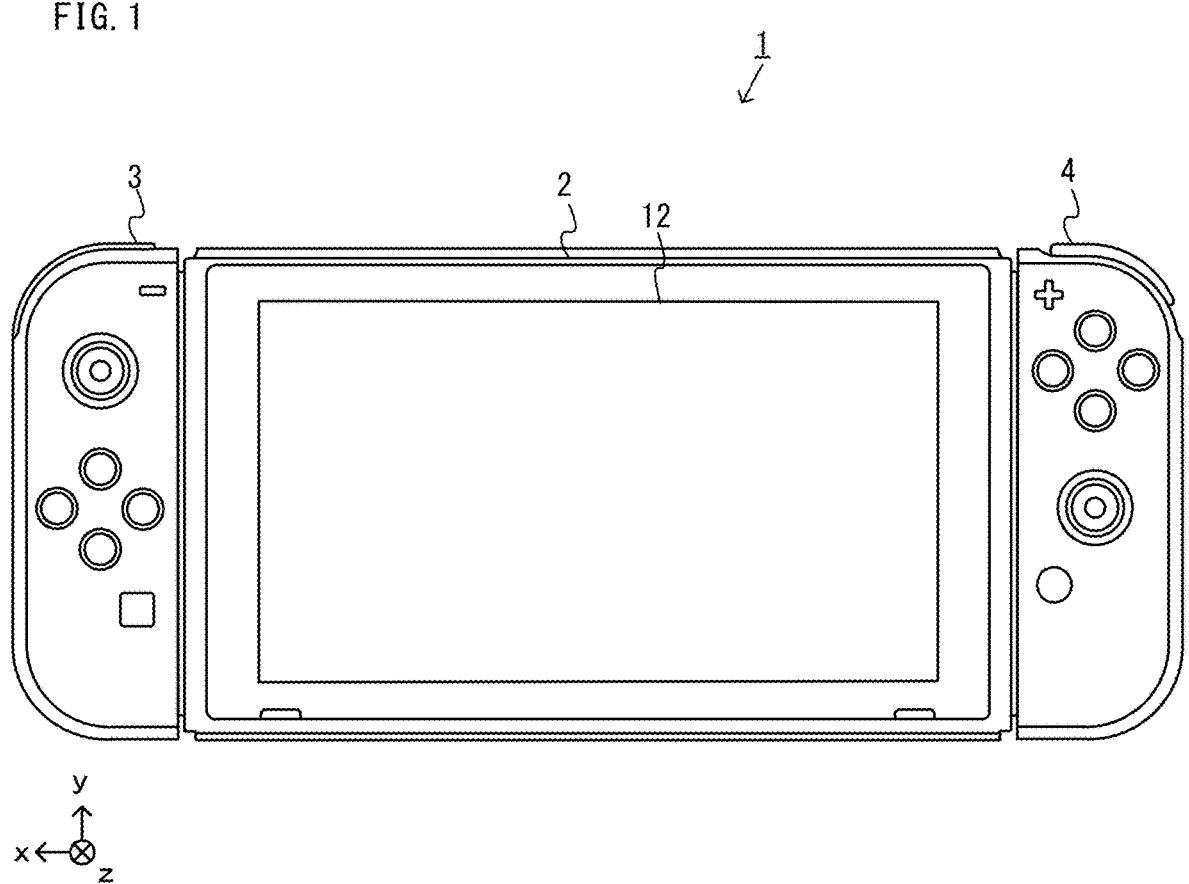
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
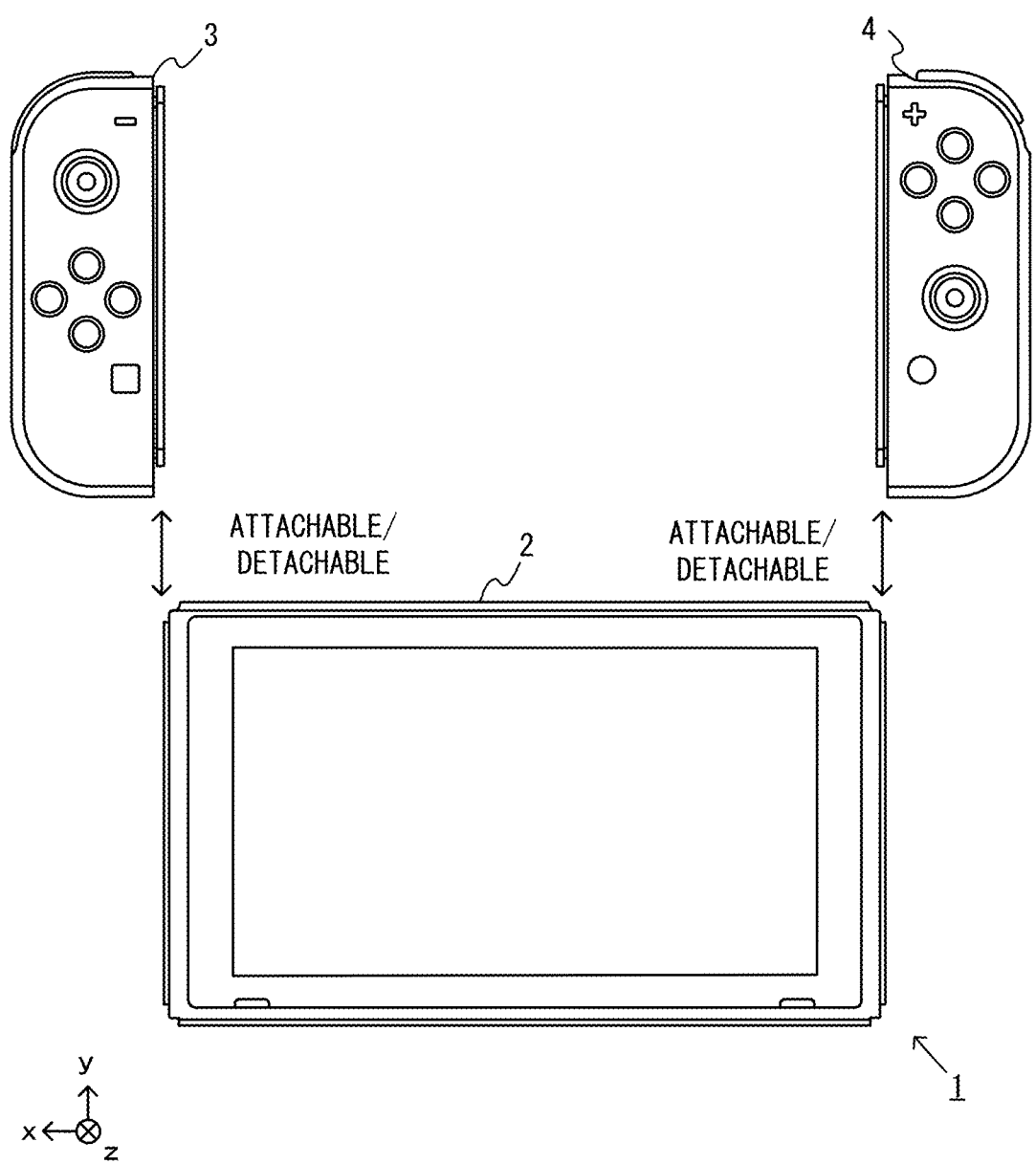
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
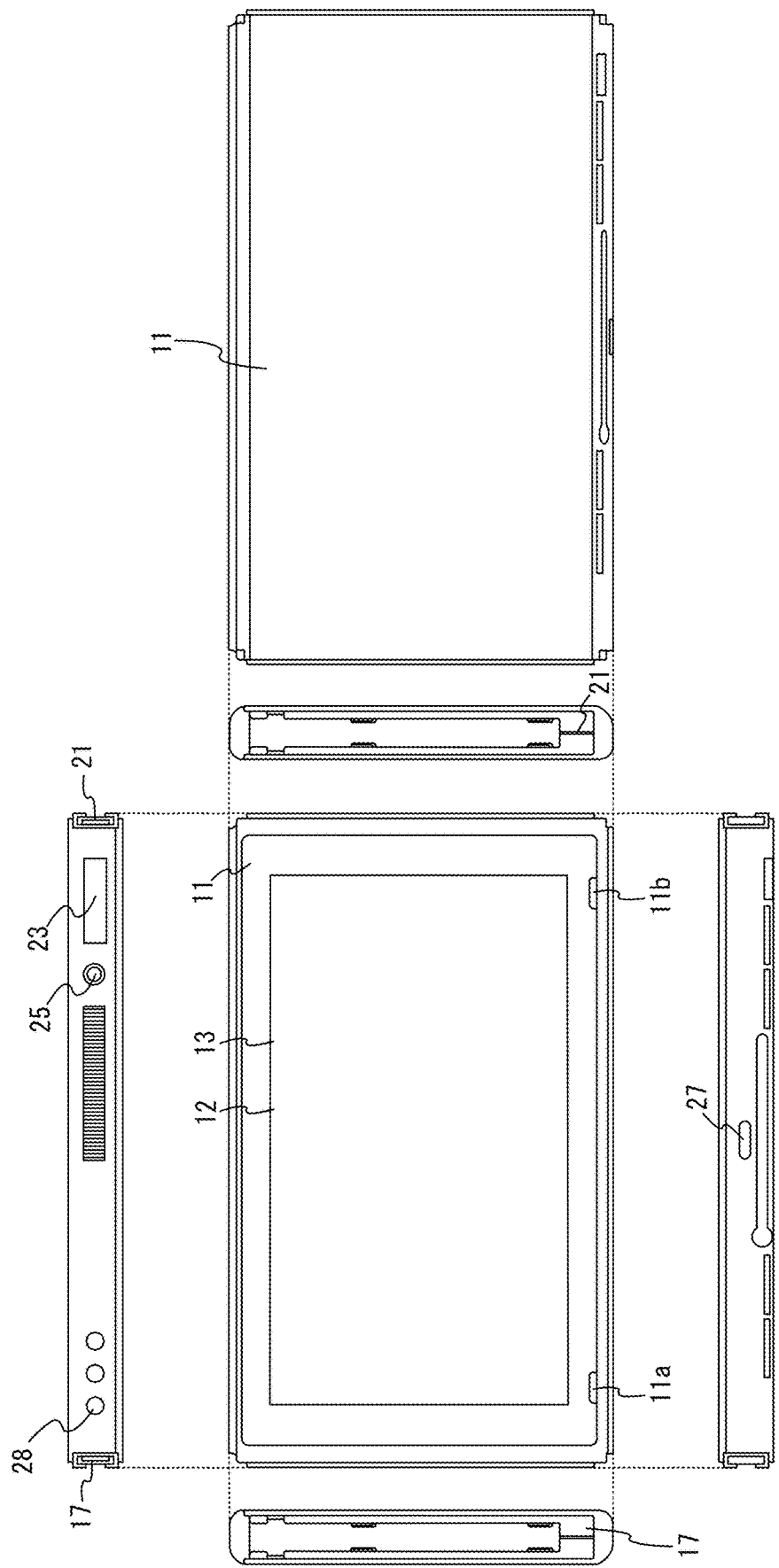
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this first embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this first embodiment, the display 12 is a liquid crystal display device (LCD). However, the display 12 may be an arbitrary type display.

Moreover, the main body apparatus 2 comprises a touch panel 13 on a screen of the display 12. In this first embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this first embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this first embodiment, the cradle has the function of charging the unified apparatus or the main body apparatus 2 alone that is put on the cradle. Moreover, the cradle has a function of a hub device (specifically, a USB hub).

Figure 4:
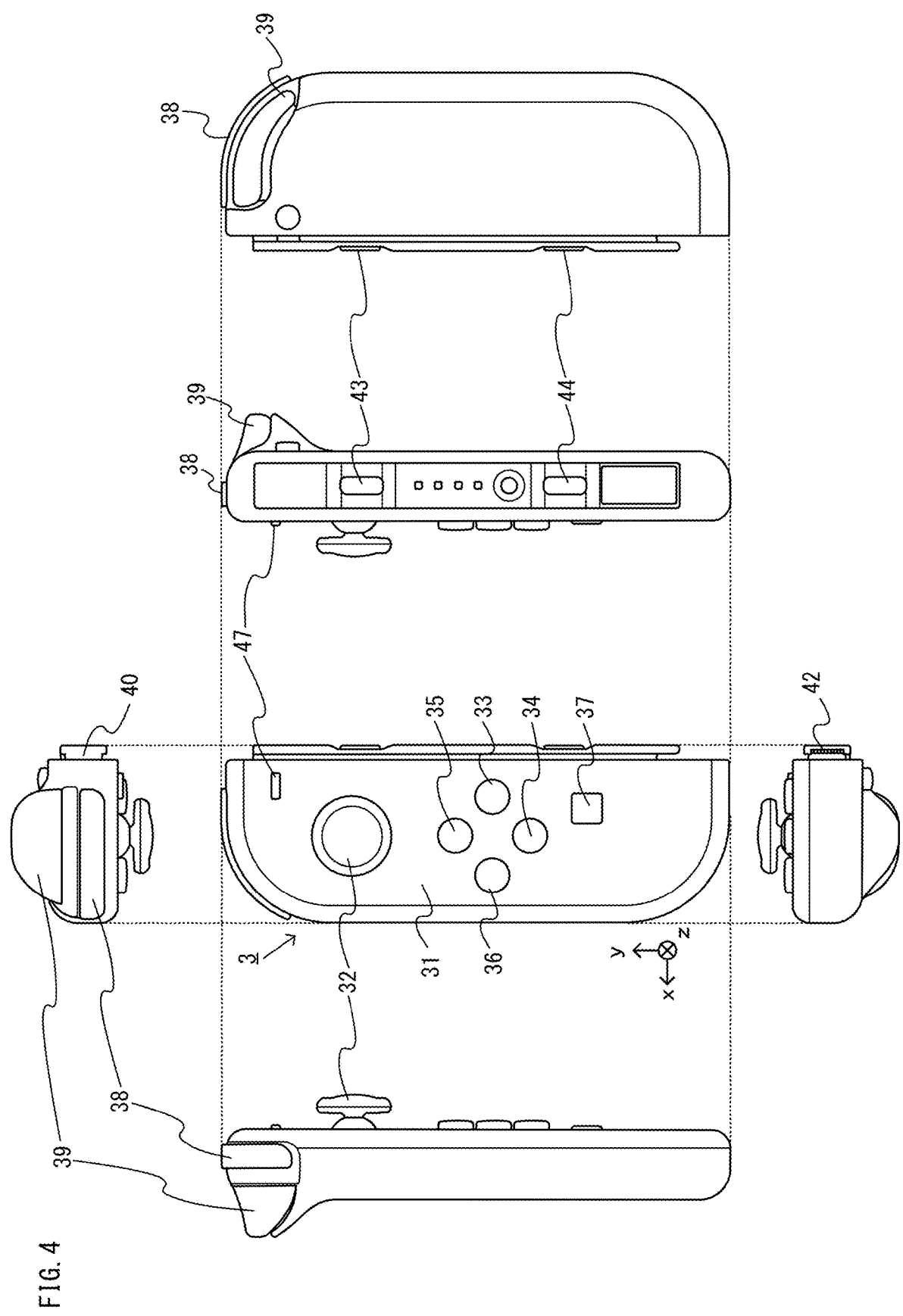
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this first embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this first embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
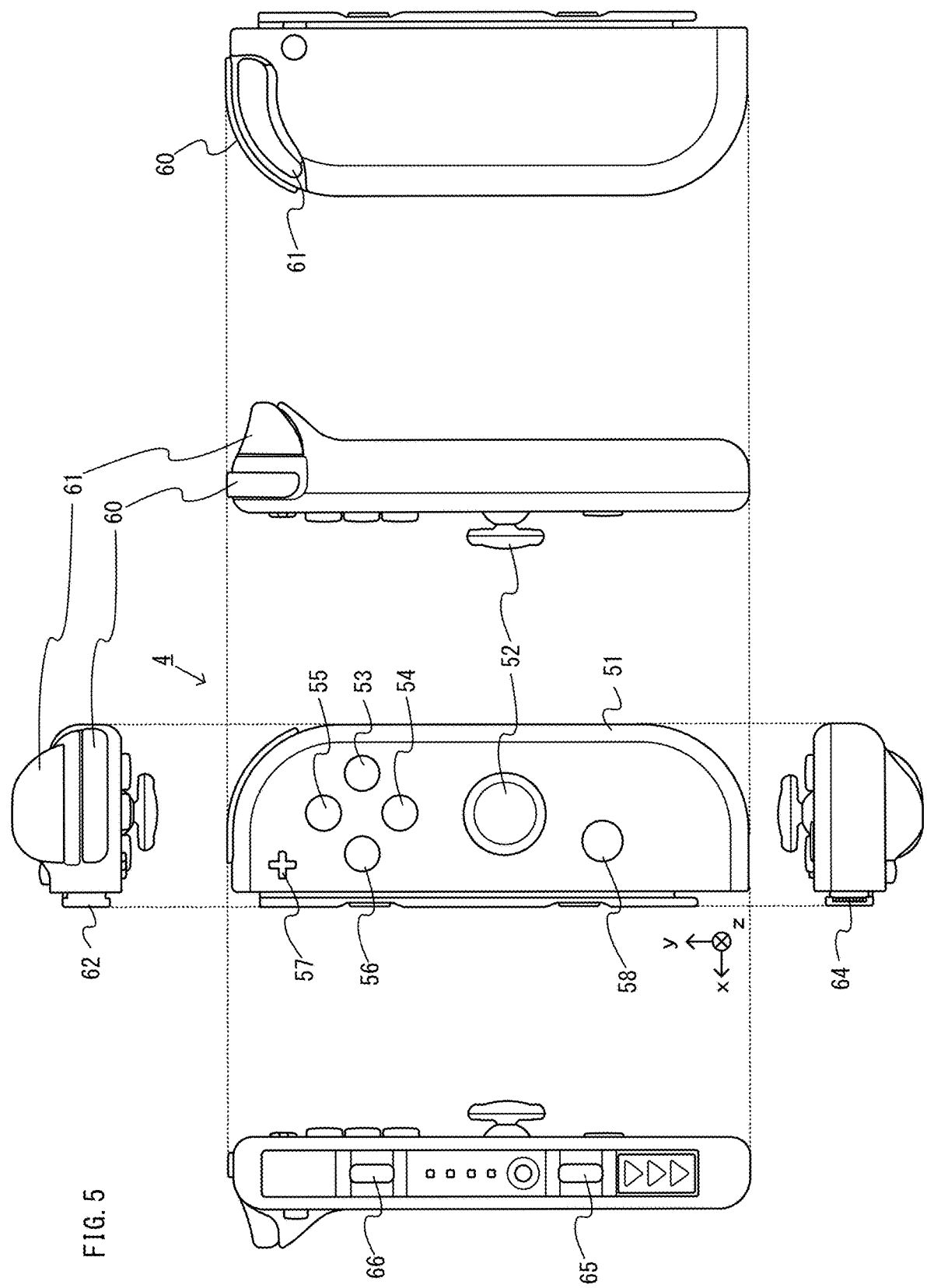
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this first embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this first embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
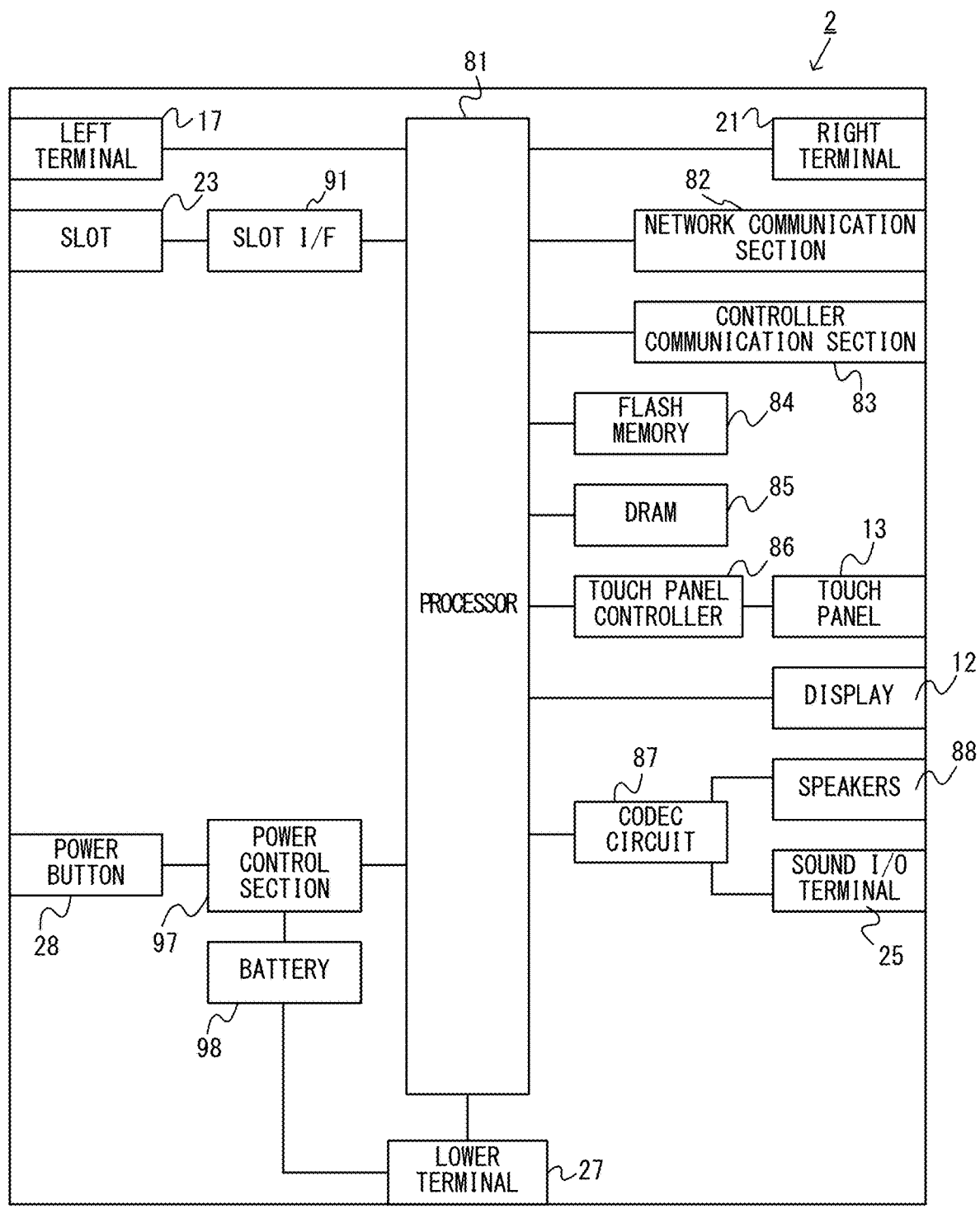
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program)

stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this first embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this first embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this first embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
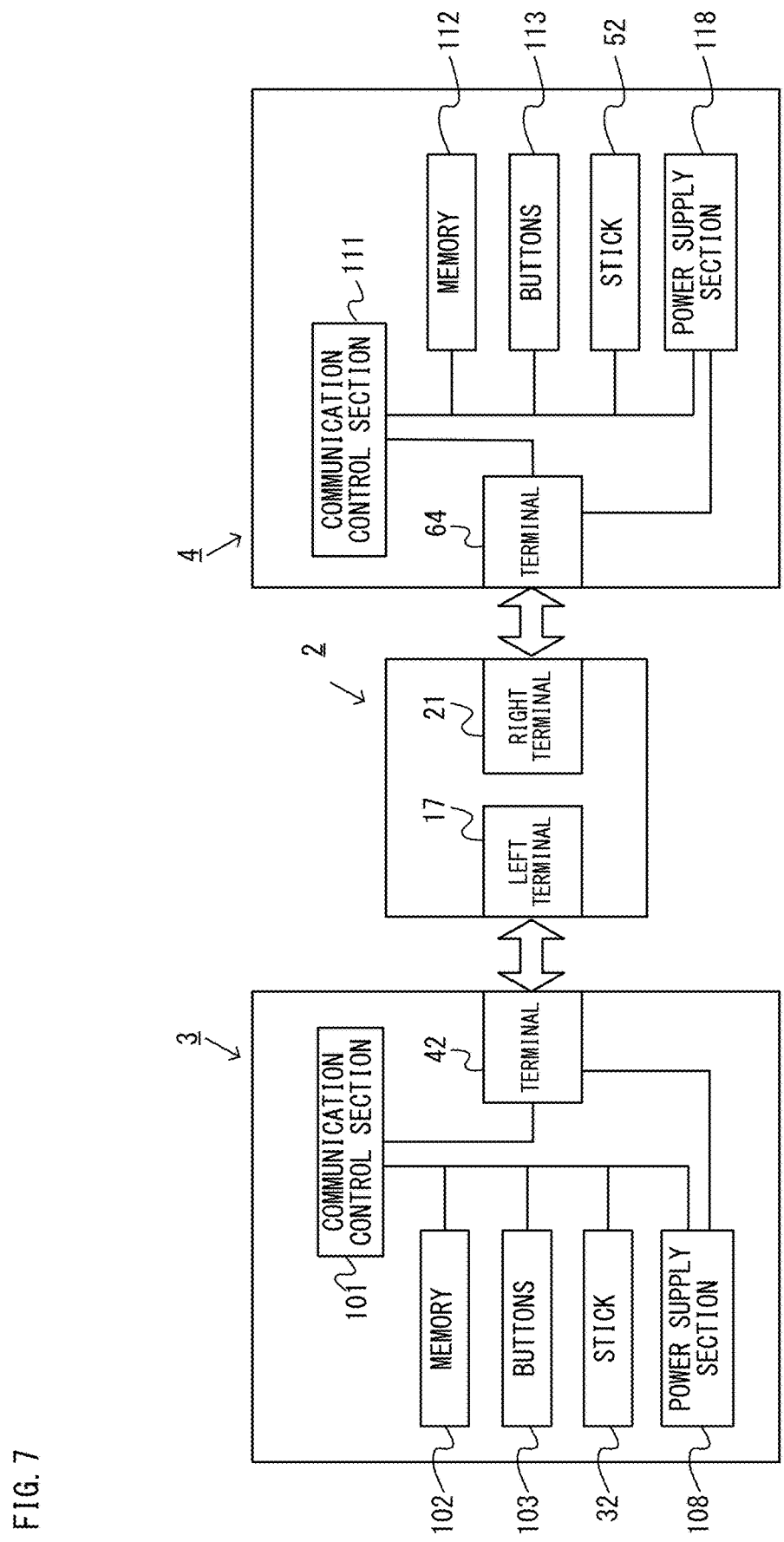
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this first embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined period of time. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this first embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Next, with reference to FIG. 8-FIG. 26, an outline of game processing of a virtual golf game executed in the game system 1 according this first embodiment will be described. Although detailed description is omitted, in the virtual golf game, a user or player (hereinafter, referred to as "player") can perform stroke play alone or with another player (human player or computer player). However, it is possible to also play another golf game such as match play. In the following, a case where the player plays the golf game using a player character will be described, and since another player is the same as the player, duplicate description will be omitted.

In this first embodiment, when starting a golf game application to be played, a type of the golf game to be played (stroke play or match play, for example) and a golf course to be played are selected, and a character to be used is also selected out of a plurality of characters. If such selections are ended, the golf game is started in response to an operation of the player or automatically.

Although detailed description is omitted, in this first embodiment, the plurality of characters are different from each other in appearance, and a maximum flight distance for each club is individually assigned to each of the plurality of characters.

The main body apparatus 2 functions also as an image processing apparatus, and generates and outputs (or displays) display image data corresponding to various kinds of screens such as a game image. The processor 81 arranges various kinds of objects and characters in a three-dimensional virtual space, and generates a certain sight or scene. An image taking (that is, viewing from a viewing point) this sight or scene by a virtual camera is displayed on the display 12 as the game image.

In addition, in this specification, a hole on a green that the golf ball is to be put in is referred to as a "cup", and a district or area to be played from a teeing area to the green in the golf course (that is, a range where the character is movable) is referred to as a "hole". Moreover, in this specification, a "cup-in" means that the golf ball goes into the cup.

When the golf game is started, and a game image including an image (background image) of a teeing area of a start hole of the selected golf course and a part of the hole viewable from the teeing area is displayed on the display 12. For example, the start hole in the golf course is generated in a game space or game field, and a position and orientation of the virtual camera are set so as to face a direction that the player character hits the ball from a predetermined position behind the teeing area. As a non-limiting example game image, a parameter determination screen 300 as shown in FIG. 8 is displayed on a display device (for example, display 12).

Figure 8:
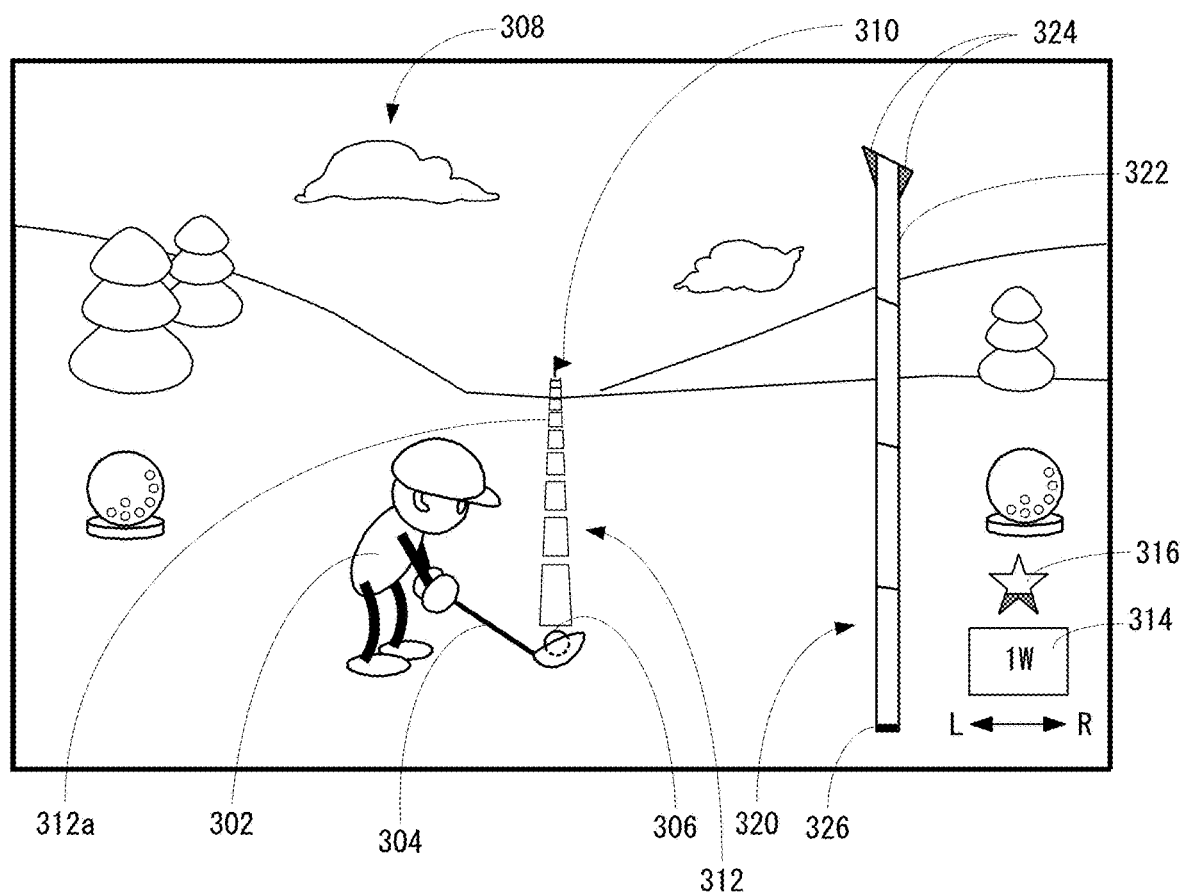
FIG. 8 is a view showing a non-limiting first example parameter determination screen.

As shown in FIG. 8, a player character 302 is displayed in the parameter determination screen 300, and the player character 302 holds a virtual golf club (hereinafter, simply referred to as "club") 304. As can be seen also in FIG. 8, the player character 302 is displayed in an address state, and a virtual golf ball (hereinafter, simply referred to as "ball") 306 that is teed-up is placed at a predetermined position. As described above, the background image 308 is displayed in the parameter determination screen 300. In an example shown in FIG. 8, as the background image 308, virtual objects such as the teeing area, left and right tee markers, fairways, trees, sky and clouds are displayed.

Moreover, in FIG. 8, a virtual pin 310 is displayed at approximately center of the parameter determination screen 300. Furthermore, a trajectory prediction image 312 is displayed toward the virtual pin 310 from a position of the ball 306. This trajectory prediction image 312 is an image that shows predictably a trajectory of the ball 306 in a case where the ball 306 is hit in a predetermined launch direction, and is a belt-like image that a part of a reference trajectory is visualized in this first embodiment. In this first embodiment, a portion of the reference trajectory from a current position of the ball 306 to a highest point that the ball 306 reaches is displayed as the trajectory prediction image 312. However, the reference trajectory for displaying the trajectory prediction image 312 is an ideal parabola when hitting the ball 306 in the predetermined launch direction, and in this first embodiment, is a parabola when hitting the ball 306 by 100 percent (%) of a hitting power using a club 304 to be used (see FIG. 22). The ideal parabola means a parabola in a case of being not affected by anything other than the gravity in a virtual space.

Moreover, as shown in FIG. 8, the trajectory prediction image 312 includes images 312a of a plurality of quadrilaterals each of which is a constituent. The plurality of quadrilateral images 312a are displayed with an animation so as to be moved in the launch direction of the ball 306. For example, each of the plurality of quadrilateral images 312a is moved toward a highest point position from the current position of the ball 306, and if the plurality of quadrilateral images 312a are moved up to the highest point position, the movement is stared from the current position of the ball 306, and will be continued until the player initiates a second parameter determination operation described later.

Although the trajectory prediction image 312 is an image using the reference trajectory in this first embodiment, it does not need to be limited to this. In another embodiment, the trajectory prediction image 312 may be a belt-like image of predetermined length extending in a direction that the ball 306 is linearly moved forward (hereinafter, referred to as "front direction"). In this case, at least one of a size and a position of the trajectory prediction image 312 may be set or corrected based on at least one of information on the club 304 to be used and information on the player character 302. However, the front direction of the ball 306 is a direction that the ball 306 is to be moved, among directions beside the player character 302 in an address state. Specifically, in a case of a right-handed player character 302, the front direction of the ball 306 is a left direction, and in a case of a left-handed player character 302, the front direction of the ball 306 is a right direction.

However, the trajectory prediction image 312 is erased (or undisplayed) from the parameter determination screen 300 when starting the second parameter determination operation. This is an example, and the trajectory prediction image 312 may be erased at an arbitrary timing until the player character 302 hits the ball 306.

The quadrilateral image 312a indicates a predictable movement direction of the ball 306. When it is predicted that the ball 306 is moved along the reference trajectory, the image 312a is made into a longitudinally elongated rectangle. Moreover, when it is predicted that the ball 306 curves, the quadrilateral image 312a indicates a direction to curve and a magnitude of curve (hereafter, these are referred to as "curve information"). The curve information is determined based on a slope of the terrain in the current position of the ball 306 and a launch direction of the ball 306. A direction that the ball 306 curves is similar to that of a general reality golf game, for example, in a case of a right-handed player character 302, the ball 306 curves to the left in a case of a sloped-upward lie, and the ball 306 curves to right in a case of a sloped-downward lie, and the magnitude of the curve is made to be larger in conjunction with a magnitude of the slope.

However, the launch direction of the ball 306 includes directions of right and left (horizontal direction) and up and down (vertical direction) at the time of the movement start of the ball 306. The launch direction of the horizontal (left and right) direction of the ball 306 is determined in advance by a straight line that connects the current position of the ball 106 and the pin 310 (cup). However, in a case where the current position of the ball 106 is far from the pin 310, the launch direction of the horizontal direction of the ball 306 is set to a fairway etc. near the current position of the ball 106. The case where the current position of the ball 106 is far from the pin 310 includes not only a case where a straight-line distance from the ball 106 to the pin 310 is long but also a case where a measured distance from the ball 306 to the pin 310 is long along a shape of the hole that is bent in the middle like a dogleg hole. Moreover, the lunch direction of the ball 306 in the horizontal direction is settable (changeable) by the player. The launch direction of the ball 306 in the vertical (up and down) direction is determined according to the club 304 to be used (specifically, launch angle).

Figure 9:
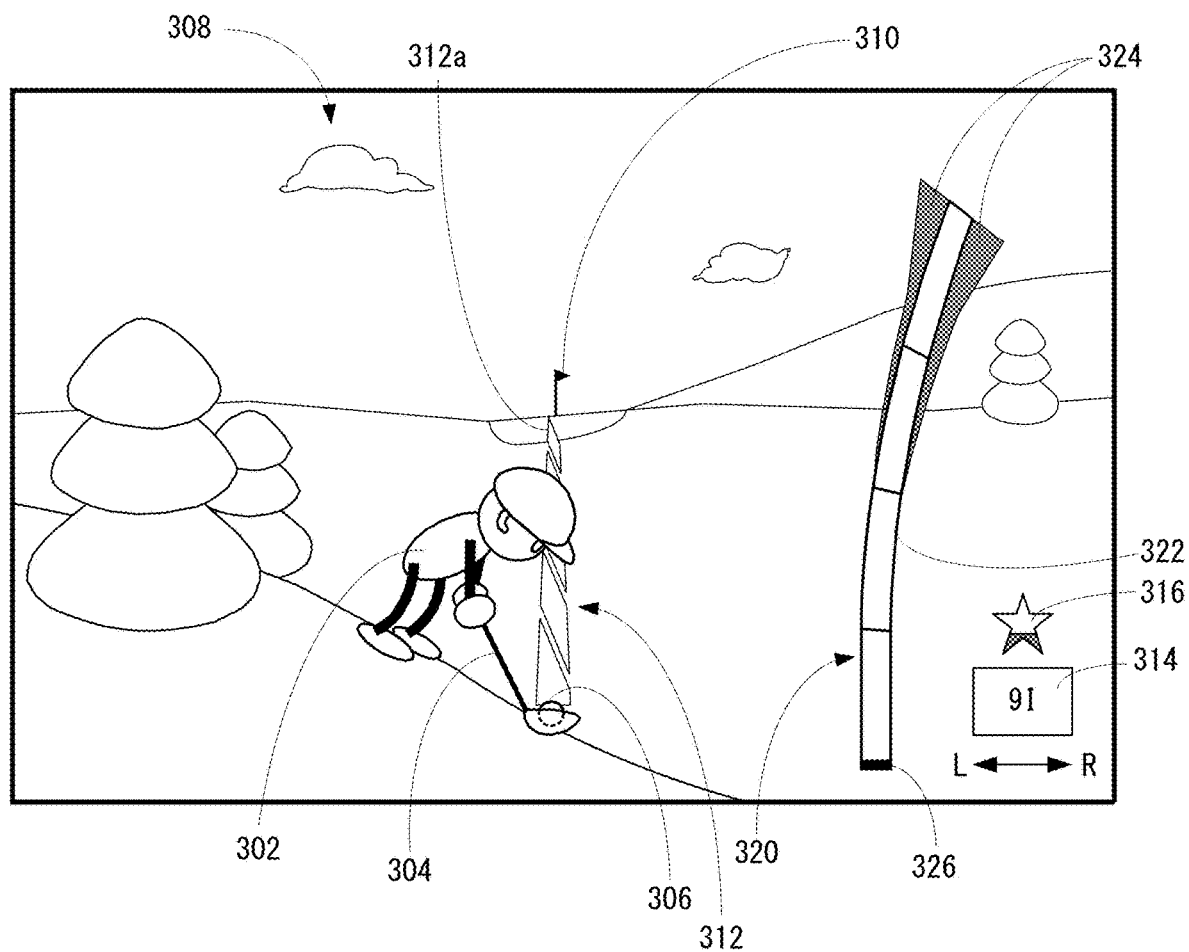
FIG. 9 is a view showing a non-limiting second example parameter determination screen.

FIG. 9 shows a non-limiting example parameter determination screen 300 when it is predicted the ball 306 curves to the right. In an example shown in FIG. 9, the ball 306 exists on the sloped-downward lie. Therefore, it is predicted that the ball 306 curves to the right, and a magnitude of the curve is determined by a magnitude of an angle of the slope with respect to a level plane.

Moreover, when it is predicted that the ball 306 curves to the right, the image 312a is made into a parallelogram with an upper left corner protruding compared with an upper right corner. That is, it is represented that the ball 306 curves to the right by displaying in the parameter determination screen 300 the quadrilateral image 312a that a right side is lowered. Moreover, a protruding amount of the upper left corner with respect to the upper right corner is changed according to a magnitude that the ball 306 curves.

Although illustration is omitted, if the player character 302 is the right-handed, in a case where the ball 306 exists on the sloped-upward lie, it is predicted that the ball 306 curves to the left, and therefore, the image 312a is made into a parallelogram with an upper right corner protruding compared with an upper left corner. That is, it is represented that the ball 306 curves to the left by displaying in the parameter determination screen 300 the quadrilateral image 312a that a left side is lowered. Moreover, a protrusion amount of the upper right corner with respect to the upper left corner is changed according to a magnitude that the ball 306 curves.

As described above, in this first embodiment, the plurality of images 312a are displayed as an animation so as to move to the launch direction of the ball 306. Therefore, data for performing the animation display of the plurality of images 312a having shapes according to the direction of the curve and the magnitude of the curve are prepared in advance, and used as appropriate. However, the data for performing the animation display may not be prepared in advance, and may be generated each time the display is to be performed.

In addition, in this first embodiment, the plurality of images 312a are displayed as an animation so as to move toward the movement direction of the ball 306, but since the plurality of images 312a are displayed in a shape or form representing the direction of the curve and the magnitude of the curve, may remain stationary. That is, the plurality of images 312a do not need to move.

Moreover, although the direction and the magnitude of the curve of the ball 306 are represented by the shape of the images 312a that constitutes the trajectory prediction image 312 in this first embodiment, it does not need to be limited to this. In another example, these may be represented by an inclination in displaying the image 312a. In such a case, the image 312a is rotated, around a vertical axis that is in parallel to the image 312a and passes the center of the horizontal direction of the image 312a, in a direction that the ball 306 curves by an angle according to a magnitude that the ball 306 curves.

Furthermore, although the trajectory prediction image 312 is constituted with the plurality of images 312a and the shapes of the images 312a are changed in this first embodiment, a direction that the ball 306 curves and a magnitude that the ball 306 curves may be represented by a shape or inclination of a single trajectory prediction image 312. For example, the trajectory prediction image 312 may be constituted with a single longitudinal quadrangle, and a twisting direction (or inclining direction) and a twisting amount (or inclining amount) of the trajectory prediction image 312 may be changed according to the direction that the ball 306 curves and the magnitude that the ball 306 curves.

Moreover, when it is predicted that the movement direction of the ball 306 becomes above or below the reference trajectory, this can be notified to a player by changing a color of the image 312a. For example, when a height of the movement direction of the ball 306 is not changed or approximately not changed from the reference trajectory, the image 312a is made into a translucent white color. Moreover, when it is predicted that the height of the movement direction of the ball 306 becomes above the reference trajectory, the image 312a may be made into blue. Furthermore, when it is predicted that the height of the movement direction of the ball 306 becomes below the reference trajectory, the image 312a may be made into red. Moreover, when it is predicted that the height of the movement direction of the ball 306 becomes above or below the reference trajectory, the intensity (that is, saturation) of blue or red may be changed according to a change amount of the height.

However, a matter that the height of the movement direction of the ball 306 becomes above or below the reference trajectory may be represented by difference in the intensity of color or shape of the image 312a rather than difference in color. As described above, since the direction that the ball 306 curves is similar to that in the general reality golf game, if the player character 302 is the right-handed, the height of the movement direction of the ball 306 becomes above the reference trajectory in a case of an uphill lie, and the height of the movement direction of the ball 306 becomes below the reference trajectory in a case of a downhill lie, and a change of the height becomes larger in conjunction with a magnitude of the slope.

Thus, since the trajectory prediction image 312 itself is displayed lineally and the movement direction of the ball 306 is represented by the plurality of images 312a constituting the trajectory prediction image 312, a game property is secured by abstractly representing the curve information by the shape of the image 312a while maintaining the difficulty of predicting the trajectory of the ball 306 after movement. That is, it is possible to improve the interest to the golf game.

If the trajectory prediction image 312 itself is displayed on the predicted trajectory of the ball 306 for a long period of time, the interest in predicting the trajectory of the ball 306 after movement may be reduced, and the interest of the golf game may decline.

However, the trajectory prediction image 312 may be displayed based on the predicted trajectory of the ball 306. In this case, as the trajectory prediction image 312, a part for a short period of time of the predicted trajectory after the launch of the ball 306 is displayed, for example, a quarter (¼) of the time up to the horizontal arrival distance. This is because, as described above, when the trajectory prediction image 312 is represented by the prediction trajectory for a long period of time, the interest in predicting the trajectory of the ball 306 after movement is reduced. That is, by representing the trajectory prediction image 312 on the predicted trajectory for a short period of time, the influence of the magnitude that the ball 306 curves is minimized as much as possible when the trajectory of the ball 306 curves after movement. Therefore, the trajectory prediction image 312 can be displayed linearly even when represented by a predicted trajectory. However, also in such a case, the shape of the image 312a is changed according to a direction that the ball curves and a magnitude that the ball curves, and therefore, a game property is secured by abstractly representing the curve information by the shape of the image 312a while maintaining the difficulty of predicting the trajectory of the ball 306 after movement.

Moreover, in the parameter determination screen 300 shown in FIG. 9, the movement gauge 320 is deformed according to the curve information on the ball 306. Details of the movement gauge 320 will be described later. As described above, since it is predicted that the ball 306 curves to the right in a case shown in FIG. 9, the movement gauge 320 is also curved to the right. The degree that the movement gauge 320 is curved is made larger as the magnitude that the ball 306 curves is larger. That is, a direction and a magnitude that the movement gauge 320 is curved are also determined based on the slope of the current position of the ball 306 and the launch direction of the ball 306.

Thus, since the movement gauge 320 is also curved based on the slope of the current position of the ball 306 and the launch direction of the ball 306, it is possible to know intuitively the movement direction of the ball 306 with a direction that the movement gauge 320 is curved and a magnitude that the movement gauge 320 is curved. Therefore, a game property is secured by abstractly representing the curve information by the shape of the movement gauge 320 while maintaining the difficulty of predicting the trajectory of the ball 306 after movement. That is, it is possible to improve the interest to the golf game.

However, as described above, since the trajectory prediction image 312 itself is displayed linearly, and the movement direction of the ball 306 is represented by the shapes of the plurality of images 312a constituting the trajectory prediction image 312, the movement gauge 320 may not be deformed. Moreover, the movement gauge 320 is deformed and the shapes of the plurality of images 312a may be not deformed.

Moreover, as seen from FIG. 8 and FIG. 9, a display area 314 for displaying the type of club 304 used by the player character 302 for hitting is provided in a lower right corner of the parameter determination screen 300. If the type of club 304 is changed in the parameter determination screen 300, an image of the club 304 that the player character 302 holds is changed to an image to a club 304 of a type after changed. At this time, the type of club 304 to be displayed in the display area 314 is also changed. In this first embodiment, it is possible to change the type of club 304 by depressing the L-button 38 or the R-button 60. If the L-button 38 is depressed, the type of club is changed to a club 304 longer than the current club 304, and the type of club is changed to a club 304 shorter than the current club 304 if the R-button 60 is depressed. According to the type of club 304, the flight distance of the ball 306 at the time of hitting the ball 306 with 100% (percent) of a hitting power is determined. However, the flight distance may be changed according to a type of player character 302.

Moreover, a star-shaped ability gauge 316 is displayed above the display area 314. The ability gauge 316 displays a magnitude (or accumulative amount) of the parameter (hereinafter, referred to as "ability increase parameter") for determining whether the ability of the club 304 to be used can be increased. If the ability increase parameter is accumulated, a color in the star-shaped ability gauge 316 is changed according to the accumulative amount. If the ability gauge 316 becomes full, that is, if the ability increase parameter reaches a maximum value (for example, 100), according to an operation of the player, the ability of the club 304 to be used can be increased. For example, when the player depresses the Y button 56, increasing the ability of the club 304 is selected. It is possible to cancel increasing the ability of the club 304 by depressing the Y button 56 again or depressing the B-button 54. Moreover, if the player character 302 hits the ball 306 in a state that the ability of the club 304 is increased, the ability increase parameter is made into a minimum value (for example, 0 (zero)).

In this first embodiment, if a predetermined condition is satisfied, the ability increase parameter is accumulated. As an example, the predetermined condition is to hit the ball 306 by less than 75% of the hitting power of the maximum value (100%). In other embodiments, the predetermined condition may be to acquire or use a predetermined item or/and to fulfill a predetermined quota. The accumulative amount of the ability increase parameter may be a fixed value or a variable value. For example, if the hitting power is less than 75%, a predetermined accumulative amount (for example, 20) is added to the ability increase parameter. However, the accumulative amount may be increased as the hitting power becomes smaller from 75%.

An operation for changing the type of the club 304 and increasing the ability of the club 304, that is, determining some parameters related to the movement of the ball 306 (hereinafter, referred to as "first parameter") (hereinafter, "first parameter determining operation") is performed prior to an operation, using the movement gauge 320, for determining a second parameter related to movement of the ball 306 (hereinafter, referred to as "second parameter") (hereinafter, referred to as "second parameter determination operation") described later. Moreover, detailed description is omitted, prior to the second parameter determination operation, it is possible to perform not only selection of the club 304 and selection whether the ability is to be increased but also a change of a launch direction of the ball 306 according to an operation of the player, that is, a direction in a left and right direction (horizontal direction) at the time of starting the movement of the ball 306. This launch direction in the horizontal direction is also the above-described first parameter related to the movement of the ball 306. For example, it is possible to change the launch direction in the horizontal direction of the ball 306 by tilting the analog stick 32 to left or right.

Furthermore, a movement gauge 320 for determining the second parameter related to the movement of the ball 306 is displayed in the right side of the center of the parameter determination screen 300 and in the left side of the display area 314 and the ability gauge 316. In this first embodiment, the second parameter related to the movement of the ball 306 is the hitting power of the ball 306, the change of a trajectory of the ball 306 and the deviation of the trajectory of the ball 306.

In this first embodiment, the change of the trajectory means a change direction in the vertical (up and down) direction and horizontal (left and right) direction and a change amount with respect to the trajectory when the ball 306 is hit in a launch direction that is determined in advance (hereinafter, referred to as "reference trajectory"). Here, the reference trajectory means the parabola that is determined by the type of the club 304 to be used (specifically, a launch angle in the vertical direction) and the hitting power (specifically, an initial velocity of the ball 306) (see FIG. 17). Moreover, in this first embodiment, the deviation of the trajectory means a deviation direction (in this first embodiment, in the horizontal direction) and a deviation amount of the launch direction of the ball 306.

The parabola can be calculated according to Equation 1 in the general physical calculation of projectile motion. Moreover, a position of the ball 306 at the time t can be calculated according to Equation 2. However, it is assumed that a predetermined gravitational acceleration g is set in the virtual game space. Moreover, theta ($\theta$) is a launch angle in the vertical direction of the ball 306, and $v_0$ is an initial velocity of the ball 306. The launch angle $\theta$ in the vertical direction of the ball 306 is set in advance for each club 304. Furthermore, the initial velocity $v_0$ of the ball 306 is set according to the hitting power and the maximum flight distance of the club 304 to be used. Moreover, t is time (frame). A frame is a unit time of screen update, for example, 1/60 second.

Moreover, a local coordinates system is set when calculating the reference trajectory. Specifically, the current position of the ball 106 is set at a reference position (origin point), an axis that is horizontally extended toward a virtual landing point from the current position of the ball 106 is set on an x-axis, and an axis that is perpendicular to this x-axis and extended in a height direction of the virtual space is set on a y-axis. Furthermore, a z-axis perpendicular to both the x-axis and the y-axis is set. Moreover, a direction horizontally extending toward the virtual landing point from the current position of the ball 106 is set as a plus or positive direction of the x-axis, a direction toward an upper direction of the virtual space is set as a plus or positive direction of the y-axis, and a direction toward the right when viewing the positive direction of the x-axis is set as a plus or positive direction of the z-axis.

However, when calculating the reference trajectory, it is assumed that the terrain (or the ground) has no slope. Therefore, in the game space, a parabola from the current position of the ball 306 to a position at the same height as the height at this current position (i.e., a position at a horizontal arrival distance) is calculated as the reference trajectory.

Reference Trajectory $$y=\tan\theta^* x-(gx^2)/(2v_0^2 \cos^2\theta) \quad \text{[Equation 1]}$$

Position $$x=v_0 \cos\theta^* t$$

$$y=v_0 \sin\theta^* t-(gt^2)/2 \quad \text{[Equation 2]}$$

In addition, although the reference trajectory is a parabola calculated by general physical calculation in this first embodiment, the reference trajectory may be evaluated based on simulation processing that takes into account the influences of the air resistance and the lift force accompanying the ball spin in the virtual space.

Here, the movement gauge 320 will be described in detail. As shown in FIG. 8, the movement gauge 320 includes a rectangular area (hereinafter, referred to as "basic area") 322 formed in a vertically long bar shape (belt shape), and the basic area 322 is divided into four sections (or areas). In this first embodiment, the four divided sections are called a first operation section 322a, a second operation section 322b, a third operation section 322c and a fourth operation section 322d in an order from the bottom in the parameter determination screen 300. The movement gauge 320 is displayed in white color lines as an example, and an inside of the basic area 322 is in black color prior to the second parameter determination operation.

Moreover, the movement gauge 320 includes an area (hereinafter, referred to as "risk area") 324 that a size and a shape are variably set outside the basic area 322. Although described later in detail, the risk area 324 is an area for determining the deviation of the ball 306 to a direction in left or right beyond a range of the basic area 322. A size and a shape of the risk area 324 are variably determined based on the club 304 to be used and a state of a lie. Briefly, like a case of general actual golf, as the difficulty of hitting increases, the size of the risk area 324 increases. That is, in a case where the club 304 to be used is not changed, the size of the risk area 324 with respect to the size of the whole movement gauge 320 differs dependent on the state of the lie. Moreover, as an example, an inside of the risk area 324 is in red color. In an example shown in FIG. 8, the risk area 324 is a triangular shape, and a left and right width is gradually larger toward the upper end of the movement gauge 320. Therefore, this gives an impression that as the movement distance becomes longer, a possibility that the deviation becomes larger is increased and thus the arrival point of the ball 306 spreads, and therefore, it is possible to intuitively recognize that the longer the movement distance, the larger the deviation.

In this first embodiment, although the basic area 322 and the risk area 324 are separated by color in order to show the risk area 324 intelligibly, these may be shown integrally without separating by color. For example, the risk area 324 may be formed by a part of basic area 322 that is deformed to spread in the left and right directions.

Moreover, an image 3220 (hereinafter, referred to as "target image") is displayed in an inside of the basic area 322 of the movement gauge 320, which corresponds to a predetermined object (hereinafter, referred to as "display target object") that exists between the current position of the ball 306 and the position of the horizontal arrival distance when the ball 306 is moved on the reference trajectory, such as a green, a pin 310, a bunker, a water hazard and a rough.

However, the target image 3220 is displayed at a position in the basic area 322 corresponding to a straight-line distance from the current position of the ball 306 up to the display target object so that a distance (or positional relationship) with the ball 306 can be known.

Assuming that the length of the movement gauge 320 corresponds to the horizontal arrival distance of the ball 306 when the ball 306 is hit with the selected club 304 with the hitting power of 100%, a position corresponding to the straight-line distance means a position away from the lower end of the movement gauge 320 by a length corresponding to the straight-line distance.

Therefore, when displaying (or updating) the parameter determination screen 300, not only the existence of the display target object that exists between the current position of the ball 306 and the position of the horizontal arrival distance is detected, but the straight-line distance up to the display target object is detected.

Figure 10:
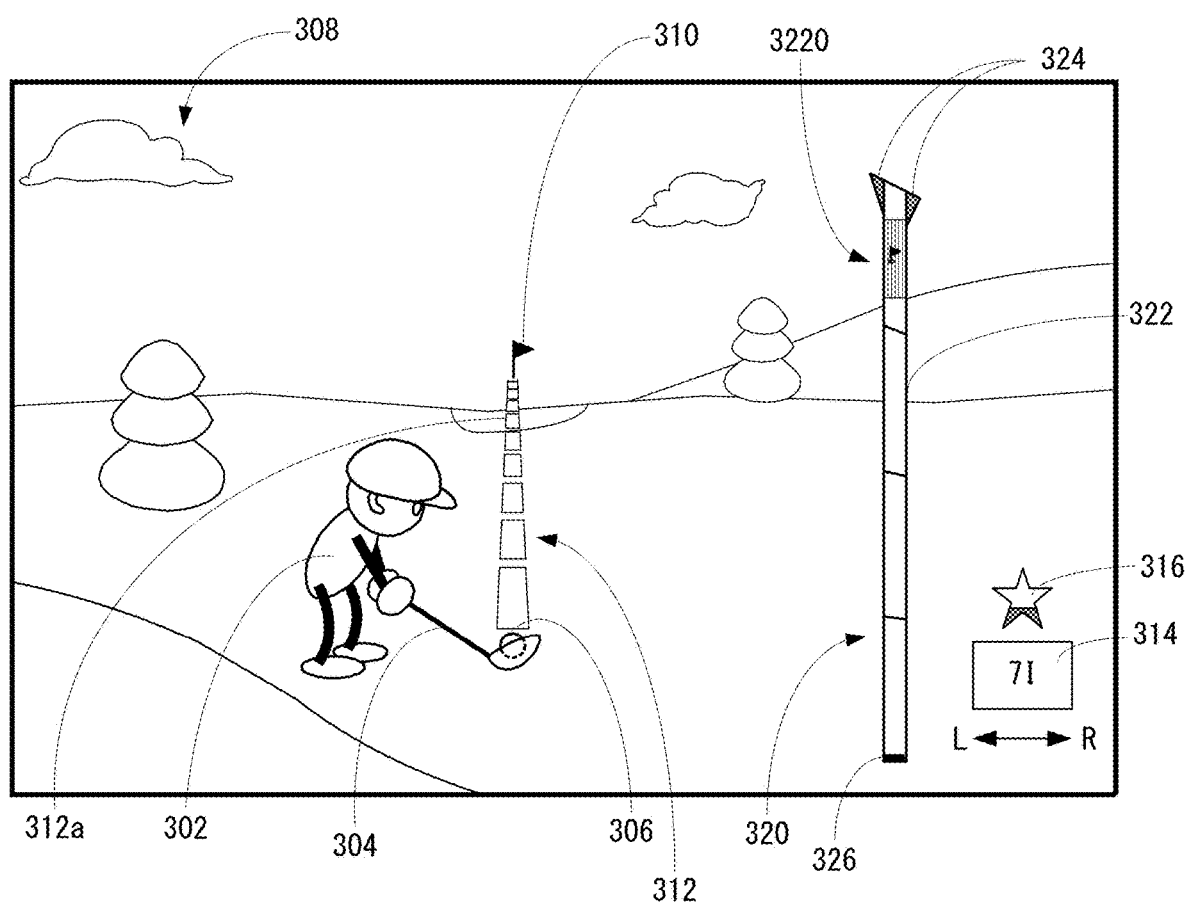
FIG. 10 is a view showing a non-limiting third example parameter determination screen.

FIG. 10 shows a non-limiting example parameter determination screen 300 including the target image 3220. In the parameter determination screen 300 shown in FIG. 10, the target images 3220 corresponding to the green and the pin 310 are respectively displayed in the fourth operation section 322d of the basic area 322. However, the target image 3220 for the green is shown with a vertically striped pattern to a quadrangle, and the target image 3220 for the pin 310 is displayed superimposed on the green. Although illustration is omitted, when a part of the green is displayed and the pin 310 does not stand on the part of the green, the target image 3220 for the pin 310 is not displayed. In the following, these are the same.

FIG. 11A and FIG. 11B show other non-limiting example movement gauges 320, respectively. In an example shown in FIG. 11A, in the fourth operation section 322d of the basic area 322, the target images 3220 for the green and the pin 310 are respectively displayed, and the target image 3220 for the bunker in front of the green is displayed. In FIG. 11A, the target image 3220 for the bunker is represented by applying at random a plurality of dots to a quadrangle.

In an example shown in FIG. 11B, the target images 3220 for the green and the pin 310 are respectively in the fourth operation section 322d of the basic area 322, and the target image 3220 for the rough in front of the green is displayed in the third operation section 322c. In FIG. 11B, the target image 3220 for the rough is represented by applying at random four (4) characters of "W" to a quadrangle.

In this first embodiment, when starting the second parameter determination operation, the target image 3220 is erased (or undisplayed). However, this is an example, and may be erased at the time that the hitting power is determined.

As described above, since it is assumed that the length of the movement gauge 320 corresponds to the horizontal arrival distance of the ball 306 at the time of hitting the ball 306 using the club 304 being selected by the hitting power of 100%, it is possible to take into consideration a position that the target image 3220 has been displayed when determining the hitting power as described later. Moreover, the horizontal arrival distance is changed dependent on the type of the club 304, and accordingly, display/non-display of the target image 3220 is changed or the position that the target image 3220 is displayed is changed, whereby as the judgment material at the time of selecting the club 304 to be used can be utilized. That is, it is possible to provide the movement gauge 320 easy to use. The same can be said even if the movement gauge 320 is not provided with the risk area 324.

Furthermore, although the movement gauge 320 is planerly displayed (hereinafter, referred to as "2D display") in the parameter determination screen 300 each shown in FIG. 8-FIG. 10, when a predetermined button (the ZR-button 61, in this first embodiment) is depressed, it is displayed three-dimensionally (hereinafter, referred to as "3D display"). However, if a predetermined button (in this first embodiment, the ZL-button 39) is depressed when the movement gauge 320 is being displayed with the 3D display, the movement gauge 320 is returned to the 2D display. It is possible for the player to select whether the movement gauge 320 is to be displayed with the 2D display or the 3D display.

Figure 12:
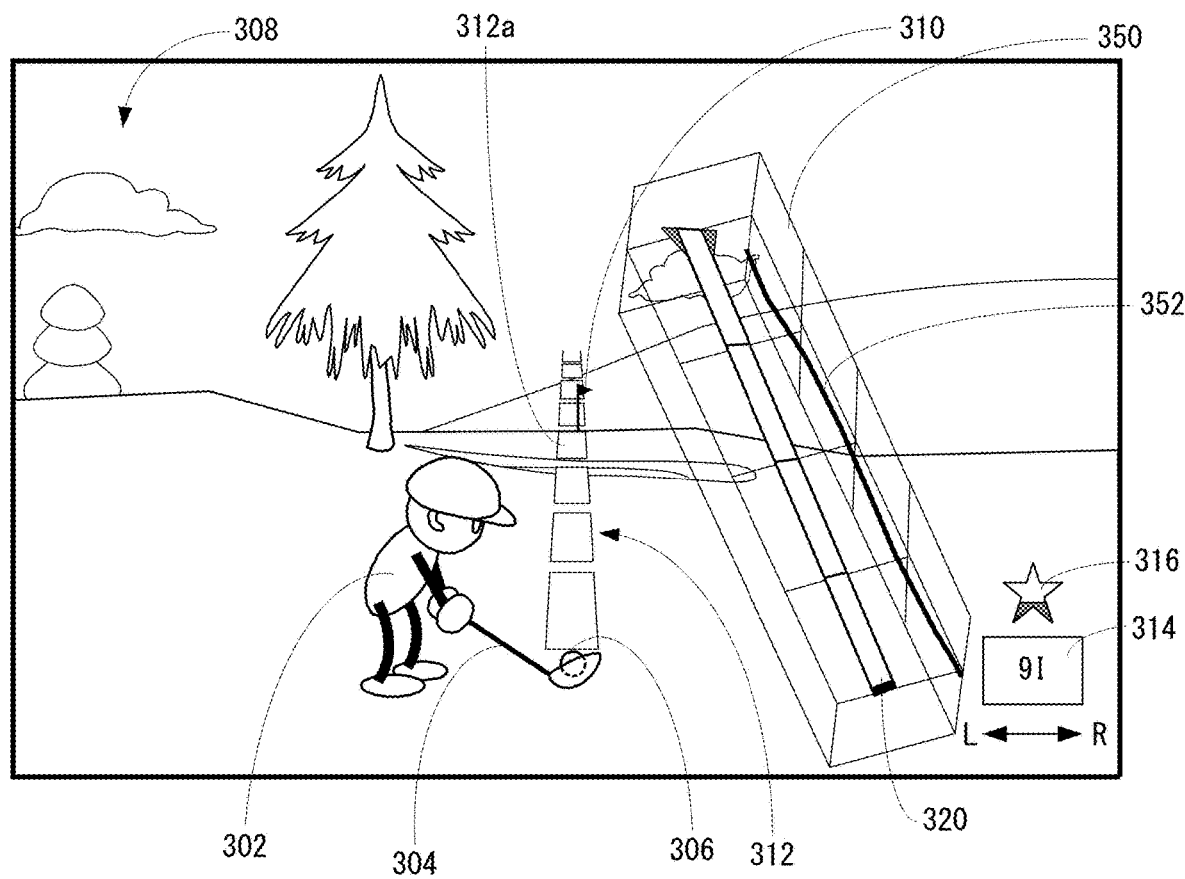
FIG. 12 is a view showing a non-limiting fourth example parameter determination screen.
Figure 13:
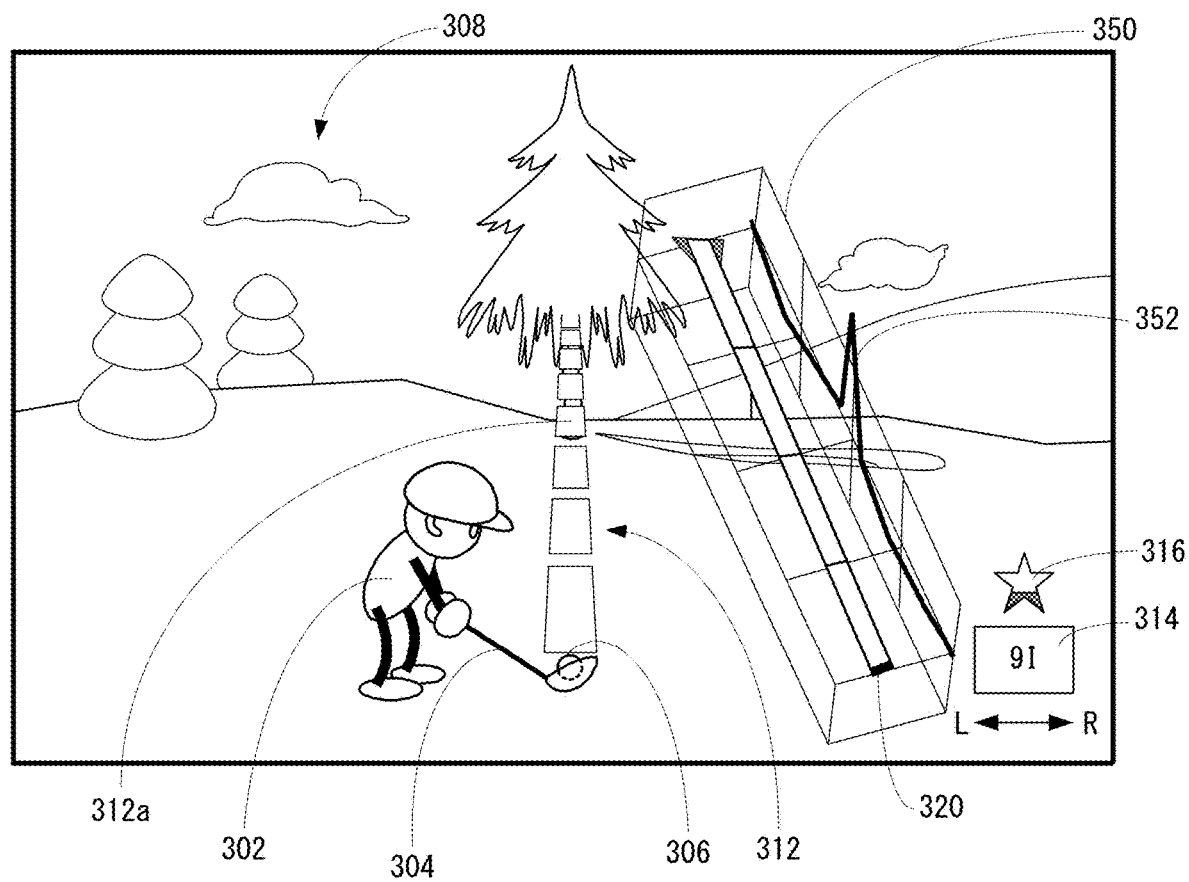
FIG. 13 is a view showing a non-limiting fifth example parameter determination screen.

FIG. 12 shows a non-limiting example parameter determination screen 300 when displaying the movement gauge 320 with the 3D display. FIG. 13 shows another non-limiting example parameter determination screen 300 when displaying the movement gauge 320 with the 3D display.

As shown in FIG. 12, when displaying the movement gauge 320 with the 3D display, the movement gauge 320 is displayed diagonally and an auxiliary frame 350 is displayed centering on the movement gauge 320. The auxiliary frame 350 defines a range of tens meters in the horizontal direction (left and right) and a range of tens meters in the vertical direction (up and down) on the basis of the current position of the ball 306, and is divided into operation sections 322a-322d. However, a position overlapping with the center of the lower end of the movement gauge 320 in the auxiliary frame 350 corresponds to the current position of the ball 306. Moreover, in an example shown in FIG. 12, a lower portion of the auxiliary frame 350 with reference to the movement gauge 320 is indicated by a shape of a rectangular parallelepiped divided for each of the operation sections 322a-322d. On the other hand, an upper portion of the auxiliary frame 350 with reference to the movement gauge 320 shows only a plane on a side of an upper end of the movement gauge 320 and a plane of a right side perpendicular this plane. Although a range in the horizontal direction indicated by the auxiliary frame 350 is set more largely than a range in the vertical direction in the parameter determination screen 300 shown in FIG. 12 and FIG. 13, this is an example and does not need to be limited.

Moreover, on a right end plane constituting the auxiliary frame 350, a polygonal line (i.e., height information) 352 is displayed, which is indicative of a change of the height of a ground object, an object arranged on the ground (hereinafter, referred to as "on-ground object") and an object arranged in the air (hereinafter, referred to as "aerial object") in the front direction of the ball 306. However, it is a range on a straight line from the current position of the ball 306 to the position of horizontal arrival distance that the polygonal line 352 is displayed. Thus, the polygonal line 352 is displayed along the movement gauge 320. Moreover, each of the ground object, the on-ground object and the aerial object in the front direction of the ball 306 is an object that hinders the movement of the ball 306 (i.e., obstacle object) when the ball 306 is moved.

In this first embodiment, a virtual straight line parallel to the straight line from the current position of the ball 306 to the position of the horizontal arrival distance is provided in a position higher than the objects arranged on the ground and in the air in the three-dimensional game space. For example, the virtual straight line is set at the height of one-hundred (100) meters in the three-dimensional game space. A position that a line object vertically drawn downward from this virtual straight line firstly collides with a polygon constituting the ground object, the on-ground object or the aerial object is determined as the height at that point. By performing such determination at intervals of several centimeters to several tens of centimeters in the virtual space, a change in height from the current position of the ball 306 to the position of the horizontal arrival distance can be detected. However, the line object is an object of a pillar shape or capsule shape having predetermined thickness so as not to slip through the on-ground object or the aerial object. Moreover, when detecting the height, it is not necessary to draw the virtual straight line and the virtual line object, and only calculation processing is executed.

Since the launch direction is changeable according to an operation by the player as described above, if the launch direction is changed, processing detecting the height is executed and in the parameter determination screen 300, the background image 308 viewed from the player character 302 is changed, and the polygonal line 352 is also changed according to a result of the processing detecting the height. Moreover, when the ball 306 exists on a slope, as described above, the shapes of the plurality of images 312a in the trajectory prediction image 312 as well as the shape of the movement gauge 320 are changed.

FIG. 13 shows a non-limiting example parameter determination screen 300 at the time of turning the launch direction by approximately thirty (30) degrees to the left from a state shown in FIG. 12. As shown in FIG. 13, a tree object is arranged in the launch direction. Moreover, as described above, the processing detecting the height is executed, and the polygonal line 352 is changed. A portion of the polygonal line 352 projecting upward with respect to the plane of the movement gauge 320 indicates the height of the tree object arranged in the launch direction.

Thus, when the movement gauge 320 is displayed with the 3D display, it is possible to know the information on the height in the launch direction. Moreover, since the auxiliary frame 350 is divided for each of the operation sections 322a-322d, the change of the polygonal line 352 can be known for each of the operation sections 322a-322d, and accordingly, it is possible to use such change as a guide when performing the direction input described later.

Subsequently, the second parameter determination operation is described and movement of the ball 306 is described. However, although a case where the movement gauge 320 is displayed with the 2D display will be described from FIG. 14 onward, even in a case where the movement gauge 320 is displayed with the 3D display, the parameter determination screen 300 is changed similarly.

In addition, although the polygonal line 352 is displayed along the movement gauge 320 in this first embodiment, the movement gauge 320 may be displayed with a thickness, whereby the polygonal line 352 may be displayed on a cross section or side surface thereof.

Moreover, the polygonal line 352 is an example, and the height information may be represented by a bar graph every several centimeters or several tens of centimeters.

In the parameter determination screen 300 shown in FIG. 8 etc., if there is an instruction to start the second parameter determination operation (in this first embodiment, depressing the A-button 53), the first index image 326 is started to be moved toward one end (i.e., an upper end of the movement gauge 320) from an initial position (i.e., a lower end of the movement gauge 320). The first index image 326 is an index for determining the hitting power, and is moved with a movement speed V1.

Figure 14:
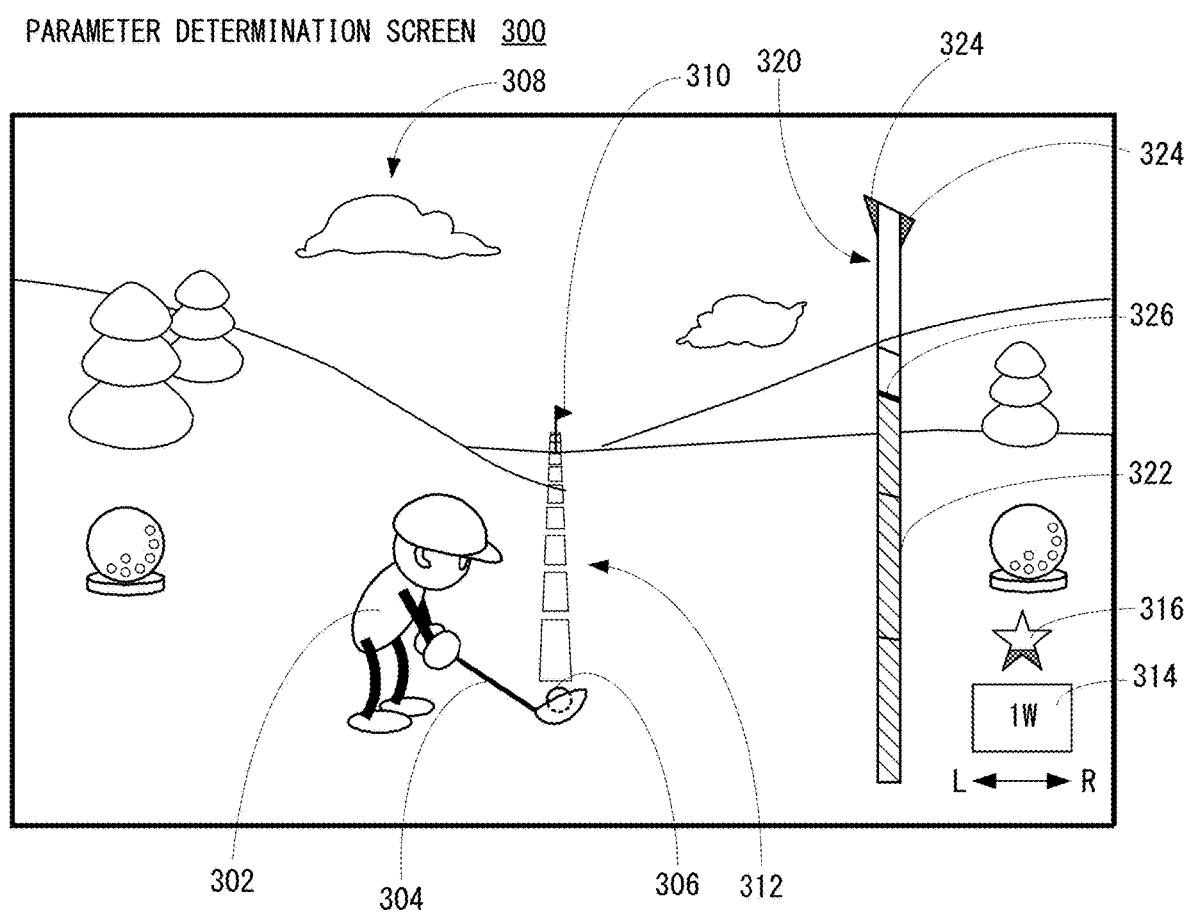
FIG. 14 is a view showing a non-limiting sixth example parameter determination screen.

As shown in FIG. 14, if the first index image 326 is moved, a color of a portion that the first index image 326 is moved in the movement gauge 320 is changed (slant-line portion in FIG. 9). As an example, if the first index image 326 is moved in the movement gauge 320, the color of the portion being moved is changed to yellow. In this first embodiment, although a color of the basic area 322 is changed, a color of the risk area 324 is not changed. Therefore, distinctiveness or visibility between the basic area 322 and the risk area 324 is improved. However, since the first index image 326 is moved inside the movement gauge 320, a breadth is made larger in a portion provided with the risk area 324.

In addition, although the color of the portion that the first index image 326 is moved is changed, in this first embodiment, instead of the movement of the first index image 326, a color of an inside of the movement gauge 320 may be gradually changed from the lower end toward the upper end of the movement gauge 320. In this case, a speed that the color is changed is the movement speed V1.

The hitting power is determined according to a position that the first index image 326 is made to be stopped within a range that is equal to or larger than a minimum value (0%) and equal to or smaller than a maximum value (100%). However, when the first index image 326 is located at the lower end of the movement gauge 320, the hitting power is a minimum, and the hitting power is a maximum when the first index image 326 is located at the upper end of the movement gauge 320. If there is an instruction to stop (depressing the A-button 53 in this first embodiment), the first index image 326 is stopped moving. The hitting power is determined according to a rate of the length from the lower end of the movement gauge 320 to the first index image 326 having been stopped, with respect to full length of the movement gauge 320. Strictly, since the first index image 326 is slanted gradually according to deformation of each of the operation sections 322a-322d as it goes to the upper end from the lower end of the movement gauge 320, the hitting power is determined by the length from the lower end of the movement gauge 320 to a position of the center of the first index image 326. That is, the closer the first index image 326 to the upper end of the movement gauge 320, the larger the hitting power. Since the initial velocity $v_0$ of the ball 306 is determined based on the hitting power as described above, the closer the first index image 326 to the upper end of the movement gauge 320, the longer the movement distance of the ball 306.

When there is no instruction to stop, the first index image 326 is moved, while a moving direction thereof is reversed, toward the lower end of the movement gauge 320 after reaching the upper end of the movement gauge 320. If the first index image 326 reaches the lower end of the movement gauge 320, the first index image 326 is stopped moving, it becomes necessary to perform again the second parameter determination operation, or a missed shot or whiff (swing and a miss) occurs.

In addition, even when the first index image 326 is moved toward the lower end of the movement gauge 320, it is possible for the player to stop movement of the first index image 326.

Moreover, in other embodiments, the first index image 326 may be moved again toward the upper end from the lower end when reaching the upper end of the movement gauge 320.

Figure 15:
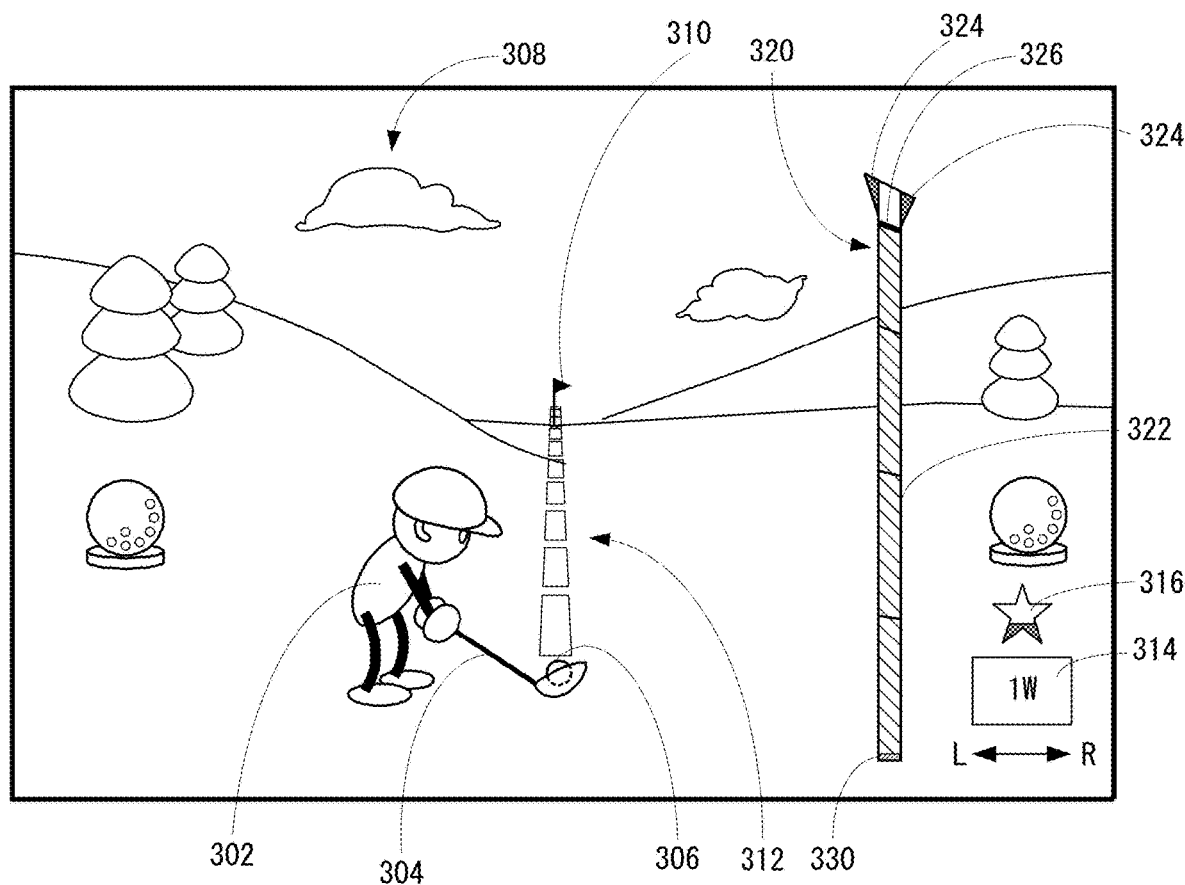
FIG. 15 is a view showing a non-limiting seventh example parameter determination screen.

FIG. 15 shows a non-limiting example parameter determination screen 300 when movement of the first index image 326 is stopped. As shown in FIG. 15, the first index image 326 is stopped at a position closer to the upper end from the center of the fourth operation section 322d. If the first index image 326 is stopped, the second index image 330 is started moving toward the upper end from the lower end of the movement gauge 320 with the movement speed V2. The second index image 330 is an index that indicates a predetermined period of time (hereinafter, referred to as "direction input period") capable of inputting a direction changing the trajectory of the ball 306 and a magnitude to be changed (i.e., change amount) and a portion (or section) that the trajectory of the ball 306 is to be changed. Although the movement speed V2 is the same as the movement speed V1 as an example, the movement speed V2 may be a different speed.

The second index image 330 is moved from the lower end of the movement gauge 320 to a position of the stopped first index image 326. This period of time is the direction input period. Therefore, when the first index image 326 is stopped in the middle of the operation section 322a, 322b, 322c or 322d, the direction input period is made to be shorter in comparison to a case where this first index image 326 is stopped at a trailing end of the same operation section 322a, 322b, 322c or 322d. The player can perform, in the direction input period, the direction input temporally (in a time course manner) if the hitting power is specified by stopping the movement of the first index image 326. By this temporal (over-time) direction input, it is possible to change the trajectory of the ball after hitting from the reference trajectory. That is, it is possible to move the ball 306 while temporally (over-time) reflecting into the trajectory the temporal direction input. As described above, since the second index image 330 is moved with the movement speed V2, the direction input period is variably set according to the position of the first index image 326.

Therefore, since the player can stop the first index image 326 in consideration of not only the hitting power but the direction input period, the interest and strategic characteristic of the game can be improved.

However, the temporal direction input is a direction input detected in the direction input period, and the player does not always perform the direction input during this direction input period.

The player can perform the direction input by tilting the analog stick 32. The analog stick 32 can be tilted in the direction of 360 degrees, and therefore, it is possible to perform the direction input of 360 degrees. Moreover, according to a magnitude of an angle that the analog stick 32 is tilted, i.e., a tilt amount, a magnitude (or strength) that changes the trajectory of the ball 306 in a direction that the analog stick 32 is tilted (hereinafter, referred to as "tilt direction"). That is, the player can determine not only a direction that the trajectory of the ball 306 is changed but a degree of change. Therefore, it is possible to make the player have interest to the direction input itself.

Figure 16:
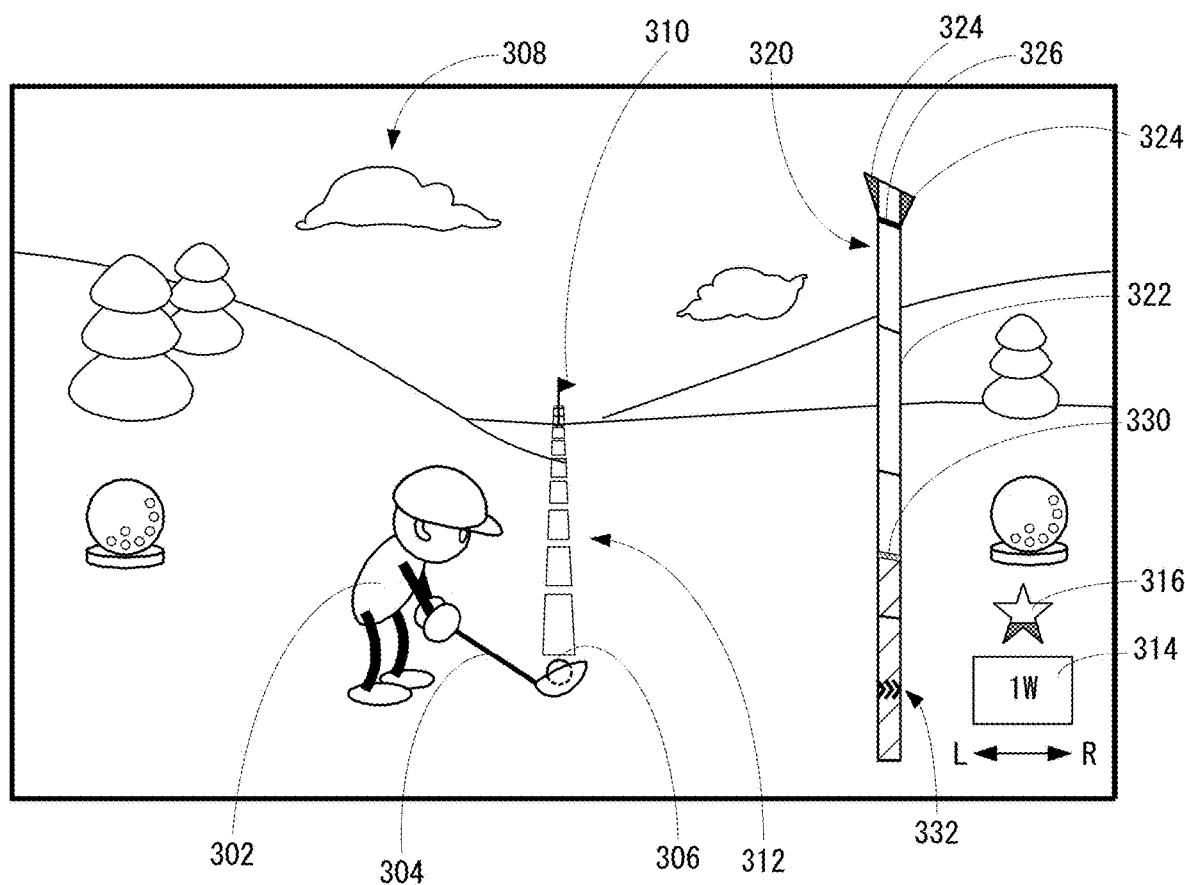
FIG. 16 is a view showing a non-limiting eighth example parameter determination screen.

FIG. 16 shows a non-limiting example parameter determination screen 300 during movement of the second index image 330. As shown in FIG. 16, when the second index image 330 is moved, a color of a portion that the second index image 330 is moved in the movement gauge 320 is changed into orange color. However, a color of the risk area 324 is not changed. Moreover, in FIG. 16, in order to distinguishably show a color that is changed when the first index image 326 is moved and a color that is changed when the second index image 330 is moved, a direction of the slant lines and a gap between adjacent slant lines are changed in comparison to those in the parameter determination screen 300 shown in FIG. 14 and FIG. 15, and the slant lines indicative of the color that is changed due to movement of the first index image 326 are omitted. Moreover, instead the movement of the second index image 330, the color of an inside of the movement gauge 320 may be changed gradually from the lower end of the movement gauge 320 to the position that the first index image 326 is stopped. In this case, a speed that the color is changed is the movement speed V2.

Moreover, as shown in FIG. 16, an image 332 indicative of the direction input (hereinafter, referred to as "arrow image") is displayed in the center of the first operation section 322a. The arrow image 332 is an image indicative of a direction input that a plurality of direction inputs detected for each frame in the operation section 322a, 322b, 322c or 322d displayed are unified into one (hereinafter, referred to as "section direction input"). As described above, the direction input is the tilt amount that the analog stick 32 is tilted in up, down, left or right, respectively, and therefore, the section direction input is a single two-dimensional vector that input values in up, down, left or right are added to each other. That is, in each of the operation sections 322a-322d, an average value of a plurality of direction inputs detected for each frame is calculated as the section direction input.

In this first embodiment, since the arrow image 332 is an image that indicates single section direction input unifying a plurality of direction inputs, the section direction input is displayed in a number smaller than that of the detected direction inputs. Therefore, the section direction input is easy to understand.

A timing that the arrow image 332 is displayed is, as an example, a timing that the predetermined number (for example, 10-12) of direction inputs are detected. Therefore, if a predetermined number of direction inputs are detected, the section direction input is calculated, and the arrow image 332 indicating the section direction input is displayed in the corresponding operation section 322a, 322b, 322c or 322d. Therefore, even if the second index image 330 is being moved in the middle of the operation section 322a, 322b, 322c or 322d, at a timing that the predetermined number of the direction inputs are detected, the section direction input is calculated, and accordingly, the arrow image 332 that indicates the calculated section direction input is displayed in the corresponding operation section 322a, 322b, 322c or 322d.

In another example, the section direction input may be calculated when the second index image 330 reaches the center of the operation section 322a, 322b, 322c or 322d, and the arrow image 332 that indicates the calculated section direction input is displayed in the corresponding operation section 322a, 322b, 322c or 322d.

However, in any case, the arrow image 332 corresponding to the section direction input calculated from all the direction inputs detected in the operation section 322a, 322b, 322c or 322d is eventually displayed in the corresponding operation section 322a, 322b, 322c or 322d. That is, the arrow image 332 displayed in the middle of the operation section 322a, 322b, 322c or 322d that the second index image 330 is under movement is updated at the time that the second index image 330 is moved to the trailing end of the corresponding operation section 322a, 322b, 322c or 322d.

Therefore, by looking the arrow image 332 displayed during movement of the second index image 330 in the operation section 22a, 322b, 322c or 322d, when the section direction input indicated by the arrow image 332 does not indicate desired direction and magnitude (or strength), the player can modify the direction input so that the section direction input becomes the desired direction and magnitude. Therefore, the arrow image 332 not only can show the section direction input but can be said to be an index for modifying the section direction input. In this embodiment, the strength that changes the trajectory of the ball 306 differs dependent on the tilt amount of the direction input, and in order to make the player understand the strength, the arrow image 332 is made to be displayed or hidden, and to be changed to the content corresponding to the strength.

In this first embodiment, the strength that changes the trajectory of the ball 306 differs dependent on the tilt amount of the direction input, and in order to make the player understand the strength, the arrow image 332 is made to be displayed or hidden, and to be changed to the content corresponding to the strength. In this first embodiment the strength that changes the trajectory of the ball 306 includes case where the tilt amount is 0 (zero), and is classified into three stages (for example, strong, medium and weak) in a case where the tilt amount is larger than 0 (zero). The tilt amount of the analog stick 32 is changed by "0.1" between "0" and "1.0", and the tilt amount at the time of not tilted is "0" and the tilt amount at the time of tilted at the maximum is "1.0". Moreover, when the tilt amount is larger than 0 (zero) and equal to or less than "0.3", the stage of strength is determined as "weak", when the tilt amount is larger than "0.3" and equal to or less than "0.7", the stage of strength is determined as "medium" (i.e., between "strong" and "weak"), and when the tilt amount is larger than "0.7" and equal to or less than "1.0", the stage of strength is determined as "strong".

Therefore, in this first embodiment, when the trajectory of the ball 306 is to be changed, the arrow image 332 that the strength that changes the trajectory of the ball 306 is expressed by three stages is displayed, and when not changing the trajectory of the ball 306, the arrow image 332 is not displayed. The arrow image 332 shown in FIG. 16 is an arrow image 332 in a case where the strength that changes the trajectory of the ball 306 is "strong", and three arrows (arrowheads) are displayed side by side. Although illustration is omitted, when the strength that changes the trajectory of the ball 306 is "weak", an arrow image 332 that the arrow is one. Moreover, when the strength that changes the trajectory of the ball 306 is "medium", an arrow image 332 that the arrows (arrowheads) are two.

However, the above-described classification of the strength is performed only for displaying or hiding the arrow image 332, and is not used when actually changing the trajectory. In other embodiments, this classification may be utilized when actually changing the trajectory. A method of changing the trajectory of the ball 306 will be described later.

In addition, although the strength that changes the trajectory of the ball 306 is classified into three stages in a case where the tilt amount of the analog stick 32 is larger than 0 (zero) in this first embodiment, this is a mere example, and if it is two or more stages, it is also possible to classify into four or more stages.

Figure 17:
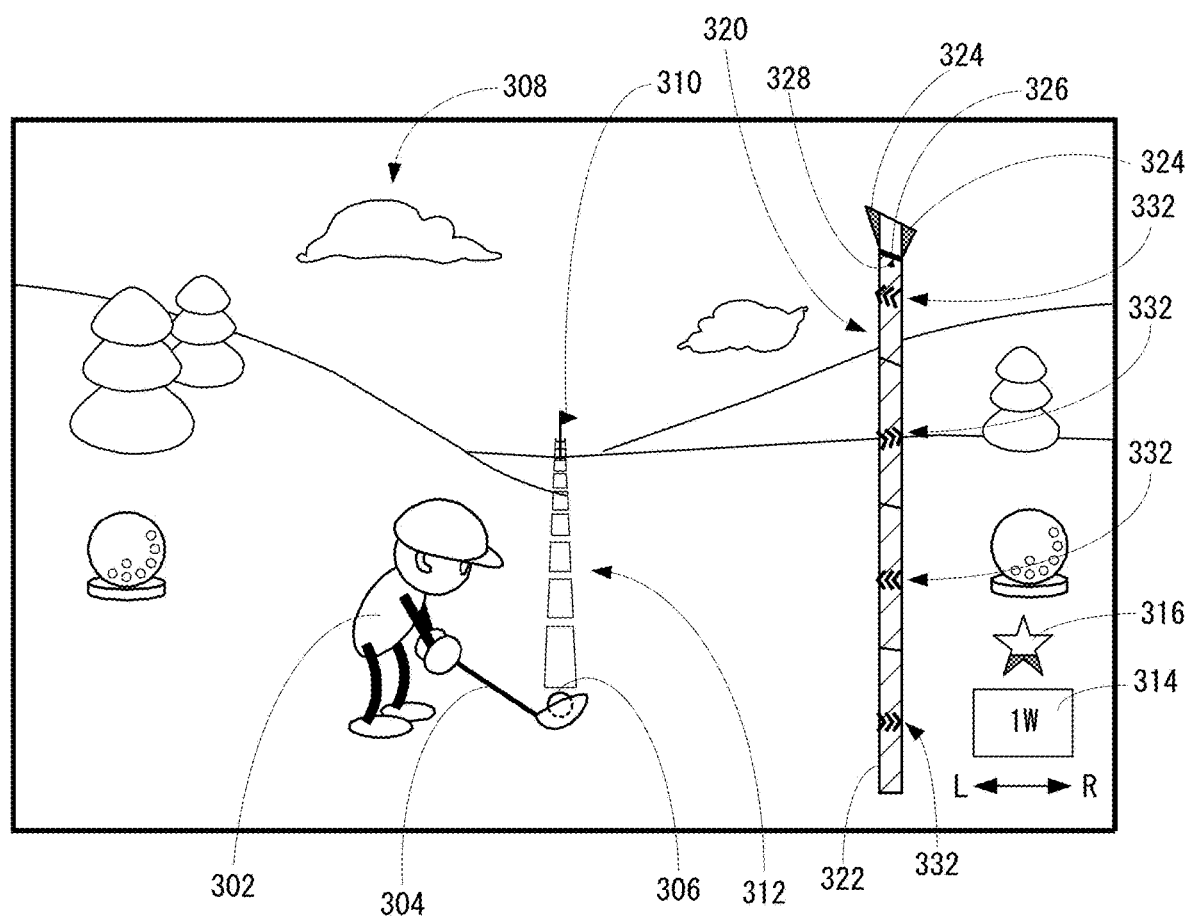
FIG. 17 is a view showing a non-limiting ninth example parameter determination screen.

FIG. 17 shows a non-limiting example parameter determination screen 300 when the second index image 330 is moved to a position that the first index image 326 is stopped. As shown in FIG. 17, the second index image 330 is made to be hidden, and a color up to the position that the first index image 326 stopped from the initial position of the movement gauge 320 is changed to orange color. Moreover, in the parameter determination screen 300 shown in FIG. 17, the arrow image 332 is displayed in each of the operation sections 322a-322d. The trajectory of the ball 306 is changed in a direction indicated by the arrow image 332. Therefore, in an example shown in FIG. 17, when the player character 302 hits the ball 306, the ball 306 is moved along the trajectory that the reference trajectory is changed toward right in a portion corresponding to the first operation section 322a, is changed toward left in a portion corresponding to the second operation section 322b, is changed toward diagonally upper right in a portion corresponding to the third operation section 322c, and is changed toward diagonally upper left in a portion corresponding to the fourth operation section 322d.

Furthermore, an image (hereinafter, referred to as "deviation designation image") 328 that contacts a lower side of the first index image 326 is displayed in the parameter determination screen 300 shown in FIG. 17. The deviation indication image 328 is an image indicative of deviation of the trajectory of the ball 306. In this first embodiment, the hitting power is determined according to an operation of the player, and when the change of the trajectory is determined, the deviation of the trajectory is determined by a lottery.

A position that the deviation indication image 328 is displayed is determined by a lottery within a range of breadth of the movement gauge 320 (or the first index image 326). In this first embodiment, a lottery period (hereinafter, referred to as "deviation lottery period") of predetermined time length (for example, 0.5 seconds (30 frames) grade) is set. The deviation is automatically determined at the time of an end of the deviation lottery period. Moreover, in the deviation lottery period, a display position of the deviation indication image 328 is changed at random along the first index image 326, and a manner thereof is displayed in the parameter determination screen 300 (hereinafter, referred to as "lottery display"). Since the lottery display is thus performed, it is possible for the player to have interest to the golf game even in the period of time after determining the hitting power until the movement of the ball 306 is started.

When the deviation indication image 328 is located in the center of the breadth of the movement gauge 320, there is no deviation and a deviation amount in left and right is 0 (zero). When the deviation indication image 328 is located in the left from the center of the movement gauge 320, the trajectory of the ball 306 is deviated to the left. Moreover, when the deviation indication image 328 is located in the right from the center of the movement gauge 320, the trajectory of the ball 306 is deviated to the right. When the ball 206 is deviated to the left or the right, in either case, a deviation amount is enlarged as the deviation indication image 328 is moved away from the center of the breadth of the movement gauge 320.

Figure 18A:
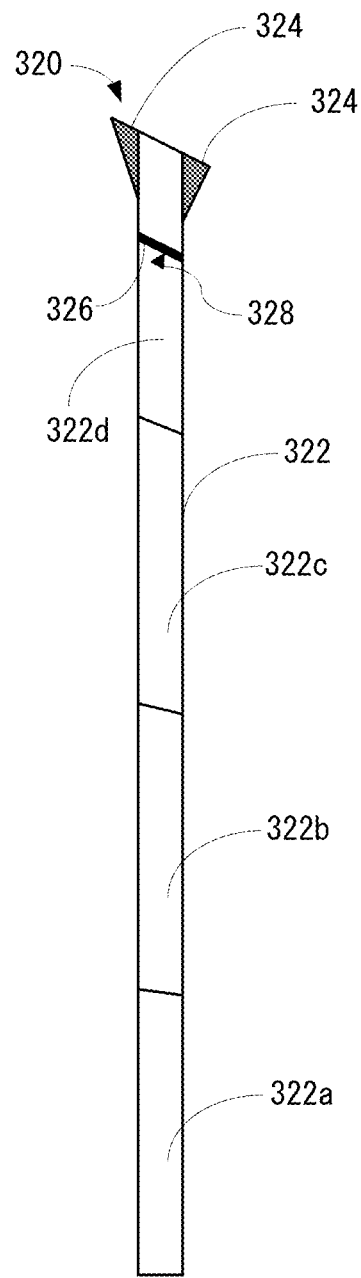
FIG. 18A is a view showing a non-limiting example range that deviation is determined.
Figure 18B:
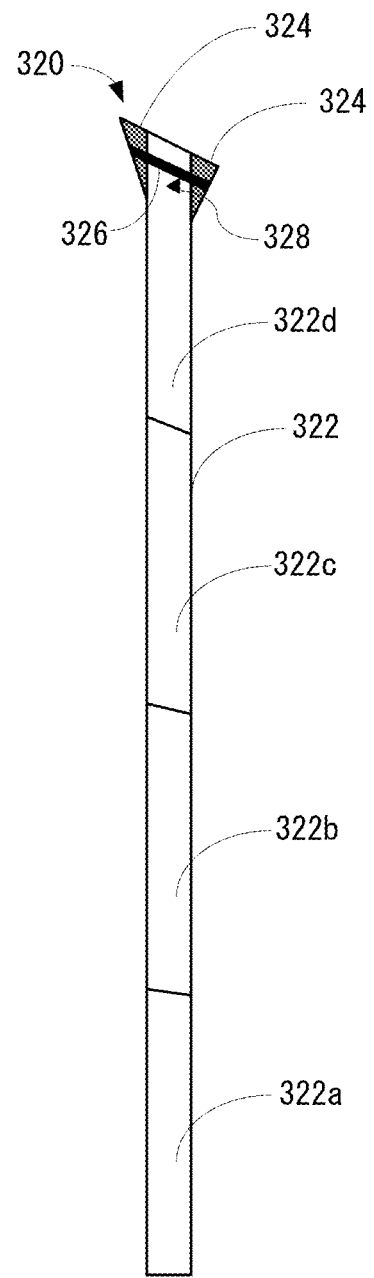
FIG. 18B is a view showing another non-limiting example that deviation is determined.

FIG. 18A is a view showing a non-limiting example range that the deviation is determined, and FIG. 18B is a view for showing another non-limiting example range that the deviation is determined. In FIG. 18A, the first index image 326 is stopped in a position that the risk area 324 is not formed on the movement gauge 320. Therefore, in a case shown in FIG. 18A, the deviation is determined within a range of the basic area 322. On the other hand, in FIG. 18B, the first index image 326 is stopped in a position that the risk area 324 is formed on the movement gauge 320. At this time, in a case shown in FIG. 18B, the deviation is determined within ranges of the basic area 322 and the risk area 324. Therefore, in the case shown in FIG. 18B, the hitting power becomes larger than the case shown in FIG. 18A, and therefore, the movement distance of the ball 306 becomes long, but the deviation amount may become large. As described above, the deviation amount is made larger as the deviation indication image 328 is away from the center of the breadth of the movement gauge 320. Therefore, when the deviation indication image 328 is in the risk area 324, the deviation amount is made larger compared with the time of being outside the risk area 324. Moreover, the player can play the golf game in consideration of the selection of the club 304 and the magnitude of the hitting power depending on whether the movement distance is emphasized or the directionality is emphasized.

Moreover, since the magnitude of the hitting power is proportional to the direction input period, also when the period of time that changes the movement direction of the ball 306 is made to be longer by an operation of the player, the deviation amount may become large. That is, since the length of the direction input period is changed according to the position that the first index image 326 is stopped, the player can play the golf game in consideration of the selection of the club 304 and the magnitude of the hitting power depending on whether making the direction input period longer is emphasized or un-increasing the deviation amount is emphasized.

In this first embodiment, when there is deviation, the launch direction of the ball 306 in the horizontal direction (left and right) is changed. The amount of change of the launch direction of the ball 306 is made to be larger in proportion to the deviation amount. However, in another example, when there is deviation, only the magnitude may be changed (or moved) according to the deviation amount in a direction of the deviation in a part or whole of the trajectory. In a further example, when there is deviation, both the launch direction of the ball 306 and the trajectory may be changed. These may be individually adopted according to the type of the player character 302 or/and club 304.

Moreover, a line at a side of a trailing end (or upper end) of each of the first operation section 322a, the second operation section 322b, the third operation section 322c and the fourth operation section 322d is set aslant. A slant degree of the line at a side of the trailing end of each of the operation sections 322a-322d is made larger as it goes to the fourth operation section 322d from the first operation section 322a. This slant degree is related to the deviation amount in the horizontal direction (left and right) of the ball 306. In general, as for a draw ball and a fade ball, the draw ball has a longer movement distance. Therefore, in a case of a right-handed character, as shown in FIG. 18A and FIG. 18B, the line at side of the trailing end is slanted downwardly as it goes to right from left. That is, as to the right-handed character, the movement distance is made longer of right deviation is longer than that of left deviation. However, not only the line at a side of the trailing end is slanted but also each of the operation sections 322a-322d is deformed so that the change becomes larger toward the upper end from the lower end of the movement gauge 320. Therefore, as described above, the first index image 326 is slanted gradually toward the upper end from the lower end of the movement gauge 320.

Although illustration is omitted, in a case of left-handed character, a direction of the slant of the boundary line at a side of the trailing end of each of the operation sections 322a-322d becomes opposite to a case of the right-handed character.

In addition, although detailed description is omitted, when there is deviation, the movement distance that is changed due to the deviation affects a distance that a rolling distance after the ball 306 is landed. When the deviation indication image 328 is closer to the upper end of the movement gauge 320 than a position determining the hitting power, the distance that the ball 306 rolls is made longer, and inversely, when the deviation indication image 328 is farther from the upper end of the movement gauge 320 than the position determining the hitting power, the distance that the ball 306 rolls is made shorter. However, in a case where the terrain is sloped and a case where a landing point is a bunker, a rough and a hazard, the ball 306 rolls according to a slope of the terrain, and moves or stops according to the landing point. Since a shape of each of the sections 322a-322d is deformed as described above, even if the position of the determined deviation indication image 328 is within the basic area 322, the movement distance is changed.

When the direction input period expires, a deviation lottery is started, and in parallel therewith, the player character 302 starts the swing motion to hit the ball 306. However, the swing motion of the player character 302 may be started when the direction input period expires and the deviation lottery is ended.

Figure 19:
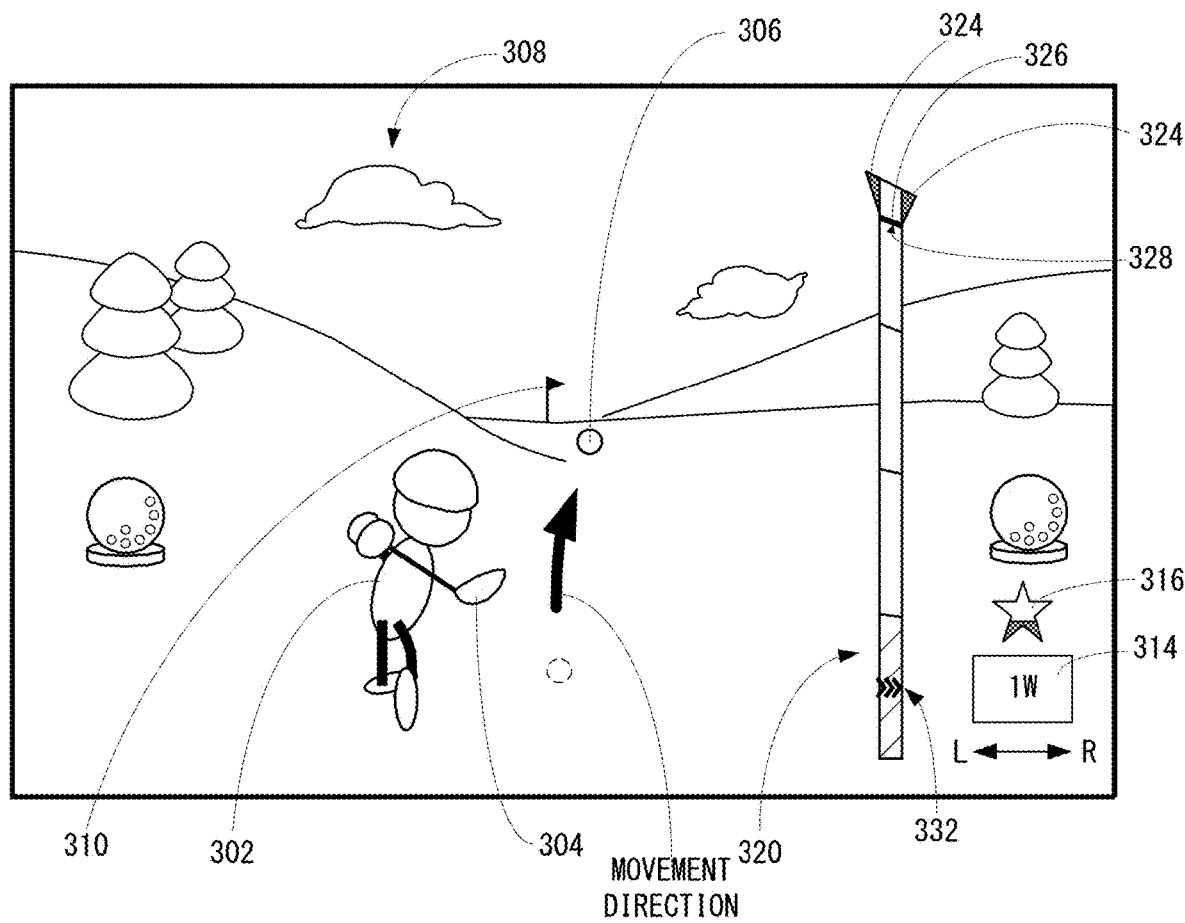
FIG. 19 is a view showing a non-limiting tenth example parameter determination screen.

FIG. 19 shows a non-limiting example parameter determination screen 300 immediately after the player character hits the ball 306. In an example shown in FIG. 19, the deviation does not occur or is slightly toward the right since the deviation indication image 328 is located near the center of the breadth of the basic area 322. Therefore, the ball 306 is started to move in a predetermined launch direction or slightly to the right from the predetermined launch direction.

Although illustration is omitted, when the ball 306 starts moving, the virtual camera is moved behind the ball 306 so as to take a bird's-eye view from diagonally above. However, although detailed description is omitted, the virtual camera is moved so as to follow the virtual ball in a case of assuming that the ball 306 is moved on the reference trajectory. This is for showing by the game screen to the player change of the trajectory of the ball 306. Therefore, a field angle of the virtual camera is appropriately adjusted so that the ball 306 is included in the game screen.

Moreover, when the ball 306 starts moving, in the parameter determination screen 300 and the game screen until the ball 306 is stopped after landing, in the movement gauge 320, the operation section 322a, 322b, 322c or 322d corresponding to the position of the ball 306 being currently moved is distinguishably displayed, and the arrow image 332 for the operation section 322a, 322b, 322c or 322d is displayed. The operation section 322a, 322b, 322c or 322d corresponding to the position of the ball 306 being currently moved is displayed in a color (in this first embodiment, yellow color) different from a color (in this first embodiment, orange color) of other operation sections. However, each of the arrow images 332 of each of the operation sections 322a-322d displayed in the direction input period may be once made in white color when the direction input period expires and the player character 302 starts the swing motion, and the arrow image 332 of the operation section 322a, 322b, 322c or 322d corresponding to the position of the ball 306 being currently moved may be displayed in a color (for example, black color) different from those of other operation sections. That is, the operation section 322a, 322b, 322c or 322d corresponding to a position of the ball 306 being currently moved and its arrow image 332 are made to stand out (or highlighted). Therefore, the player can know that the trajectory of the ball 306 is being changed to a direction according to an own direction input.

However, in this first embodiment, the operation section 322a, 322b, 322c or 322d corresponding to a position of the ball 306 being currently moved means the operation section 322a, 322b, 322c or 322d including a position in the movement gauge 320 equivalent to a movement distance in the horizontal direction (hereinafter, referred to as "horizontal distance") of the reference trajectory at the time "t" from a start of movement of the ball 306 when assuming that the length from the initial position of the movement gauge 320 to the stop position of the first index image 326 at the time that the hitting power is determined corresponds to the horizontal arrival distance of the reference trajectory.

In addition, when the player character 302 hits the ball 306, the color in the movement gauge 320 is returned to the color (yellow) of the time that the hitting power is determined, and the arrow images 332 of the respective operation sections 322a-322d are made to be hidden. However, the arrow images 332 may be displayed in semitransparent white color.

Moreover, although it is made to be displayed in this first embodiment so that a whole of the operation section 322a, 322b, 322c or 322d corresponding to the position of the ball 306 being currently moved is distinguishable, it does not need to be limited to this. A predetermined designation image such as a point or a line may be displayed at a position of the movement gauge 320 corresponding to the position of the ball 306 being currently moved. Moreover, it is sufficient that only the arrow image 332 of the operation section 322a, 322b, 322c or 322d corresponding to the position of the ball 306 being currently moved is displayed. In this case, a color of only the arrow image 332 of the operation section 322a, 322b, 322c or 322d corresponding to the position of the ball 306 being currently moved may be changed while displaying all the arrow images 332 of the respective operation sections 322a-322d.

Since the parameter determination screen 300 shown in FIG. 19 shows a state immediately after the player character 302 hits the ball 306, the first operation section 322a is displayed distinguishably and the arrow image 332 of the first operation section 322a is displayed. In a case of displaying each of the operation sections 322a-322d in an identifiable manner, it is performed by applying a predetermined color (in this first embodiment, orange color) to each of the operation sections 322a-322d.

Next, a method of changing the trajectory of the ball 306 by using the direction input will be described. As described above, when the player wants to change the trajectory of the ball 306 from the reference trajectory, the player tilts the analog stick 32 in the direction to be changed. Since an operation input of the player is detected for each frame, when the analog stick 32 is tilted, a tilt direction and a tilt amount are detected for each frame.

In this first embodiment, the trajectory of the ball 306 is changed by using the direction input in each of the operation sections 322a-322d of the movement gauge 320 (hereinafter, referred to as "section direction input"). The direction input is detected for each frame, after determining the hitting power, during the direction input period from the initial position of the second index image 330 is moved up to the position that the first index image 326 is stopped. In this first embodiment, the ball 306 is moved while making a temporal direction input (i.e., section direction input) reflect into the trajectory temporally. However, there is an occasion that the player does not perform the direction input in all or a part of the direction input periods. For example, there is an occasion that the direction input is detected only one time in the direction input periods. Moreover, as described later, the section direction input that the direction inputs detected for each frame are averaged is calculated for each of the operation sections 322a-322d. Therefore, a temporal section direction input is the section direction input for each of the operation sections being continuous in time in two or more operation sections (in this first embodiment, 322a-322d), and affects the trajectory of the ball 306 according to a time series.

As described later, when the trajectory of the ball 306 is to be changed, in order to calculate by dividing into the vertical (up and down) direction and the horizontal (left and right) direction, the direction input is stored as a tilt amount in the vertical direction and a tilt amount in the horizontal direction separately. However, in this specification, a direction to that the analog stick 32 is tilted means a direction out of four directions (up, down, left and right) at the time of viewing the left controller 3 from the front. That is, as shown in FIG. 1 and FIG. 3, when predetermined three axes (x axis, y axis and z axis) are set for the game system 1 and its components (i.e., the main body apparatus 2, the left controller 3, the right controller 4), a direction in the horizontal (left and right) direction corresponds to an x axis and a direction in the vertical (up and down) direction corresponds a y axis. Moreover, the trajectory of the ball 306 is changed based on the direction input by the player in any direction of the four (up, down, left and right) directions at the time of viewing the reference trajectory in a positive direction of the x axis from an origin point of the local coordinates system (see FIG. 22). However, the origin point of the local coordinates system is a moving start position of the ball 306. The moving start position is a position of the ball 306 prior to hitting.

FIG. 20A shows a non-limiting example table of the direction inputs detected for each frame in the direction input period. In order to distinguish from the number of frames of the reference trajectory described later, in the table of the direction inputs, the number of frames is referred to as the number of operation frames. This is the same also for a table of average direction input shown in FIG. 20B.

In the table of the direction inputs, in the vertical (up and down) direction, an upward direction tilt is expressed by positive numerals and a downward tilt is expressed by negative numerals. Moreover, in the horizontal (left and right) direction, a rightward direction tilt is expressed by positive numerals and a leftward tilt is expressed by negative numerals. As described above, a magnitude of the numeral indicates the tilt amount, and is expressed by the numbers from 0 (zero) to 1.0.

The ball 306 is to be moved in a direction indicated by the arrow image 332 in this first embodiment, for each of the operation sections 322a-322d, a plurality of direction inputs are averaged. That is, the section direction input is calculated for each of the operation sections 322a-322d. If the section direction input is calculated, this is rewritten as a detected direction input in the operation section 322a, 322b, 322c or 322d that section direction input is calculated. That is, in each of the operation sections 322a-322d, the direction inputs having the same values (i.e., the section direction input) are written. FIG. 20B shows a non-limiting example table of average direction input for each of the operation sections 322a-322d. Thus, the trajectory of the ball 306 is changed using the direction input that is rewritten, i.e., the section direction input.

In order to determine which section direction input is to be reflected on which portion of the trajectory of the ball 306, in this first embodiment, a correspondence table is created that describes a horizontal distance for each movement time (i.e., for each frame) for the reference trajectory. FIG. 21 shows a non-limiting example correspondence table. As shown in FIG. 21, in the correspondence table, corresponding to the number of frames (hereinafter, referred to as "number of moving frames"), the horizontal distance $d_n$ (n is an integer equal to or larger than 1 (one)) after a moving start in a case where the ball 306 is moved on the reference trajectory is described. However, as described above, when hitting the ball 306, the reference trajectory is calculated by Equation 1 using the initial velocity $v_0$ and the launch angle θ (theta) of the ball 306, and the horizontal distance $d_n$ is the position x calculated according to Equation 2.

Figure 22:
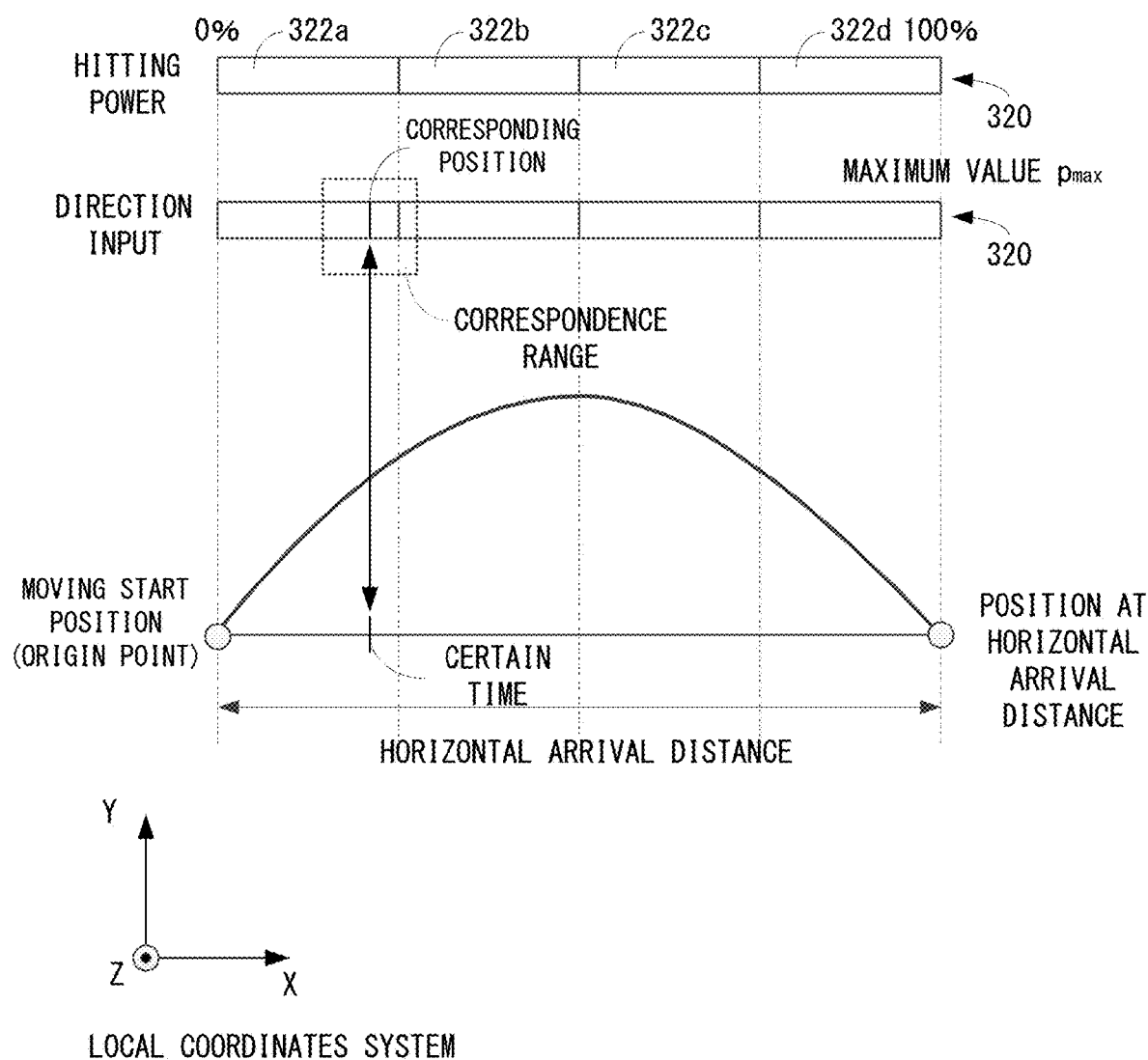
FIG. 22 is a view showing a non-limiting example method that determines a direction input affecting a trajectory of a ball in a certain time.

FIG. 22 shows an example of the reference trajectory based respectively on the movement gauge 320 when the hitting power is determined to 100%, the direction inputs for each of the operation sections 322a-322d detected in this case and the hitting power. Since the hitting power is 100% as shown in FIG. 22, a period of time that the second index image 330 is moved on the operation sections 322a-322d is the direction input period. Moreover, in FIG. 22, the movement gauge 320 is drawn sideways, and the reference trajectory is drawn corresponding to the movement gauge 320.

In addition, although a case where the hitting power is 100% is shown in FIG. 22, and a method of changing the trajectory of the ball 306 will be described using this FIG. 22, the same may be applied to a case where the hitting power is less than 100%.

As an example, it is conceivable that the horizontal distance $d_n$ of the reference trajectory at a certain time t (frame) is acquired from the correspondence table, a single section direction input is specified in a position corresponding to this horizontal distance $d_n$, and the trajectory of the ball 306 is changed by using this specified single section direction input. The horizontal distance $d_n$ of the reference trajectory at a certain time t is the horizontal distance $d_n$ corresponding to the number of moving frames from a moving start until the time t.

In addition, since this single section direction input is the direction input that a plurality of direction inputs are integrated into one for each of the operation sections 322a-322d as described above, especially, when straddling the operation section 322a-322d, there is a possibility that the trajectory of the ball 306 is not changed smoothly.

Therefore, in this first embodiment, as shown by a dotted line frame in FIG. 22, an average value of a plurality of section direction inputs for several frames to a dozen frames before and after with center on the section direction input at the position corresponding to the horizontal distance $d_n$ at a certain time t is calculated, and the position of the ball 306 in a next frame is calculated using the averaged section direction input. Accordingly, also in a case of straddling operation sections 322a-322d, the trajectory of the ball 306 can be changed more smoothly.

In this first embodiment, when the direction input period expires, a range of the number p of operation frames that effects on the trajectory of the ball 306 (hereinafter, referred to as "correspondence range") is determined for each horizontal distance $d_n$ (or the number n of moving frames) in the correspondence table. Then, when calculating the position of the ball 306 of a next frame, an average value of a plurality of section direction inputs included in the correspondence range that corresponds to the horizontal distance $d_n$ of the trajectory in the current frame is calculated.

However, the above-described method is an example, and should not be needed to be limited. In other embodiments, basically, the position of the ball 306 of the next frame is calculated using the section direction input of the position corresponding to the horizontal distance $d_n$ at a certain time t, only when an effect of one frame straddles the sections as such in a case where a start time of one frame corresponds to near the trailing end of the operation section 322a, 322b or 322c and an end time of this one frame corresponds to near the start of a next operation section 322b, 322c or 322d, depending on a ratio of time in one frame, a next position of the ball 306 may be calculated by using a section direction input obtained by combining the section direction inputs of two adjacent sections.

When calculating the position of the ball 306 of the next frame, a velocity vector of the ball 306 in the current frame and a two-dimensional vector on the average value of a plurality of section direction inputs included in the correspondence table corresponding to the horizontal distance $d_n$ of the reference trajectory in the current frame are synthesized with each other.

However, the velocity vector of the ball 306 is a movement direction and a movement amount of the ball 306 in the current frame. The movement direction is gradually changed according to the physical calculation of projectile motion with the launch direction of the ball 306 as the initial direction, and is also changed by the influence of the section direction input. Moreover, the movement amount is a value that the horizontal distance $d_n$ up to the current frame is subtracted from the horizontal distance $d_{n+1}$ up to the next frame. The horizontal distance is acquirable from the correspondence table shown in FIG. 21.

Figure 23A:
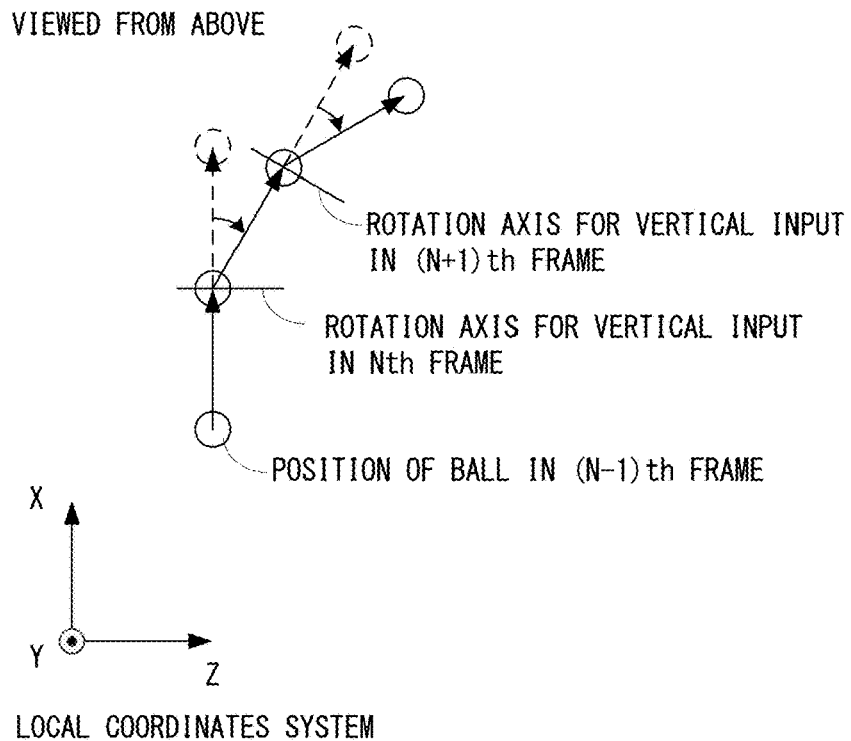
FIG. 23A is a view showing a non-limiting example method that rotates a velocity vector of a ball rightward.
Figure 23B:
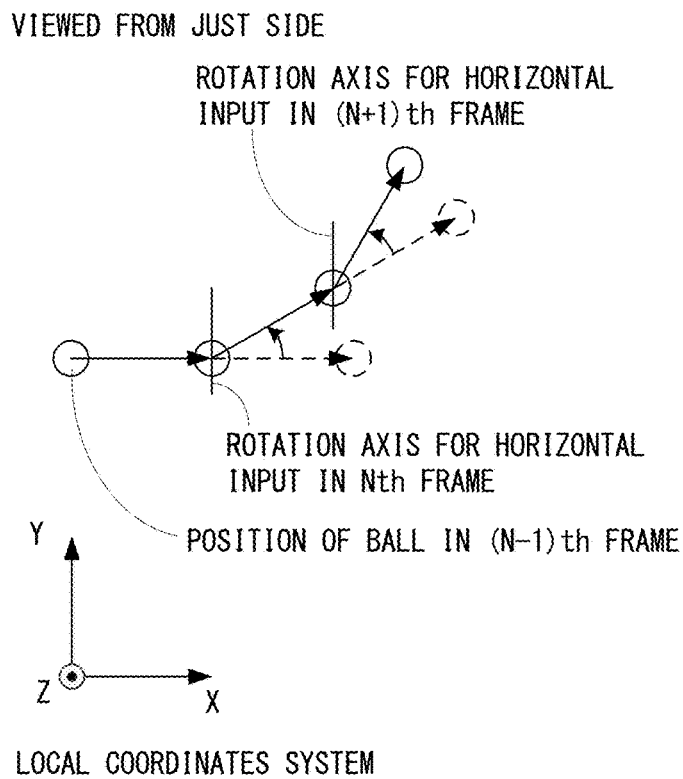
FIG. 23B is a view showing a non-limiting example method that rotates the velocity vector of the ball upward.

Moreover, in this first embodiment, as shown in FIG. 23A and FIG. 23B, the velocity vector is rotated for each of a horizontal (left and right) component and a vertical (up and down) component of the two-dimensional vector indicative of the averaged section direction input.

However, the movement of the ball 306 is calculated by the above-described local coordinates system, and FIG. 23A is a view that the virtual space of the local coordinates system is viewed from right above, and FIG. 23B is a view that the virtual space of the local coordinates system is viewed from just beside.

In addition, as shown in FIG. 23A and FIG. 23B, in the immediately before the frame N (i.e., the frame N−1), the velocity vector is parallel to a direction of an x axis of the local coordinates system, and intersects perpendicularly with each of a y axis and a z axis of the local coordinates system.

Moreover, in FIG. 23A and FIG. 23B, for simplicity, magnitudes of the velocity vectors in respective frames are made the same. Actually, the tilt amount of the analog stick 32, that is, the strength of the direction input is also taken into consideration.

Furthermore, a vertical (up and down) input rotation axis shown in FIG. 23A corresponds to a rotation axis in a case of tilting the analog stick 32 in the vertical direction, and a horizontal (left and right) input rotation axis shown in FIG. 23B corresponds to a rotation axis in a case of tilting the analog stick 32 to the horizontal direction.

As shown in FIG. 23A, the velocity vector of the frame N is rotated around the horizontal input rotation axis perpendicular the vertical input rotation axis with respect to the last (frame N−1) velocity vector according to the direction input of the horizontal direction. An example shown in FIG. 23A is rotated about 30 degrees rightward centering on the horizontal input rotation axis. Moreover, as shown in FIG. 23A, when an orientation of the movement vector of the frame N+1 is to be determined by the averaged section direction input, the horizontal input rotation axis is parallel to the y axis of the local coordinates system. Although detailed description is omitted, the velocity vector of the next frame N+1 is rotated about 30 degrees rightward centering on the horizontal input rotation axis with respect to a direction of the velocity vector of the frame N.

Moreover, as shown in FIG. 23B, the velocity vector of the frame N+1 is rotated around the vertical input rotation axis perpendicular the horizontal input rotation axis with respect to the last velocity vector according to the direction input of the vertical direction. In an example shown in FIG. 23B, the velocity vector of the next frame N+1 is rotated about 30 degrees upward centering on the vertical input rotation axis. Moreover, as shown in FIG. 23B, when an orientation of the movement vector of the frame N+1 is to be determined by a vertical component of the averaged section direction input, the vertical input rotation axis is parallel to the z axis of the local coordinates system. Although detailed description is omitted, the velocity vector of the next frame N+1 is rotated about 30 degrees upward centering on the vertical input rotation axis with respect to a direction of the velocity vector of the frame N.

Thus, the movement vector is rotated around the horizontal input rotation axis and the vertical input rotation axis, respectively using the two-dimensional vector for the averaged section direction input, whereby the position of the ball 306 of the next frame N+1 in a local coordinate can be calculated.

In addition, when displaying a game image, the position of the ball 306 calculated in the local coordinates system is converted into the position of the ball 306 of a world coordinates system.

Moreover, change of the trajectory by the direction input is performed up to the horizontal arrival position on the reference trajectory, that is, up to a maximum value of the number of moving frames ($n_{max}$) of in the correspondence table.

However, by the time that the number of moving frames progresses up to the maximum value of the conversion table, if the ball 306 is cupped-in, if the ball collides with the ground object (e.g., an object of fairway, bunker, rough, water hazard or OB (out of bounds), if the ball collides with the on-ground object (e.g., an object of tree, building or wall), or if the ball collides with the aerial object (e.g., an object of airship, balloon or block floating in the air), the change of the trajectory by the direction input is ended.

Moreover, even when the number of moving frames progresses up to the maximum value of the correspondence table, if the ball 306 is not cupped-in, or if the ball does not collide the object of the ground, the object arranged on the ground or the object in the air, the ball 306 is moved until it collides with any object in a direction of the velocity vector calculated at last while being affected by the influence of gravity in the virtual space.

However, the influence of air resistance in the virtual space and lift associated with ball spin may also be taken into consideration.

When the ball 306 collides with the fairway object or the rough object, processing such that the ball 306 rolls and further stops after the ball 306 bounces by the fairway object or the rough object is executed. However, the processing of bouncing or rolling is changed according to a state of the lie. Moreover, when the ball 306 collides with the water hazard object and the OB object, processing such that the ball 306 stops at the time of collision with the water hazard object and the OB object, and then, the ball 306 is automatically moved in a position for hitting after applying penalty is executed. Furthermore, if the ball 306 collides with the bunker object, processing such that the ball 306 sinks into sand as it is and stops is executed, or processing such that the ball stops after bouncing and rolling is executed. Moreover, when the ball 306 collides with the object placed on the ground, it bounces off, moves in a different direction, or falls on the spot. When the ball 306 bounces or moves in a different direction, thereafter, the ball 306 collides with the ground object or the water hazard object as described above.

Hereinafter, these processing will be collectively referred to as "movement stop processing".

Moreover, until the ball 306 is cupped-in, the player character 302 is automatically moved to a position for hitting the ball 306 next (hereinafter, referred as to "next hitting position"), and is placed in an address state. That is, the parameter determination screen 300 for next moving the ball 306 is displayed on the display 12. However, the player character 302 may be moved according to an operation of the player to the next hitting position. In this case, an item may be acquirable during movement.

If the ball 306 is cupped-in, the score of the hole that the ball 306 is cupped-in is calculated and recorded. Then, when there is a next hole, the player character 302 is automatically moved to a teeing area of the next hole. When there is no next hole, a total score of the player character 302 is calculated and recorded, and the golf game about the golf course played this time is completed.

In addition, when playing with a further player(s), processing as described above is executed also for the further player(s). However, an order of hitting is determined according to the rule of golf, and the golf game is advanced.

Figure 24:
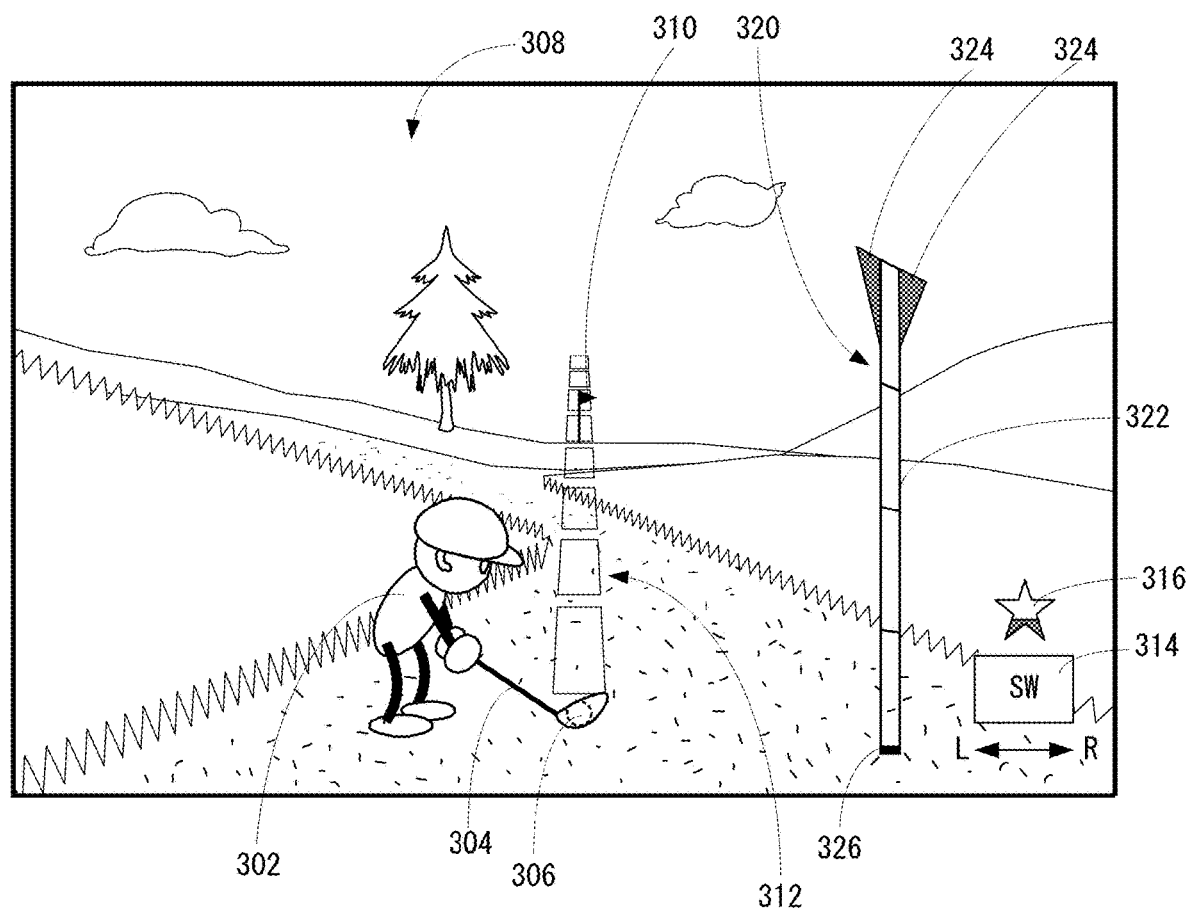
FIG. 24 is a view showing a non-limiting eleventh example parameter determination screen.

Moreover, FIG. 24 shows a non-limiting example parameter determination screen 300 in a case of hitting the ball 306 existing in the bunker. On the parameter determination screen 300 shown in FIG. 24, length of the movement gauge 320 is set to be shorter in comparison with a case of hitting the ball 306 existing on the fairway. In an example shown in FIG. 24, the length is set to 80% of length of the movement gauge 320 of other parameter determination screens 300 shown in the FIG. 8 etc. This is because, in the golf of general sports, a bunker shot or sand shot has a shorter flight distance than hitting a ball 306 on the fairway. Therefore, although illustration is omitted, in a case of so-called flied egg lie, the movement gauge 320 is set to the length 50% of length of the movement gauge 320 of other parameter determination screens 300 shown in the FIG. 8 etc.

However, when shortening the length of the movement gauge 320, a whole of the movement gauge 320 is reduced, and accordingly, the movement speed V1 of the first index image 326 and the movement speed V2 of the second index image 330 are decreased in proportion to the length of the movement gauge 320. Therefore, the direction input period is not shortened due to shortening the movement gauge 320.

Although illustration is omitted, in a case of hitting the ball 306 existing in the rough, the length of the movement gauge 320 is shortened according to deepness of the rough. In other embodiments, in also a case where weight of the ball 306 used by the player character 302 is increased or the gravity acceleration g in the virtual space is increased, by an operation of the player or another player or occurrence of a predetermined event, the length of the movement gauge 320 is shortened.

However, in other embodiments, when hitting the ball 306 from a position that difficulty of hitting is relatively high, such as a bunker or rough, it may be possible not to change the movement speed V1 of the first index image 326 and the movement speed V2 of the second index image 330 even if the length of the movement gauge 320 is shortened. In such a case, by shortening a period of time capable of determining the hitting power and the direction input period, difficulty of hitting becomes high and thus difficulty of an operation is increased.

Moreover, in a case where weight of the ball 306 used by the player character 302 is decreased or the gravity acceleration g in the virtual space is decreased, by an operation of the player or another player or occurrence of a predetermined event, the length of the movement gauge 320 is increased. Therefore, even if the hitting power is the same as that in a case where the length of the movement gauge 320 is not made to be long, the flight distance is made be longer. In this case, although the length of the movement gauge 320 becomes long, similar to a case where the length is shortened, a whole of the movement gauge 320 is expanded, and accordingly, the movement speed V1 of the first index image 326 and the movement speed V2 of the second index image 330 are increased in proportion to the length of the movement gauge 320. Therefore, the direction input period does not become long.

Although the length of the movement gauge 320 is thus changed, this is the same in a case where the movement gauge 320 is displayed by the 3D display. Moreover, when the movement gauge 320 is displayed to be curved, the length of the movement gauge 320 is changed similarly.

Moreover, in the actual golf, a bunk shot is generally easy to come out a missed shot. That is, due to the high difficulty of hitting, the risk area 324 is relatively large even if the club 304 to be used is an iron or a wedge. In an example shown in FIG. 24, although the club 304 is a sand wedge (SW), the risk area 324 is formed from the hitting power of 85% approximately. That is, compared with a case of hitting from the fairway, for example, the risk area 324 is formed from a portion corresponding to a lower hitting power of the movement gauge 320. In addition, in other embodiments, instead of or in addition to such a setting of the risk area 324, the breadth of the risk area 324 may be made wider.

Figure 25:
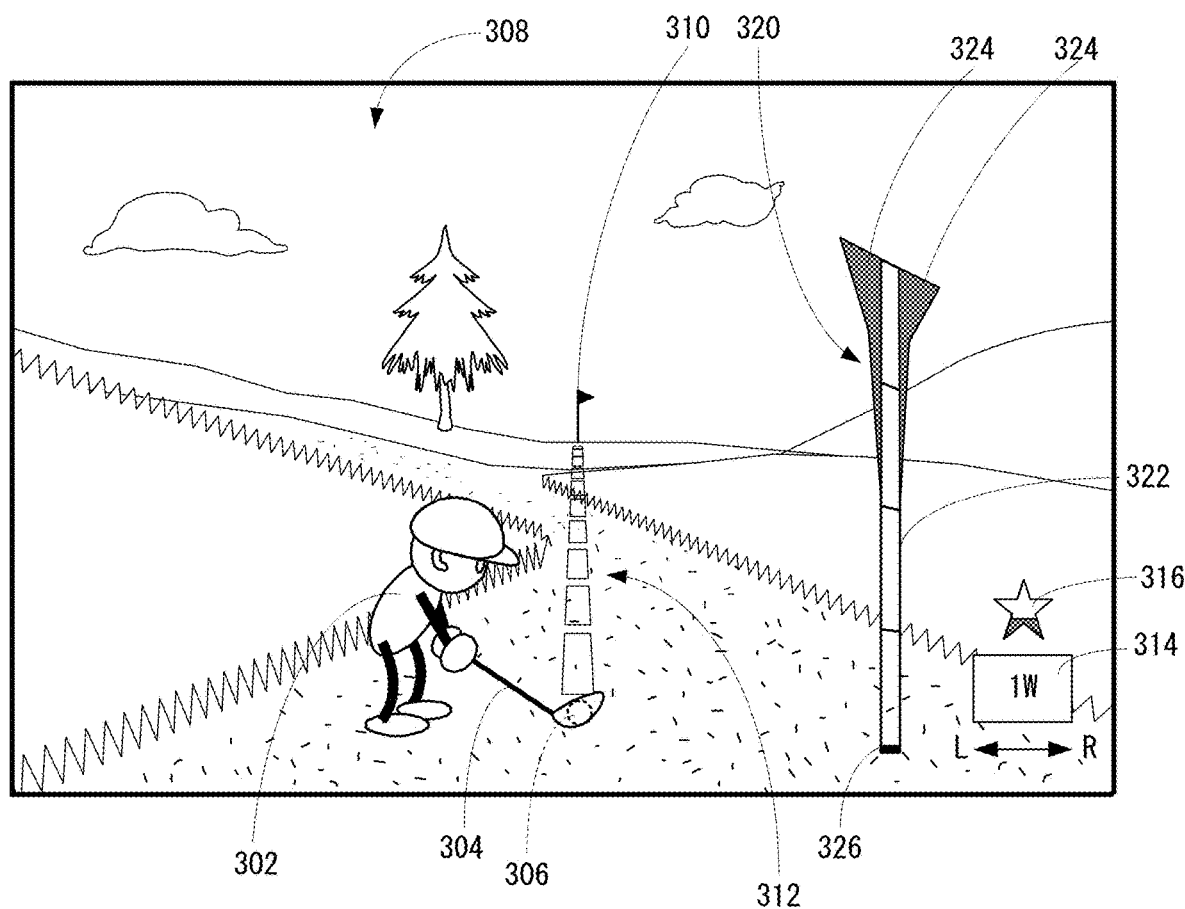
FIG. 25 is a view showing a non-limiting twelfth example parameter determination screen.

FIG. 25 shows a non-limiting example parameter determination screen 300 at the time of changing the club 304 to 1 W in the same situation as the parameter determination screen 300 shown in FIG. 24. As for the bunker shot, since when using the 1 W, the difficulty of hitting is higher than a case of using an iron or a wedge, the risk area 324 is further enlarged rather than a case shown in FIG. 24. In an example shown in FIG. 25, the risk area 324 is formed from near 50% hitting power, is increased as the hitting power is increased, and the degree of increase is made larger from near 85% hitting power.

Figure 26:
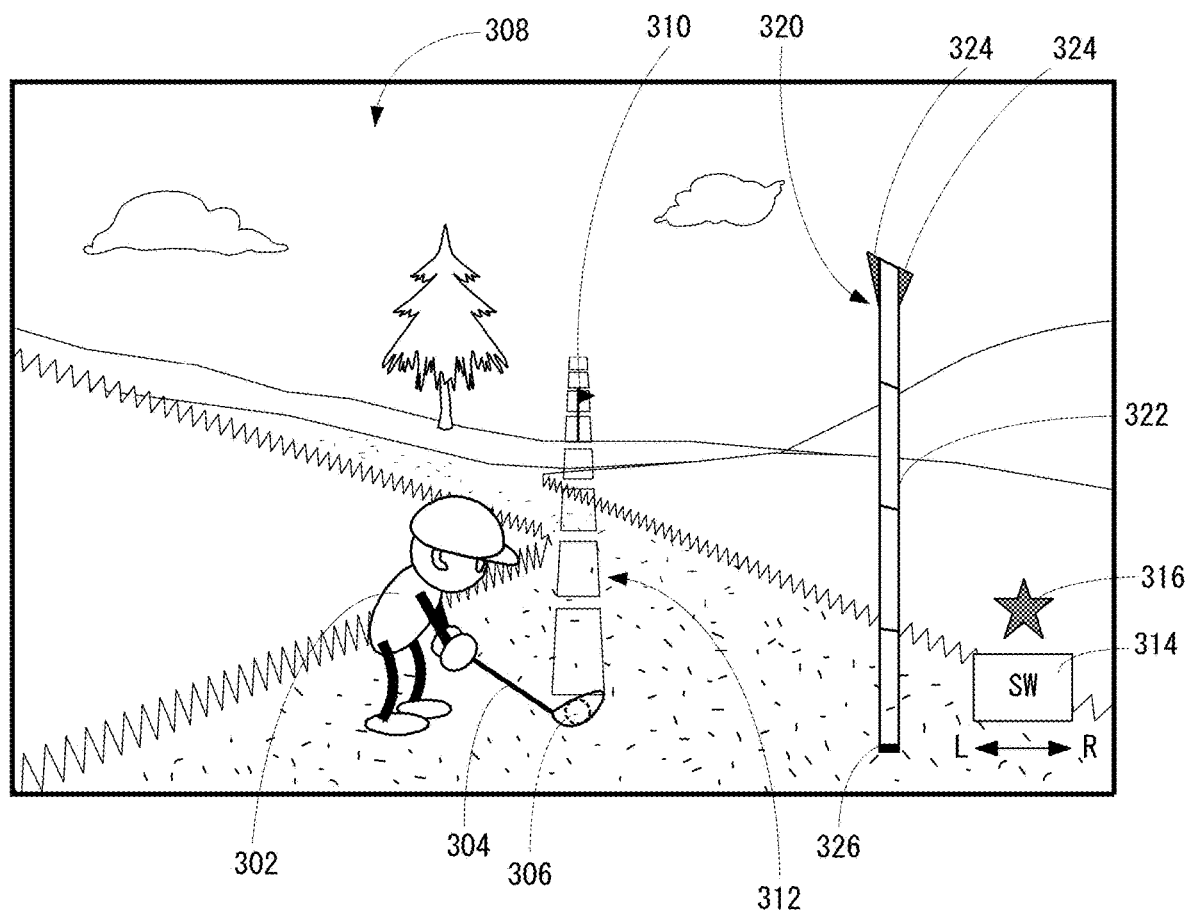
FIG. 26 is a view showing a non-limiting thirteenth example parameter determination screen.

FIG. 26 shows a non-limiting example parameter determination screen 300 in a state that it is selected to increase the ability of the club 304 to be used when the ability increase parameter reaches the maximum value in the same situation as the parameter determination screen 300 shown in FIG. 24. If the player depresses the Y button 56 when the ability increase parameter reaches the maximum value, it is selected to increase the ability of the club 304 to be used. Then, as shown in FIG. 26, the risk area 324 is reduced. As an example, the length of the vertical direction and the length of the horizontal direction of the risk area 324 are halved, respectively. Thus, if the ability of the club 304 to be used is increased, the risk area 324 is reduced, so that the ball 306 is not significantly deviated. That is, the deviation amount is lessened and directionality when the ball 306 is moved improved.

Although illustration is omitted, as described above, if the player character 302 hits the ball 306 in a state that the ability of the club 304 to be used is increased, the ability increase parameter is made to a minimum value and the color of the star-shaped ability gauge 316 is erased.

In addition, in this first embodiment, the deviation amount is decreased when the ability of the club 304 to be used is increased, but it does not need to be limited to this. In another example, the flight distance of the club 304 to be used may be made longer. Alternatively, the flight distance may be increased or the deviation amount may be decreased, depending on the type of club 304 to be used.

Moreover, in this first embodiment, although it is described "The ability of the club 304 to be used is increased", since the flight distance is increased or the deviation amount is decreased, it is able also to say that the skill of hitting of the player character 302 is increased. Therefore, dependent on the type of player character 302 to be used, the flight distance may be made longer or the deviation amount may be made to be decreased.

Figure 27:
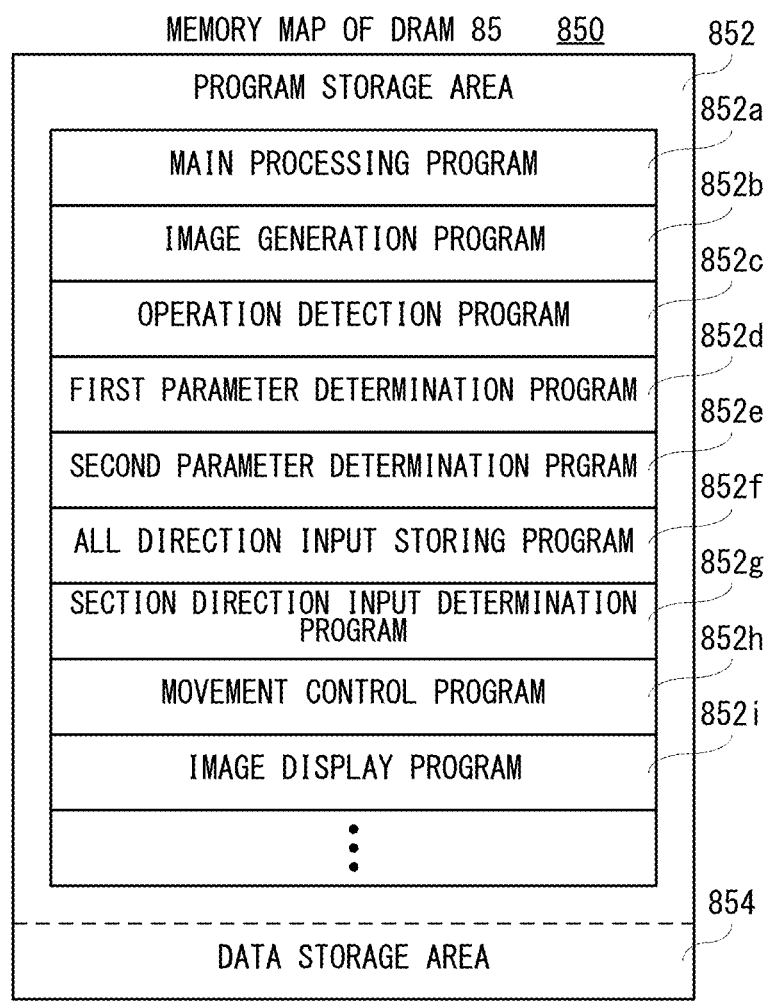
FIG. 27 is a view showing a non-limiting example memory map of a DRAM of a main body apparatus shown in FIG. 6.

FIG. 27 is a view showing a non-limiting example memory map 850 of the DRAM 85 shown in FIG. 6. As shown in FIG. 27, the DRAM 85 includes a program storage area 852 and a data storage area 854. The program storage area 852 is stored with a game application program (i.e., a game program of golf game). As shown in FIG. 27, the game program includes a main processing program 852*a*, an image generation program 852*b*, an operation detection program 852*c*, a first parameter determination program 852*d*, a second parameter determination program 852*e*, an all direction input storing program 852*f*, a section direction input determination program 852*g*, a movement control program 852*h*, an image display program 852*i*, etc. However, a function of displaying images such as a game image is a function that the main body apparatus 2 is provided with. Therefore, the image display program 852*i* is not included in the game program.

Although detailed description is omitted, at a proper timing after a power of the main body apparatus 2 is turned on, a part or all of each of the programs 852*a*-852*i* is read from the flash memory 84 and/or a storage medium attached to the slot 23 so as to be stored in the DRAM 85. However, a part or all of each of the programs 852*a*-852*i* may be acquired from other computers capable of performing communication with the main body apparatus 2.

The main processing program 852*a* is a program for executing overall game processing of a virtual golf game of this first embodiment. The image generation program 852*b* is a program for generating, using image generation data 854*b* described later, display image data corresponding to various kinds of images such as a game image. The operation detection program 852*c* is a program for acquiring (receiving) the operation data 854*a* from the left controller 3 or/and the right controller 4 and the operation data 854*a* from a further controller so as to store in the data storage area 854 in an identifiable manner Here, the further controller is a controller equivalent to the left controller 3 or the right controller 4, or a controller equivalent to a controller that the left controller 3 and the right controller 4 are combined with each other.

The first parameter determination program 852*d* is a program for changing the club 304 to be used, for changing the launch direction in the horizontal direction of the ball 306, for changing a display manner of the movement gauge 320, and for increasing the ability of the club 304 to be used, based on an operation of the player, prior to a start of a second parameter determination operation. However, it is possible to cancel increasing the ability of the club 304 to be used, prior to a start of the second parameter determination operation. The second parameter determination a program 852*e* is a program for determining the hitting power of the ball 306 and determining a change direction to the reference trajectory of the ball 306 based on an operation of the player, and for determining deviation of the ball 306 irrespective of an operation of the player.

The all direction input storing program 852*f* is a program for storing the direction inputs detected in the direction input period for each frame, and for rewriting the section direction input that the direction inputs detected in each frame according to the section direction input determination program 852*g* described later are unified as the direction input of corresponding operation sections 322*a*-322*d* for each frame.

The section direction input determination program 852*g* is a program for determining the section direction input that the direction inputs detected in each frame are unified for each of the operation sections 322*a*-322*d*, when the predetermined number of the detection input are detected or when the second index image 330 reaches the trailing end of each of the operation sections 322*a*-322*d*.

The movement control program 852*h* is a program for controlling movement of the ball 306. The trajectory of the ball 306 affected by the deviation and the temporal direction input using the reference trajectory that is determined based on the type of the club 304 and the hitting power, and the ball 306 is moved according to the determined trajectory. However, in this first embodiment, the position of the ball 306 after being moved is calculated for each frame. In another example, a whole of trajectory may be calculated prior to the ball 306 starts moving, and the ball may be moved according to the calculated trajectory.

The image display program 852*i* is a program for outputting to a display device the display image data generated according to the image generation program 852*b*. Therefore, the images corresponding to the display image data, that is, the parameter determination screen 300, etc. are displayed on the display device such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, as shown in FIG. 28, the data storage area 854 is stored with the operation data 854*a*, the image generation data 854*b*, character data 854*c*, game data 854*d*, launch direction data 854*e*, curve information data 854*f*, display target object data 854*g*, height information data 854*h*, hitting power data 854*i*, reference trajectory data 854*j*, deviation data 854*k*, direction input data 854*m*, strength data 854*n*, correspondence table data 854*p*, correspondence range data 854*q*, ball position data 854*r* and highlighting target data 854*s*. Moreover, a 3D flag 854*t*, a first parameter determination flag 854*u*, a second parameter determination flag 854*v* and a ball movement flag 854*w* are stored in the data storage area 854.

The operation data 854*a* is operation data received from the left controller 3 or/and the right controller 4 and operation data received from a further controller(s). In this first embodiment, when the main body apparatus 2 receives the operation data from two or more controllers out of the left controller 3, the right controller 4 and the further controller, the main body apparatus 2 stores the operation data 854*a* with classifying into the respective controllers.

In addition, when a plurality of human players play the golf game, controllers used by the players are associated with the plurality of players or plurality of player characters, respectively, and therefore, the operation data 854*a* is stored in the data storage area 854 in a manner that the player or player character is identifiable.

Moreover, as for the competitive partner character operated by the computer (processor 81), as an example, the operation data 854*a* that is generated by the computer (processor 81) is stored in the data storage area 854.

The image generation data 854*b* is data required for generating the display image data, such as polygon data and texture data. The character data 854*c* is data concerning on the characters that play the golf game of this first embodiment (see FIG. 29). The character data 854*c* will be described in detail later. The game data 854*d* is data concerning on a middle or result of the golf game of this first embodiment, including play data 900 described later.

The launch direction data 854*e* is data on the launch direction of the ball 306. As described above, the launch direction of the ball 306 includes the horizontal (left and right) direction and the vertical (up and down) direction. At the beginning of displaying the parameter determination screen 300, a direction of a straight line connecting the current position of the ball 306 and the pin 310 (cup) or the fairway closer than the pin 310 is determined as the launch direction in the horizontal direction, and the player can change this launch direction by a strategy. However, the launch direction does not have to be changed.

The curve information data 854*f* is data on a direction that the ball 306 curves and a magnitude that the ball 306 curves (i.e., curve information), which are determined based on the slope of the current position of the ball 306 and the launch direction. The display target object data 854*g* is data on identification information of each of display target objects existing between the current position of the ball 306 and the horizontal arrival position, and a straight-line distance from the current position of the ball 306 to each of the display target objects. The height information data 854*h* is data on change in the height from the current position of the ball 306 to the position of the horizontal arrival distance in the launch direction (i.e., height information) when displaying the movement gauge 320 by the 3D display.

The hitting power data 854*i* is data on a value (%) of the hitting power determined by an operation of the player. The reference trajectory data 854*j* is data on the reference trajectory of the ball 306, and the reference trajectory is determined based on the current position of the ball 306, the launch direction, the launch angle by the selected club 304 and the initial velocity $v_0$ of the ball 306 according to the determined hitting power. However, when displaying the trajectory prediction image 312 prior to the second parameter determination operation, the hitting power is set to 100% when calculating a reference trajectory. The deviation data 854*k* is data on a direction of deviation and a deviation amount that are determined at random.

The direction input data 854*m* is data of the direction input detected for each frame during the direction input period in the second parameter determination operation, and after the section direction input is detected, the direction input data detected for each frame is rewritten with the calculated section direction input for each of the operation sections 322*a*-322*d*. However, each direction input and each section direction input indicate a tilt direction and a tilt amount of the analog stick 32. The strength data 854*n* is data on strength of the section direction input for each of the operation sections 322*a*-322*d*. As described above, the strength of the section direction input is classified into four (4) steps according to the magnitude of the tilt amount of the section direction input.

The correspondence table data 854*p* is data on the correspondence table as shown in FIG. 21. As described above, in the correspondence table, as to the reference trajectory, the horizontal distance $d_n$ is indicated corresponding to the number n of moving frames. The correspondence range data 854*q* is data on the correspondence range (i.e., a range of the number p of the operation frames) determined for each horizontal distance $d_n$ of the correspondence table.

The ball position data 854*r* is coordinates data of the current position (in this first embodiment, three-dimensional position) of the ball 306 in the virtual space. The highlighting target data 854*s* is data indicative of the operation section 322*a*, 322*b*, 322*c* or 322*d* to be highlighted and its arrow image 332 in the movement gauge 320.

The 3D flag 854*t* is a flag for determining whether the movement gauge 320 is to be displayed by the 3D display. When displaying the movement gauge 320 by the 3D display, the 3D flag 854*t* is turned on, and when displaying the movement gauge 320 by the 2D display, the 3D flag 854*t* is turned off.

The first parameter determination flag 854*u* is a flag for determining whether the first parameter is to be determined. When performing the first parameter determination operation, the first parameter determination flag 854*u* is turned on, and when the second parameter determination operation is started, the first parameter determination flag 854*u* is turned off.

The second parameter determination flag 854*v* is a flag for determining whether the second parameter is to be determined. When performing the second parameter determination operation, the second parameter determination flag 854*v* is turned on, and the second parameter determination flag 854*v* is turned off when the second parameter determination operation is ended and thus the deviation is determined.

The ball movement flag 854*w* is a flag for determining whether the ball 306 is to be moved. When hitting the ball 306, the ball movement flag 854*w* is turned on, and when the movement of the ball 306 is stopped, the ball movement flag 854*w* is turned off.

Although illustration is omitted, the data storage area 854 is stored with other data required for executing the golf game, and is provided with other flags and timer(s) (counter (s)) required for executing the golf game.

Figure 29:
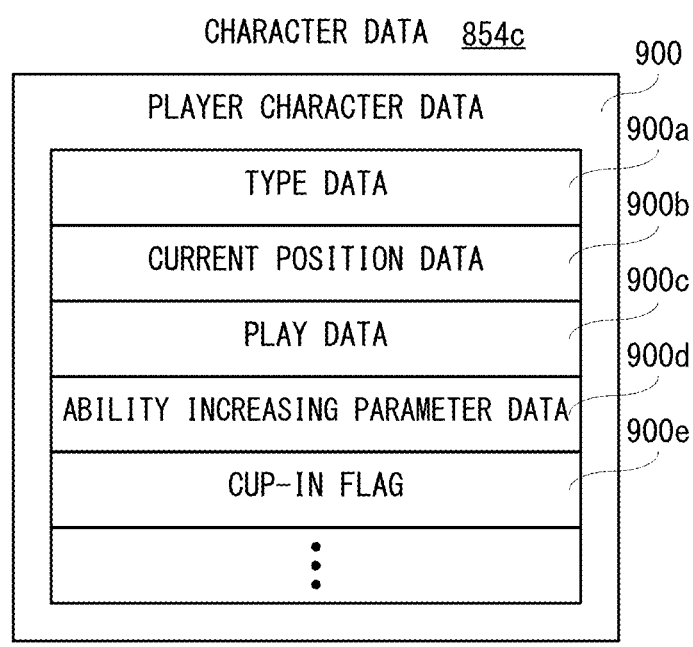
FIG. 29 is a view showing non-limiting example specific contents of character data shown in FIG. 28.

FIG. 29 is a view showing non-limiting example specific contents of the character data 854*c* shown in FIG. 28. As shown in FIG. 29, the character data 854*c* is data concerning on the player character 302 and a competitive partner character(s). Since a case where there is no competitive partner character is described in this first embodiment, in FIG. 29, the character data 854*c* includes the player character data 900.

In addition, the contents of character data of each of one or more competitive partner are the same or similar to the player character data 900.

As shown in FIG. 29, the player character data 900 includes type data 900*a*, current position data 900*b*, play data 900*c*, ability increase parameter data 900*d*, etc. Moreover, the player character data 900 includes a cup-in flag 900*e*.

The type data 900*a* is data of a type of the player character 302, and is data concerning on identification information identifying the character selected by the player. The current position data 900*b* is coordinates data of a current position (in this first embodiment, three-dimensional position) of the player character 302 in the virtual space.

The play data 900*c* is data concerning on the player character 302 in a case of playing the golf game. As an example, in a case of a stroke play, as the play data 900*c*, data concerning on the number of the strokes that are required from a tee shot up to a cup-in for each hole and a total number of strokes up to a current hole are stored.

The ability increase parameter data 900*d* is data of a numerical value of the ability increase parameter of the player character 302. The cup-in flag 900e is a flag for determining whether the ball 306 of the player character 302 is cupped-in. In this first embodiment, when the ball 306 is cupped-in, the cup-in flag 900e is turned on, and when moving to a next hitting position, the cup-in flag 900e is turned off.

Figure 30:
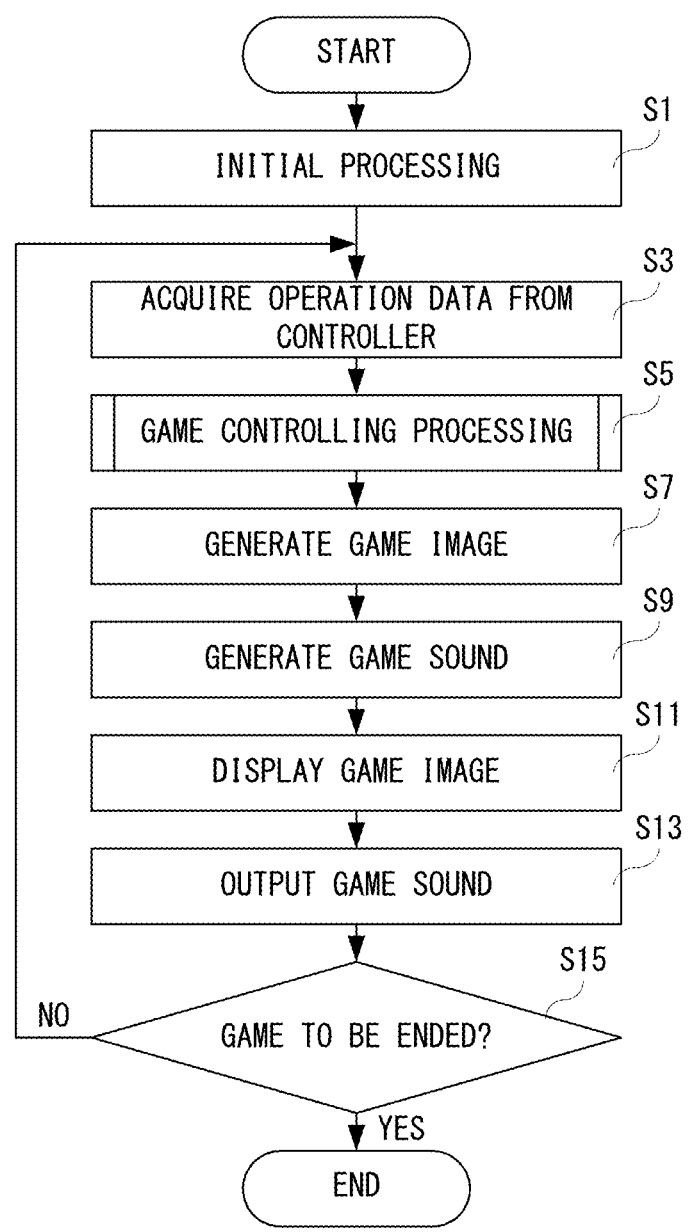
FIG. 30 is a flowchart showing non-limiting example overall game processing of a processor of the main body apparatus shown in FIG. 6.
Figure 31:
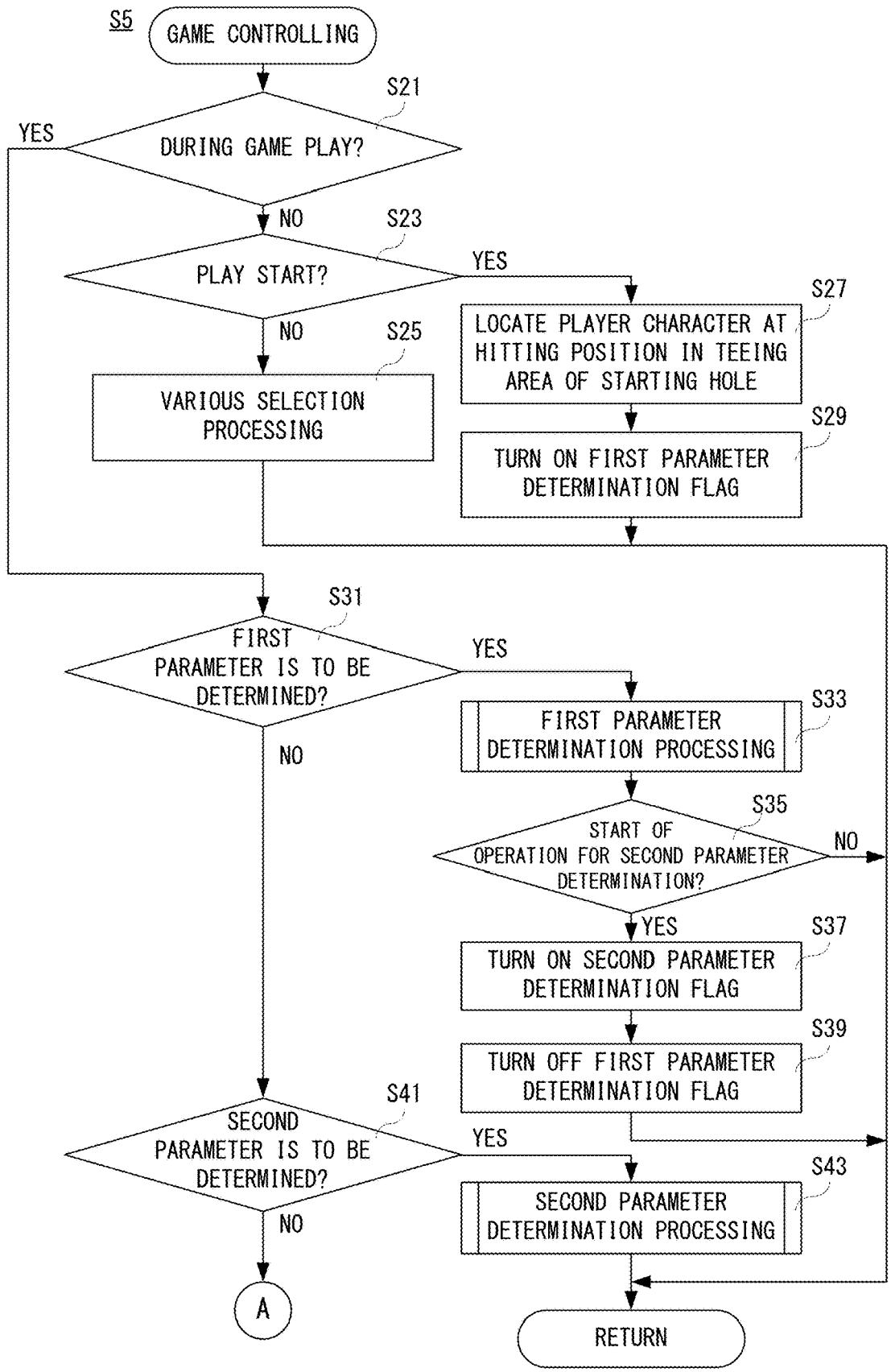
FIG. 31 is a flowchart showing a part of non-limiting example game controlling processing shown in FIG. 30.
Figure 32:
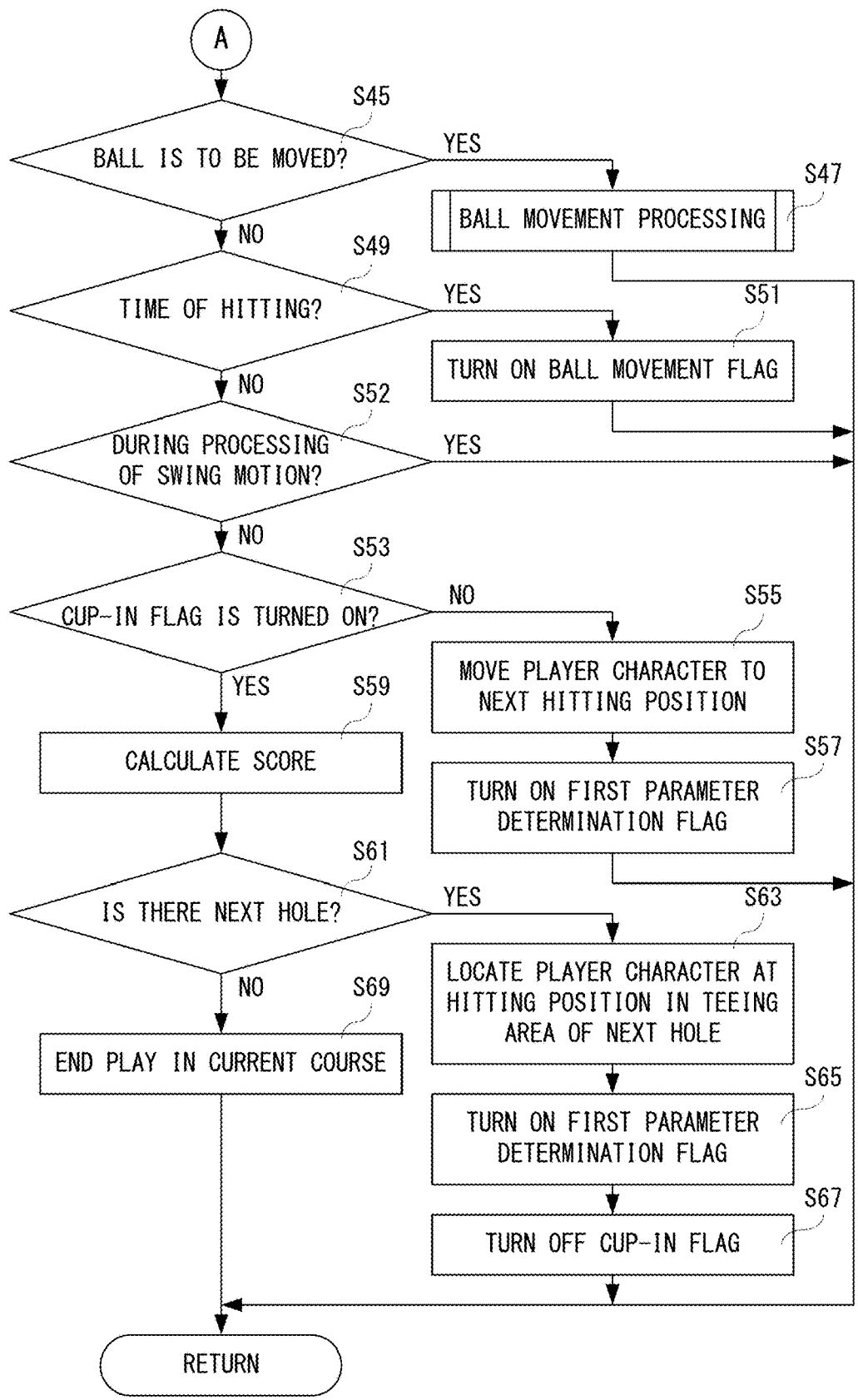
FIG. 32 is a flowchart showing the other part of the non-limiting example game controlling processing shown in FIG. 30, following FIG. 31.
Figure 33:
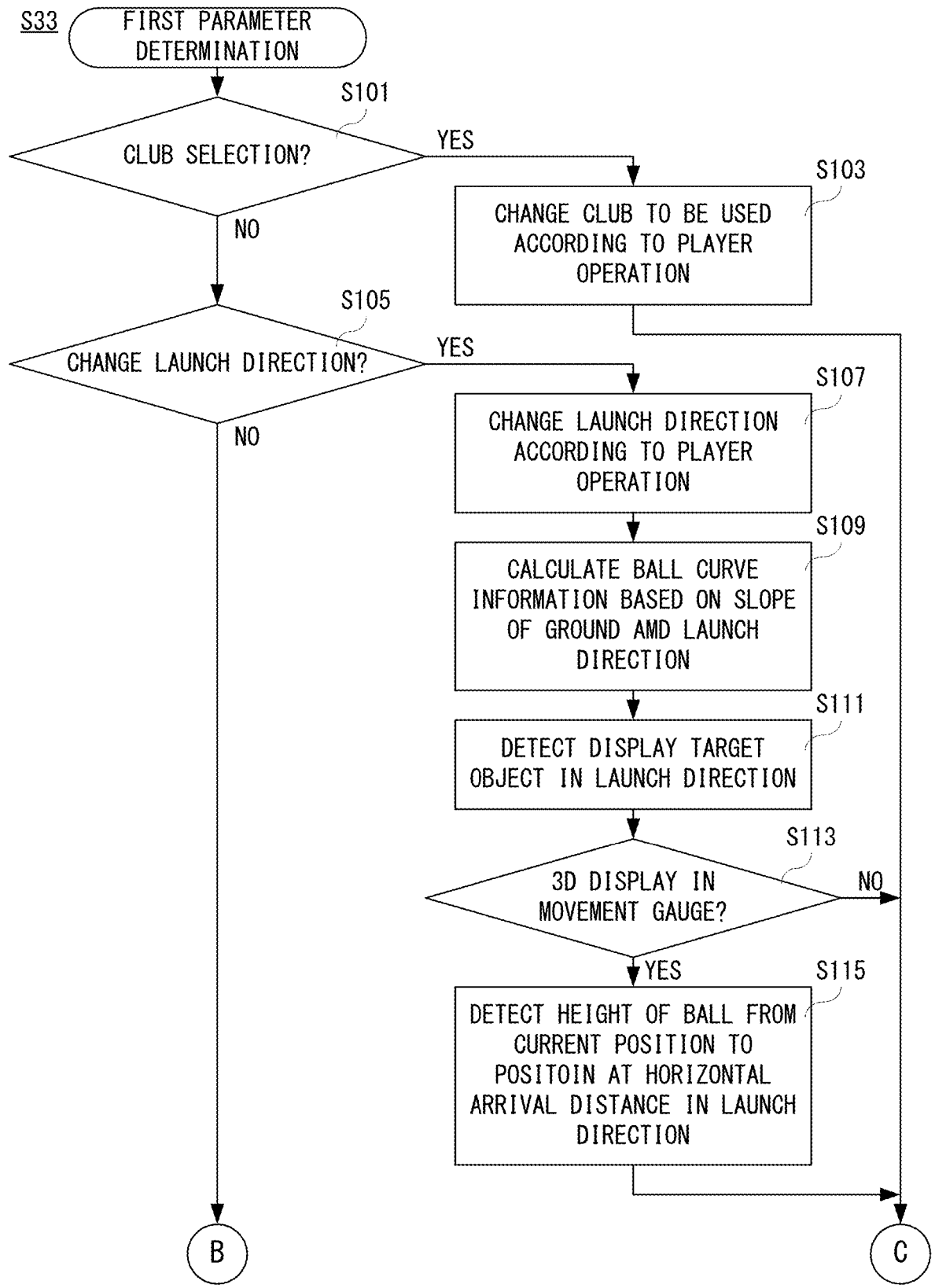
FIG. 33 is a flowchart showing a part of non-limiting example first parameter determination processing shown in FIG. 31.
Figure 34:
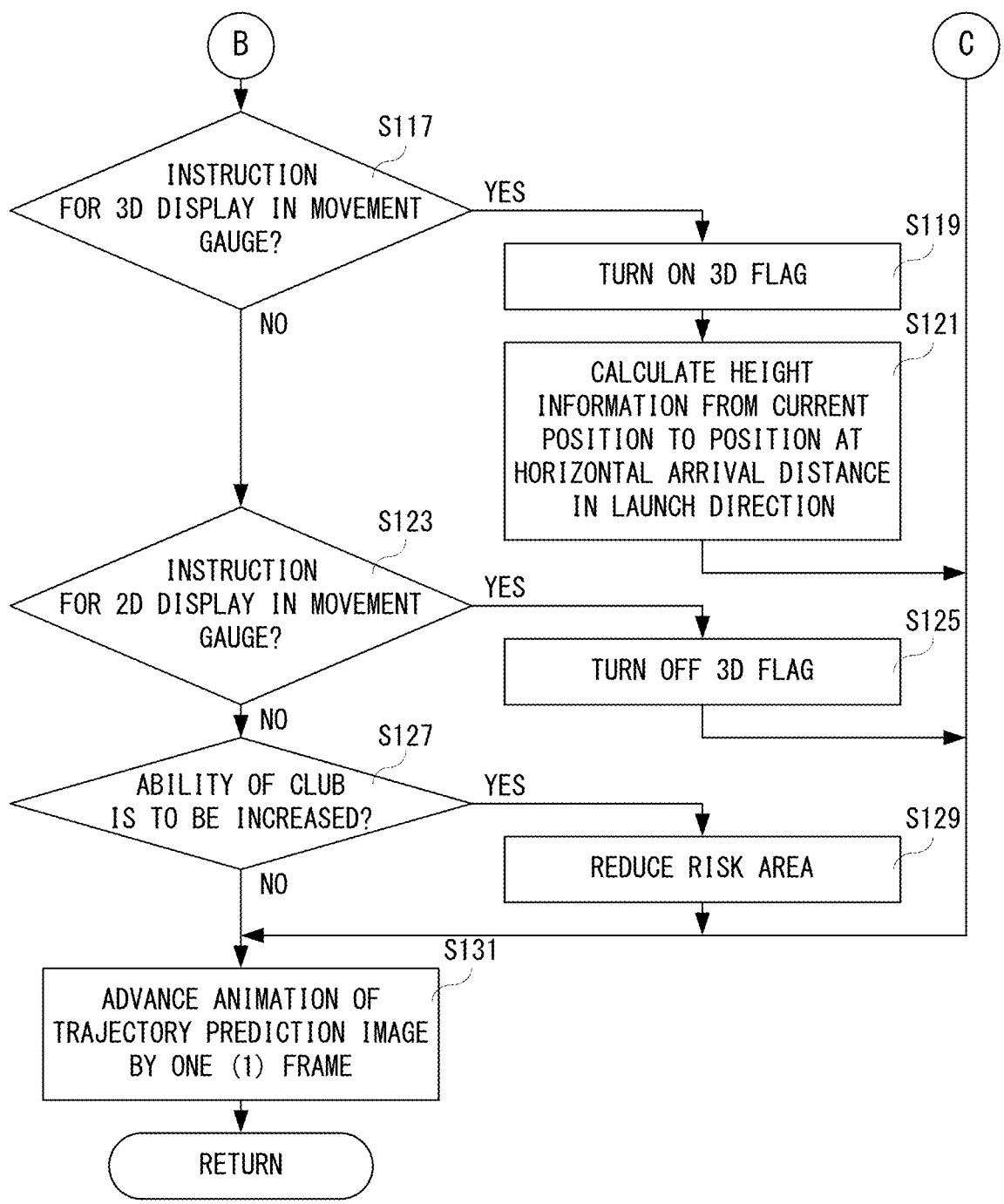
FIG. 34 is another part of the non-limiting example first parameter determination processing shown in FIG. 31, following FIG. 33.
Figure 35:
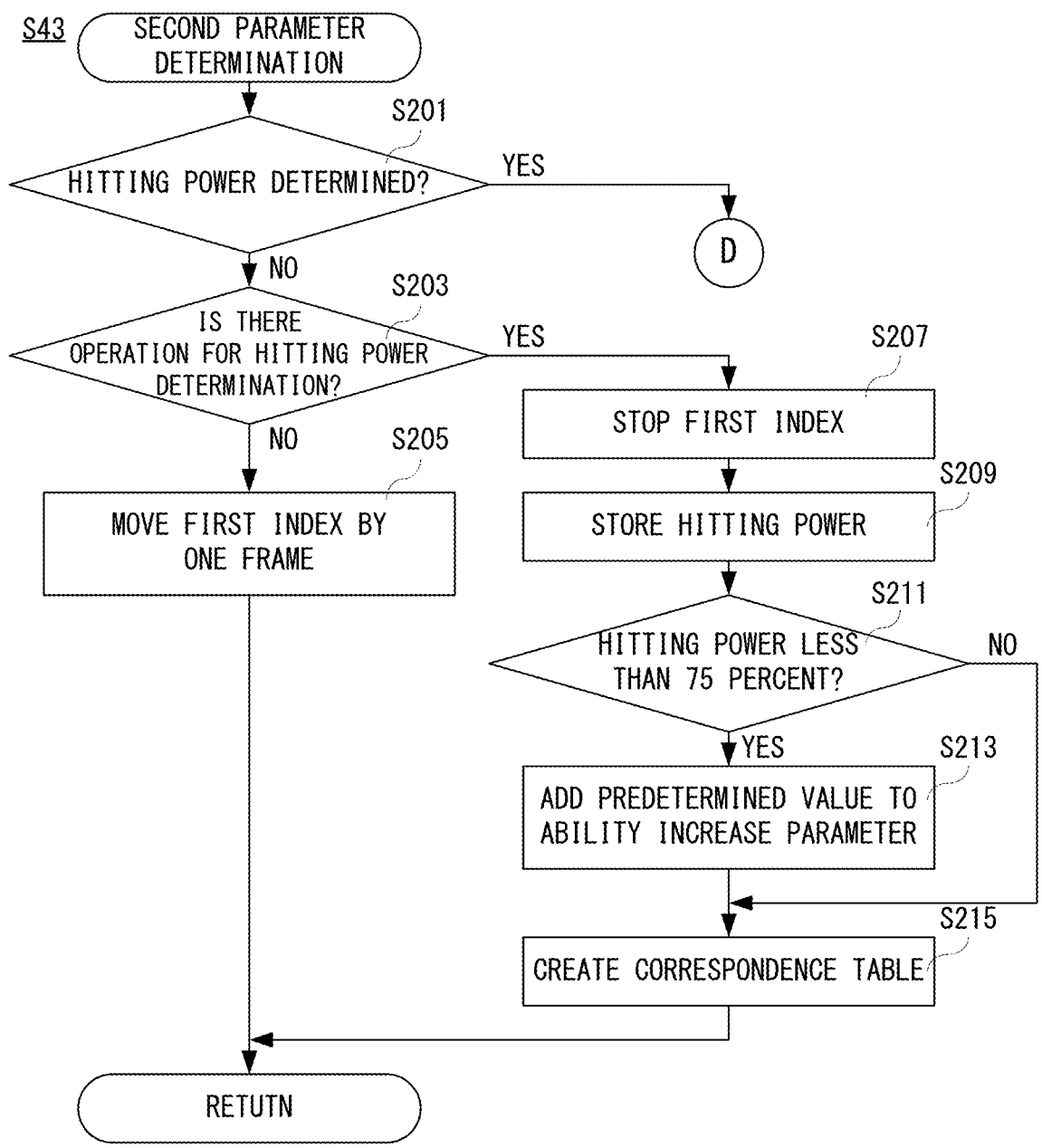
FIG. 35 is a flowchart showing a part of non-limiting example second parameter determination processing shown in FIG. 31.
Figure 36:
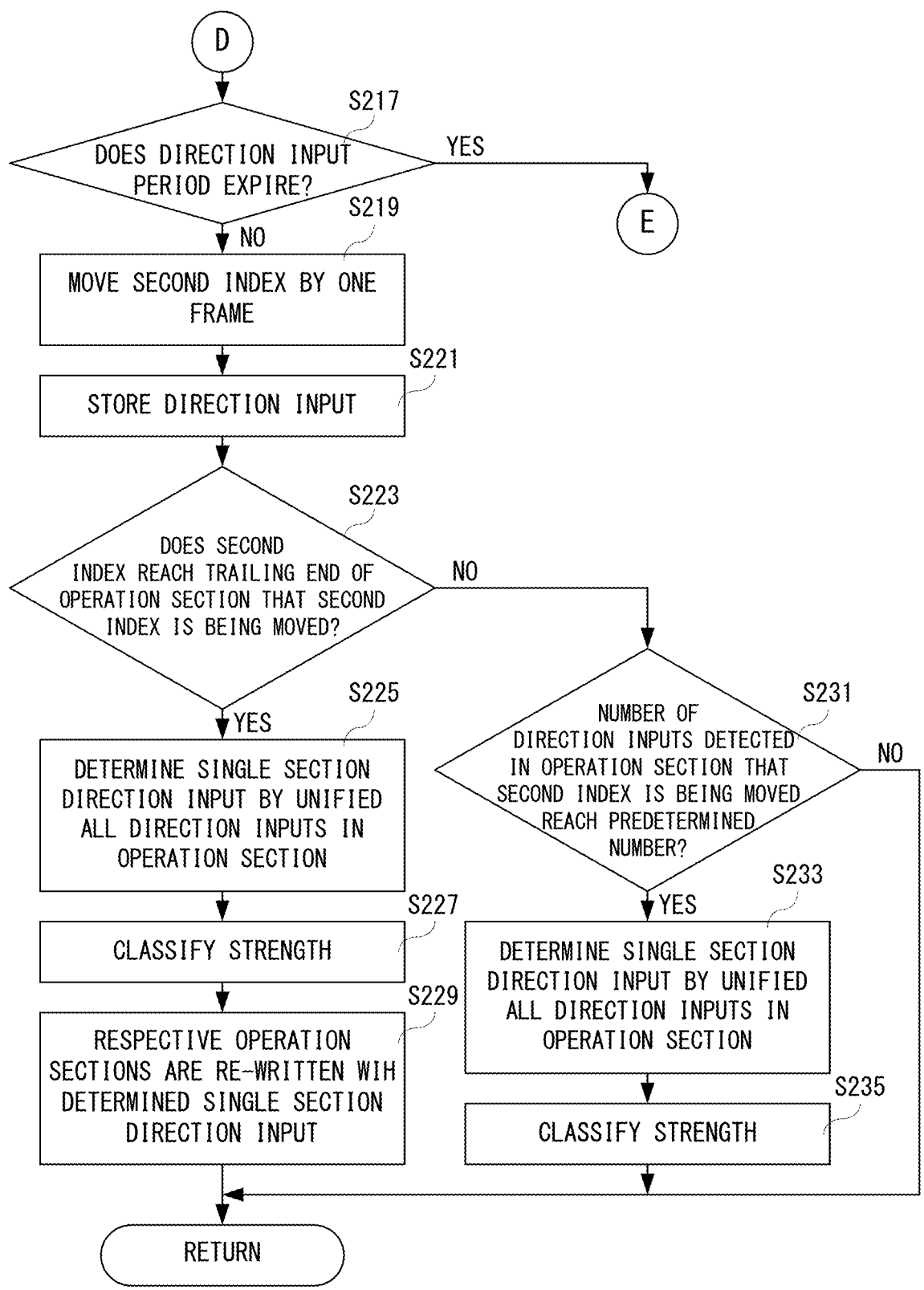
FIG. 36 is a flowchart showing another part of the non-limiting example second parameter determination processing shown in FIG. 31, following FIG. 35.
Figure 37:
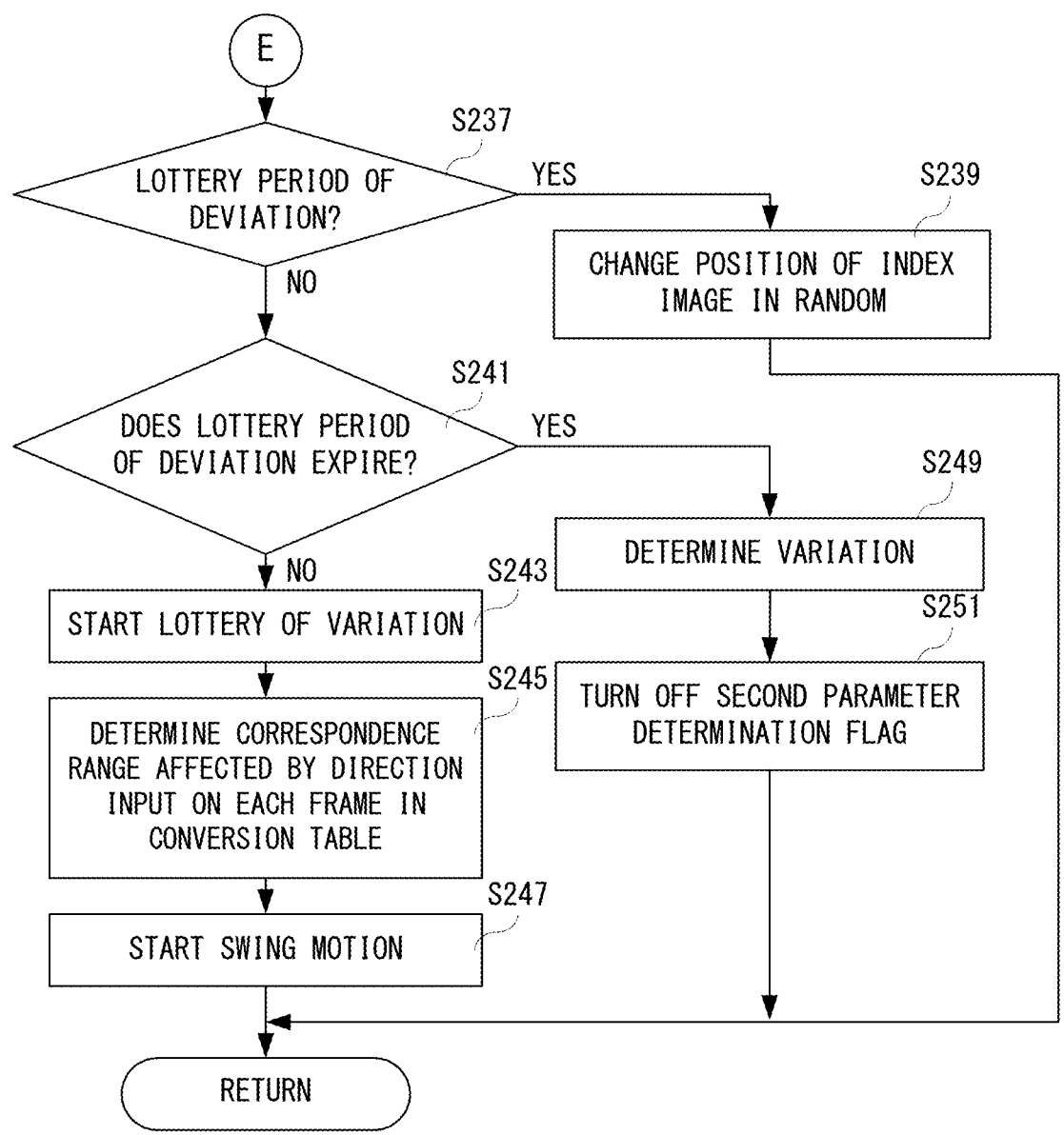
FIG. 37 is a flowchart showing a further part of the non-limiting example second parameter determination processing shown in FIG. 31, following FIG. 36.
Figure 38:
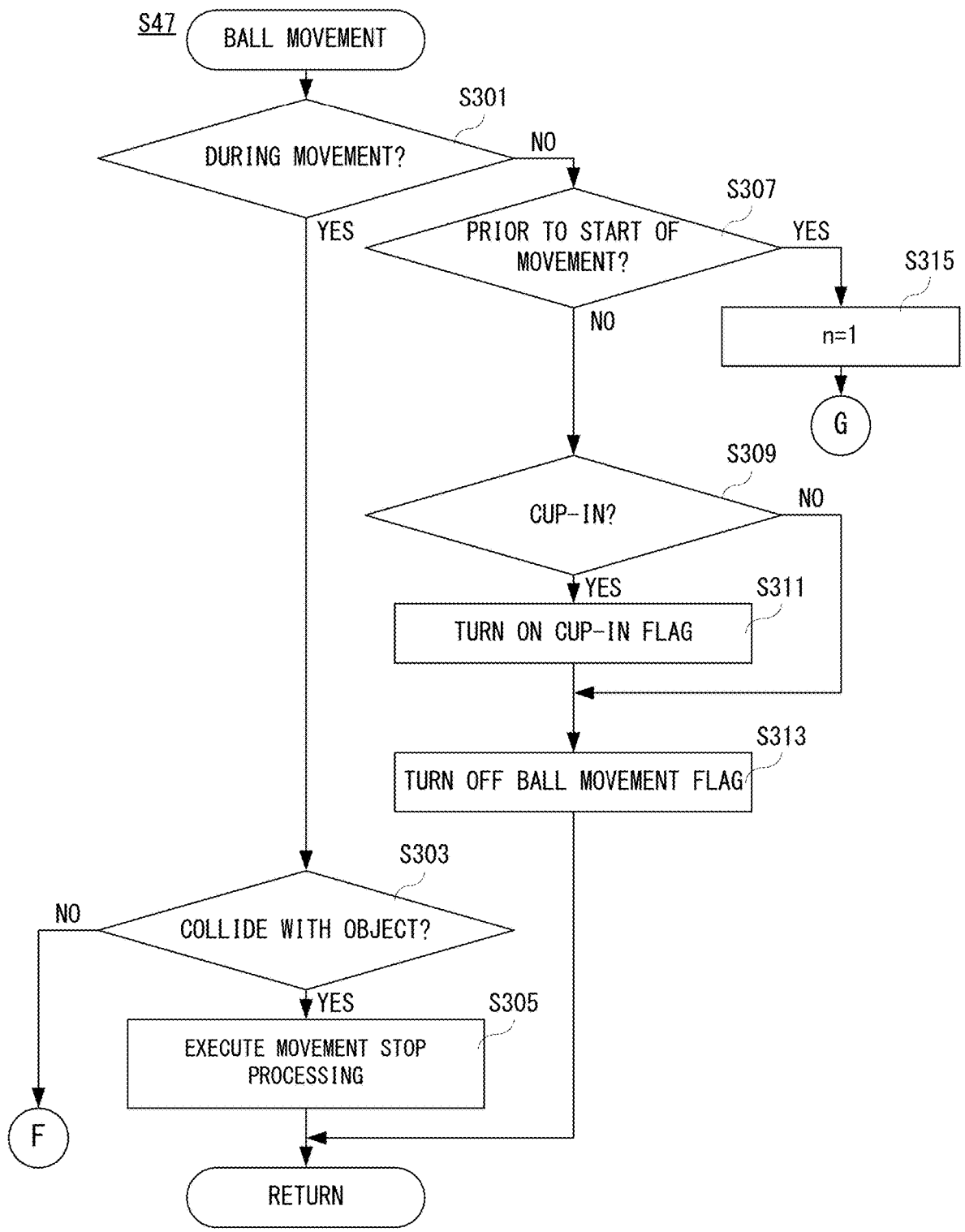
FIG. 38 is a flowchart showing a part of non-limiting example ball movement processing shown in FIG. 31.
Figure 39:
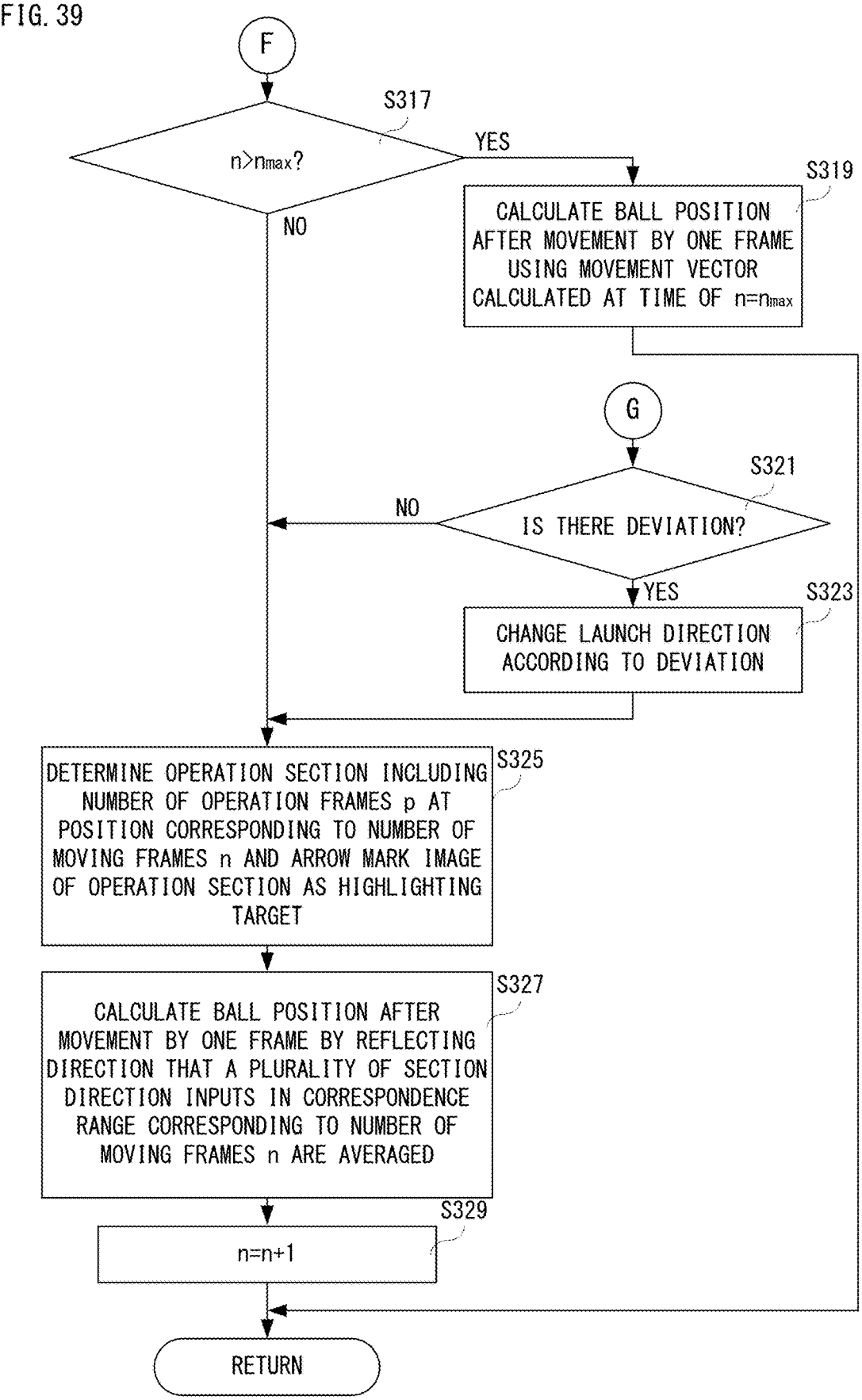
FIG. 39 a flowchart showing another part of the non-limiting example ball movement processing shown in FIG. 31, following FIG. 38.

FIG. 30 is a flowchart showing non-limiting example processing of the game program (i.e., "overall game processing") by the processor 81 (or computer) of the main body apparatus 2. FIG. 31 and FIG. 32 are flowcharts showing non-limiting example game controlling processing by the processor 81 (or computer) of the main body apparatus 2. Furthermore, FIG. 33 and FIG. 34 are a flowchart showing non-limiting example first parameter determination processing by the processor 81 (or computer) of the main body apparatus 2. Furthermore, FIG. 35-FIG. 37 are flowcharts showing non-limiting example second parameter determination processing of the ball by the processor 81 (or computer) of the main body apparatus 2. Moreover, FIG. 38 and FIG. 39 are flowcharts showing non-limiting example ball movement processing by the processor 81 (or computer) of the main body apparatus 2.

However, in each processing of FIG. 30-FIG. 39, only the processing for the player will be described while omitting the processing for other players. The processing for other players is the same as the processing for the player, and is executed so as to hit the ball in an order according to the same rules as the golf of general sports.

In the following, although the overall game processing, the game controlling processing, the first parameter determination processing, the second parameter determination processing and the ball movement processing are described using FIG. 30-FIG. 39, duplicate description on steps executing the same or similar processing will be omitted.

However, processing of respective steps of the flowcharts shown in FIG. 30-FIG. 39 are mere examples, and if the same or similar result is obtainable, an order of the respective steps may be exchanged. Moreover, in this first embodiment, it will be described that the processor 81 executes the processing of the respective steps of the flowcharts shown in FIG. 30-FIG. 39 basically; however, some steps may be executed by a processor(s) or/and a dedicated circuit(s) other than the processor 81.

When the power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing if execution of the game program of this first embodiment is instructed by the player.

As shown in FIG. 30, if the overall game processing is started, the processor 81 executes initial setting in a step S1. In this first embodiment, a game selection screen for selecting a golf game of stroke play or a golf game of match play is displayed, and a type of the golf game to be played is determined according to a selection operation of the player. Although a case where a player selects the stroke play will be described in the following, when a plurality of players play the stroke play, the golf game is advanced by hitting balls in an order of farer distance to the cup from the ball according to general rules of the actual golf. Moreover, when the match play is selected, the golf game is advanced according to the rule of the match play.

In a subsequent step S3, operation data 854a sent from the left controller 3 or/and the right controller 4 is acquired, and in a step S5, the game controlling processing (see FIG. 31 and FIG. 32) described later in detail is executed. However, in the step S3, the acquired operation data 854a is stored in the data storage area 854.

In a next step S7, a game image is generated. Here, the processor 81 generates, based on a result of the game controlling processing in the step S5, game image data corresponding to the game images (i.e., various screens such as the parameter determination screen 300, etc.). In addition, when generating the game image data corresponding to the parameter determination screen 300, according to the type of club 304 and the lie of the ball 306, a size of the movement gauge 320 (including the risk area 324) is changed appropriately. Moreover, when processing of a swing motion of the player character 302 is executed in parallel to the game controlling processing, the game image data is generated based on a result of the game controlling processing and a result of the swing motion.

Moreover, in a step S9, a game sound is generated. Here, the processor 81 generates sound data corresponding to the game sound according to the result of the game controlling processing in the step S5.

Subsequently, the game image is displayed in a step S11. Here, the processor 81 outputs the game image data generated in the step S7 to the display 12. Moreover, in a step S13, the game sound is output. Here, the processor 81 outputs the game sound data generated in the step S9 to the speaker 88 through the codec circuit 87.

Then, in a step S15, it is determined whether the game is to be ended. Determination in the step S15 is executed according to whether the player instructs to end the game, and so on. If "NO" is determined in the step S15, that is, if the game is not to be ended, the process returns to the step S3. On the other hand, if "YES" is determined in the step S15, that is, if the game is to be ended, the overall game processing is ended.

As shown in FIG. 31, if the game controlling processing is started shown in the step S5, the processor 81 determines, in a step S21, whether it is during play of the golf game. If "YES" is determined in the step S21, that is, if it is during the play of the golf game, the process proceeds to a step S31. On the other hand, if "NO" is determined in the step S21, that is, if it is not during the play of the golf game, it is determined, in a step S23, whether it is a start of the golf game. Here, the processor 81 determines whether a start of the golf game is instructed by the player.

If "NO" is determined in the step S23, that is, if it is not a start of the golf game, various selection processing is executed in a step S25, and the game controlling processing is ended, and the process returns to the overall game processing shown in FIG. 30.

In addition, the above-described various selection processing are selection processing of a player character and selection processing of a golf course. When playing the golf game of stroke play, selection processing of the number of the players and types of respective other players (i.e., a human being or a computer), and selection processing of the number of holes are further executed. Moreover, when playing the golf game of match play, selection processing of the type of another player that is an opponent is executed. Although illustration is omitted, the processor 81 starts the golf game in response to an operation of the player after ending various selection processing.

On the other hand, if "YES" is determined in the step S23, that is, if it is a start of the golf game, the player character 302 is located in a hitting position of a teeing area of a start hole in a step S27, and the first parameter determination flag 854u is turned on in a step S29, and then, the process returns to the overall game processing. Moreover, if "YES" is determined in the step S21, that is, if it is during the play of the golf game, it is determined, in a step S31, whether a first parameter is to be determined. Here, the processor 81 determines whether the first parameter determination flag 854*u* is turned on. If "NO" is determined in the step S31, that is, if the first parameter is not to be determined, the process proceeds to a step S41.

On the other hand, if "YES" is determined in the step S31, that is, if the first parameter is to be determined, the first parameter determination processing (see FIG. 33 and FIG. 34) described later is executed in a step S33, and it is determined, in a step S35, whether it is a start of the second parameter determination operation. Here, the processor 81 determines whether the A-button 53 is depressed when the parameter determination screen 300 in a state that the first index image 326 is stopped at the initial position is being displayed. However, when the first parameter determination processing is executed in the step S33, in the overall game processing, the processor 81 generates the game image data of the parameter determination screen 300 as shown in FIG. 8-FIG. 10, FIG. 12, FIG. 13 and FIG. 24-FIG. 26 so as to output to the display 12. At this time, the display target object between the current position of the ball 306 and the position of the horizontal arrival distance in the front direction of the ball 306 is detected, and the straight-line distance up to the display target object is detected, whereby the detected display target object is displayed on the corresponding position in the basic area 322 of the movement gauge 320.

If "NO" is determined in the step S35, that is, if it is not a start of the second parameter determination operation, the process returns to the overall game processing. On the other hand, if "YES" is determined in the step S35, that is, if it is a start of the second parameter determination operation, the second parameter determination flag 854*v* is turned on in a step S37, and the first parameter determination flag 854*u* is turned off in a step S39, and then, the process returns to the overall game processing.

In the step S41, it is determined whether the second parameter is to be determined. Here, the processor 81 determines whether the second parameter determination flag 854*v* is turned on. If "YES" is determined in the step S41, that is, if the second parameter is to be determined, the second parameter determination processing (see FIG. 35-FIG. 37) described later is executed in a step S43, and then, the process returns to the overall game processing. However, at the time of executing the second parameter determination processing in the step S43, the processor 81 generates, in the overall game processing, the game image of the parameter determination screen 300 as shown in FIG. 14-FIG. 17 to output to the display 12.

On the other hand, if "NO" is determined in the step S41, that is, if the second parameter is not to be determined, it is determined that the ball 306 is to be moved in a step S45 shown in FIG. 32. Here, the processor 81 determines whether the ball movement flag 854*w* is turned on.

If "YES" is determined in the step S45, that is, if the ball 306 is to be moved, in a step S47, the ball movement processing (see FIG. 38 and FIG. 39) described later is executed in a step S47, and then, the process returns to the overall game processing. On the other hand, if "NO" is determined in the step S45, that is, if the ball 306 is not to be moved, it is determined, in a step S49, whether it is a timing that the player character 302 has hit the ball 306.

If "YES" is determined in the step S49, that is, if it is a timing that the player character 302 has hit the ball 306, the ball movement flag 854*w* is turned on in a step S51, and then, the process returns to the overall game processing. On the other hand, if "NO" is determined in the step S49, that is, if it is not a timing that the player character 302 has hit the ball 306, it is determined, in a step S52, whether it is during processing of the swing motion.

If "YES" is determined in the step S52, that is, if it is during the processing of the swing motion, it is determined that it is prior to hitting the ball 306 after the player character 302 starts a swing motion, and then, the process returns to the overall game processing. On the other hand, if "NO" is determined in the step S52, that is, if it is not during the processing of the swing motion, it is determined, in a step S53, whether the cup-in flag 900*e* is turned on.

If "NO" is determined in the step S53, that is, if the cup-in flag 900*e* is turned off, the player character 302 is made to be moved to a next hitting position in a step S55, and the first parameter determination flag 854*u* is turned on in a step S57, and then, the process returns to the overall game processing. On the other hand, if "YES" is determined in the step S53, that is, if the cup-in flag 900*e* is turned on, the score is calculated in a step S59. Here, the processor 81 calculates the score of the cupped-in hole, and the total score up to the current hole.

In a subsequent step S61, it is determined whether there is a next hole to be played. If "YES" is determined in the step S61, that is, if there is a next hole to be played, the player character 302 is made to be moved to a next hitting position of a teeing area of the next hole in a step S63, the first parameter determination flag 854*u* is turned on in a step S65, and the cup-in flag 900*e* is turned off in a step S67, and then, the process returns to the overall game processing.

On the other hand, if "NO" is determined in the step S61, that is, if there is no next hole to be played, the play of the current golf course is ended in a step S69, and the process returns to the overall game processing.

In addition, although illustration is omitted, as described later, after swing motion of the player character 302 is started, processing of the swing motion of the player character 302 in parallel to the game controlling processing shown in FIG. 31 and FIG. 32 is executed. In the processing of the swing motion of the player character 302, an animation frame of the swing motion of the player character 302 is advanced for each frame to the last animation frame.

As shown in FIG. 33, if the first parameter determination processing shown in the step S33 is started, the processor 81 determines, in a step S101, whether it is club selection. Here, the processor 81 determines whether the L-button 38 or the R-button 60 is depressed. If "YES" is determined in the step S101, that is, if it is club selection, the club 304 to be used is changed according to an operation of the player in a step S103, and the process proceeds to a step S131 shown in FIG. 34. On the other hand, if "NO" is determined in the step S101, that is, if it is not club selection, it is determined, in a step S105, whether the launch direction is to be changed. Here, the processor 81 determines whether the analog stick 32 is tilted to the left or the right.

If "YES" is determined in the step S105, that is, if it is change of the launch direction, the launch direction is changed according to an operation of the player in a step S107, and in a step S109, the curve information of the ball 306 is calculated based on the slope at the current position of the ball 306 and the launch direction. However, the processor 81 stores the curve information data 854*f* corresponding to the calculated curve information in the data storage area 854 of the DRAM 85.

In a subsequent step S111, the display target object existing between the current position of the ball 306 and the position of the horizontal arrival distance is detected in the launch direction. However, the processor 81 stores or updates a detection result, that is, the display target object data 854g in the data storage area 854 of the DRAM 85.

Subsequently, in a step S113, it is determined whether the movement gauge 320 is being displayed with the 3D display. Here, the processor 81 determines whether the 3D flag 854t is turned on with reference to the 3D flag 854t. If "NO" is determined in the step S113, that is, if the movement gauge 320 is being displayed with the 2D display, the process proceeds to a step S131. On the other hand, if "YES" is determined in the step S113, that is, if the movement gauge 320 is being displayed with the 3D display, in a step S115, the height information from the current position of the ball 306 to the position of the horizontal arrival distance in the launch direction is calculated, and then, the process proceeds to the step S131. However, the processor 81 stores or updates the height information data 854h corresponding to the calculated height information in the data storage area 854 of the DRAM 85. This also applies to a step S121 described later.

Moreover, if "NO" is determined in the step S105, that is, if it is not change of the launch direction, it is determined, in a step S117 shown in FIG. 34, whether it is an instruction for displaying the movement gauge 320 with the 3D display. Here, the processor 81 determines whether the ZR-button 61 is depressed. However, when the 3D flag 854t is turned on, even if the ZR-button 61 is depressed, such an operation is made invalid.

If "YES" is determined in the step S117, that is, if it is an instruction for displaying the movement gauge 320 with the 3D display, the 3D flag 854t is turned on in a step S119, and in the step S121, the height information from the current position of the ball 306 to the position of the horizontal arrival distance in the launch direction is calculated, and then, the process proceeds to the step S131.

On the other hand, if "NO" is determined in the step S117, that is, it is not an instruction for displaying the movement gauge 320 with the 3D display, it is determined, in a step S123, whether it is an instruction for displaying the movement gauge 320 with the 2D display. Here, the processor 81 determines whether the ZL-button 39 is depressed. However, when the 3D flag 854t is turned off, even if the ZL-button 39 is depressed, such an operation is made invalid.

If "YES" is determined in the step S123, that is, it is an instruction for displaying the movement gauge 320 with the 2D display, the 3D flag 854t is turned off in a step S125, and then, the process proceeds to the step S131. The height information data 854h may be erased at this time.

On the other hand, if "NO" is determined in the step S123, that is, it is not an instruction for displaying the movement gauge 320 with the 2D display, it is determined, in a step S127, whether the ability of the club 304 to be used is to be increased. Here, the processor 81 determines whether the Y button 56 is depressed. However, in a case where the ability increase parameter is less than the maximum value (100), even if the Y button 56 is depressed, that operation is made invalid.

If "YES" is determined in the step S127, that is, if the ability of the club 304 to be used is to be increased, the risk area 324 is reduced in a step S129, and then, the process proceeds to the step S131. On the other hand, if "NO" is determined in the step S127, that is, if the ability of the club 304 to be used is not to be increased, the process proceeds to the step S131.

In the step S131, an animation of the trajectory prediction image 132 is advanced by one (1) frame, and the process returns to the game controlling processing. Therefore, the plurality of images 132a are moved on the reference trajectory by one (1) frame.

As shown in FIG. 35, if the second parameter determination processing shown in the step S43 is started, the processor 81 determines, in a step S201, whether the hitting power has been determined. The processor 81 determines whether the hitting power data 854i is stored in the data storage area 854 of the DRAM 85. If "YES" is determined in the step S201, that is, if the hitting power has been determined, the process proceeds to a step 217 shown in FIG. 36. On the other hand, if "NO" is determined in the step S201, that is, if the hitting power has not been determined, it is determined, in a step S203, whether there is a determination operation of the hitting power. Here, the processor 81 determines whether the A-button 53 is depressed when the first index image 326 is being moved in the parameter determination screen 300.

If "NO" is determined in the step S203, that is, if there is no determination operation of the hitting power, the first index image 326 is moved by one frame in a step S205, and then, the process returns to the game controlling processing. As described above, the first index image 326 is moved toward the upper end of the movement gauge 320 from the initial position, and when arriving at the upper end of the movement gauge 320, it is moved toward the initial position. On the other hand, if "YES" is determined in the step S203, that is, if there is a determination operation of the hitting power, the first index image 326 is stopped in a step S207, and the hitting power is stored in a step S209. That is, the processor 81 stores the hitting power data 854i corresponding to the determined hitting power to the data storage area 854.

In a next step S211, it is determined whether the determined hitting power is less than 75%. If "YES" is determined in the step S211, that is, if the determined hitting power is less than 75%, a predetermined value (for example, 20) is added to the ability increase parameter in a step S213, and then, the process proceeds to a step S215. On the other hand, if "NO" is determined in the step S211, that is, if the determined hitting power is 75% or more, the process proceeds to the step S215.

In the step S215, the correspondence table as shown in FIG. 21 is created, and the process returns to the game controlling processing. However, the processor 81 stores the correspondence table data 854p corresponding to the created correspondence table to the data storage area 854.

As shown in FIG. 36, in the step S217, it is determined whether the direction input period expires. That is, it is determined whether the second index image 330 reaches the position that the first index image 326 is stopped. If "NO" is determined in the step S217, that is, if the direction input period does not expire, the second index image 330 is moved by one frame in a step S219, and a direction input detected at this time is stored in a step S221. As described above, the direction input corresponds to tilt direction and the tilt amount of the analog stick 32, and is divided into the tilt amount of the vertical (up and down) direction, and the tilt amount of the horizontal (left and right) direction in this first embodiment.

Then, it is determined, in a step S223, whether the second index image 330 reaches the trailing end of the operation section 322*a*, 322*b*, 322*c* or 322*d* in which the same is being moved. If "YES" is determined in the step S223, that is, if the second index image 330 reaches the trailing end of the operation section 322*a*, 322*b*, 322*c* or 322*d* in which the same is being moved, all the direction inputs in the operation section 322*a*, 322*b*, 322*c* or 322*d* are unified so as to determine single direction input, that is, the section direction input in a step S225, a strength level for the determined single section direction input is classified in a step S227, the determined section direction input is rewritten as respective direction inputs in the operation section 322*a*, 322*b*, 322*c* or 322*d*, and then, the process returns to the game controlling processing.

In addition, as to the operation section 322*a*, 322*b*, 322*c* or 322*d* that the processing of the step S229 is executed, in the subsequent second parameter determination processing, the determined single section direction input and the classified strength are never changed.

The processor 81 rewrites the direction input data corresponding to the respective direction inputs detected in the operation section 322*a*, 322*b*, 322*c* or 322*d* with the section direction input data corresponding to single section direction input that is determined in the step S225, and updates the direction input data 854*m*.

In addition, the single section direction input determined in the step S225 is used for displaying the arrow image 332 in the operation section 322*a*, 322*b*, 322*c* or 322*d* during a time up to the player character 302 hits the ball 306 after the second index image 330 is moved to the trailing end of the operation section 322*a*, 322*b*, 322*c* or 322*d*. Moreover, this arrow image 332 is an image according to the strength level having been classified in the step S227. The same is also applied to a step S235 described later.

On the other hand, if "NO" is determined in the step S223, that is, if the second index image 330 does not reach the trailing end of the operation section 322*a*, 322*b*, 322*c* or 322*d* in which the same is being moved, it is determined, in a step S231, whether the number of the direction inputs detected in the operation section 322*a*, 322*b*, 322*c* or 322*d* in which the second index image 330 is being moved reaches a predetermined number (for example, 10). If "NO" is determined in the step S231, that is, if the number of the direction inputs detected in the operation section 322*a*, 322*b*, 322*c* or 322*d* in which the second index image 330 is being moved does not reach the predetermined number, the process returns to the game controlling processing. On the other hand, if "YES" is determined in the step S231, that is, if the number of the direction inputs detected in the operation section 322*a*, 322*b*, 322*c* or 322*d* in which the second index image 330 is being moved has reached the predetermined number, a single section direction input that the predetermined number of the direction inputs detected in the operation section 322*a*, 322*b*, 322*c* or 322*d* are unified is determined in step S233, and a strength level of the determined single section direction input is classified in a step S235, and then, the process returns to the game controlling processing.

Moreover, if "YES" is determined in the step S217, that is, if the direction input period expires, it is determined whether it is during a lottery period of deviation in a step S237 shown in FIG. 31. If "YES" is determined in the step S237, that is, if it is during the lottery period of deviation, a position of the deviation indication image 328 is changed at random in a step S239, and the process returns to the game controlling processing.

On the other hand, if "NO" is determined in the step S237, that is, if it is not during the lottery period of deviation, it is determined, in a step S241, whether it is an end of the lottery period of deviation. If "NO" is determined in the step S241, that is, if it is not an end of the lottery period of deviation, it is determined that the lottery period of deviation is not started, and therefore, the lottery period of deviation is started in a step S243. In a next step S245, for each of the moving frames of the correspondence table, the correspondence range that affects the trajectory of the ball 306 is determined, and a swing motion of the player character 302 is started in a step S247, and then, the process returns to the game controlling processing.

Moreover, if "YES" is determined in the step S241, that is, if it is an end of the lottery period of deviation, the deviation is determined in a step S249, the second parameter determination flag 854*v* is turned off in a step S251, and then, the process returns to game controlling processing. In the step S249, the processor 81 stores the deviation data 854*k* corresponding to the determined deviation to the data storage area 854.

In addition, the single section direction input determined in the step S233 shown in FIG. 36 is used for displaying the arrow image 332 in the operation section 322*a*, 322*b*, 322*c* or 322*d* during the time that the second index image 330 is moved to the trailing end of the operation section 322*a*, 322*b*, 322*c* or 322*d*.

As shown in FIG. 38, when the ball movement processing shown in the step S47 is started, the processor 81 determines, in a step S301, whether the ball 306 is being moved (during movement). If "YES" is determined in the step S301, that is, if the ball 306 is being moved, it is determined, in a step S303, whether the ball 306 collides with a background object. That is, the processor 81 determines whether the ball 306 is landed onto the ground objects such as fairway, rough, bunker, etc., or whether the ball 306 collides with the water hazard or the object in the OB zone, or whether the ball 306 collides with the object on the ground such as tree, building, etc., or the object in the air such as airship, balloon, block, etc.

If "NO" is determined in the step S303, that is, if the ball 306 does not collide the background object, the process proceeds to a step S317 shown in FIG. 39. On the other hand, if "YES" is determined in the step S303, that is, if the ball 306 collides with the background object, movement stop processing as described above is executed in a step S305, and the process returns to the game controlling processing.

Moreover, if "NO" is determined in the step S301, that is, if the ball 306 is not being moved, it is determined, in a step S307, whether it is prior to a start of movement of the ball 306. If "NO" is determined in the step S307, that is, if it is not prior to a start of movement of the ball 306, it is determined, in a step S309, whether the ball is cupped-in assuming that the ball 306 is stopped.

If "NO" is determined in the step S309, that is, if the ball 306 is not cupped-in, the process proceeds to a step S313. On the other hand, if "YES" is determined in the step S309, that is, if the ball 306 is cupped-in, the cup-in flag 900*e* is turned on in a step S311, and then, the process proceeds to the step S313. In the step S313, the ball movement flag 854*w* is turned off, and the process returns to the game controlling processing.

In addition, by executing the processing of the step S313, the ball 306 becomes to be not during movement.

Moreover, if "YES" is determined in the step S307, that is, if it is prior to a start of movement of the ball 306, the variable n is set to 1 (one) (n=1) in a step S315, and the process proceeds to a step S321 shown in FIG. 39. The variable n is indicative of the number of moving frames in the correspondence table.

As shown in FIG. 39, in a step S317, it is determined whether the variable n exceeds the maximum value $n_{max}$. If "NO" is determined in the step S317, that is, if the variable n does not exceed the maximum value $n_{max}$, the process proceeds to a step S325. On the other hand, if "YES" is determined in the step S317, that is, if the variable n exceeds the maximum value $n_{max}$, in a step S319, the position of the ball 306 after movement by one frame is calculated with using the velocity vector calculated at the time that the variable n is the maximum value $n_{max}$, and then, the process returns to the game controlling processing.

Moreover, in a step S321, it is determined whether there is any deviation. If "NO" is determined in the step S321, that is, if there is no deviation, the process proceeds to a step S325. On the other hand, if "YES" is determined in the step S321, that is, if there is deviation, the launch direction of the ball 306 is changed according to deviation in a step S323, and the process proceeds to the step S325.

In the step S325, the operation section 322a, 322b, 322c or 322d that the direction inputs of the number p of operation frames of the position corresponding to the number n of moving frames are detected and the arrow image 332 in that operation section 322a, 322b, 322c or 322d are determined as the highlighting target. In a next step S327, the position of the ball 306 after movement by one frame is calculated with reflecting a direction that a plurality of section direction inputs in the correspondence range corresponding to the number n of moving frames are averaged. Then, the variable n is incremented by 1 (one) (n=n+1) in a step S329, and the process returns to the game controlling processing.

Figure 40:
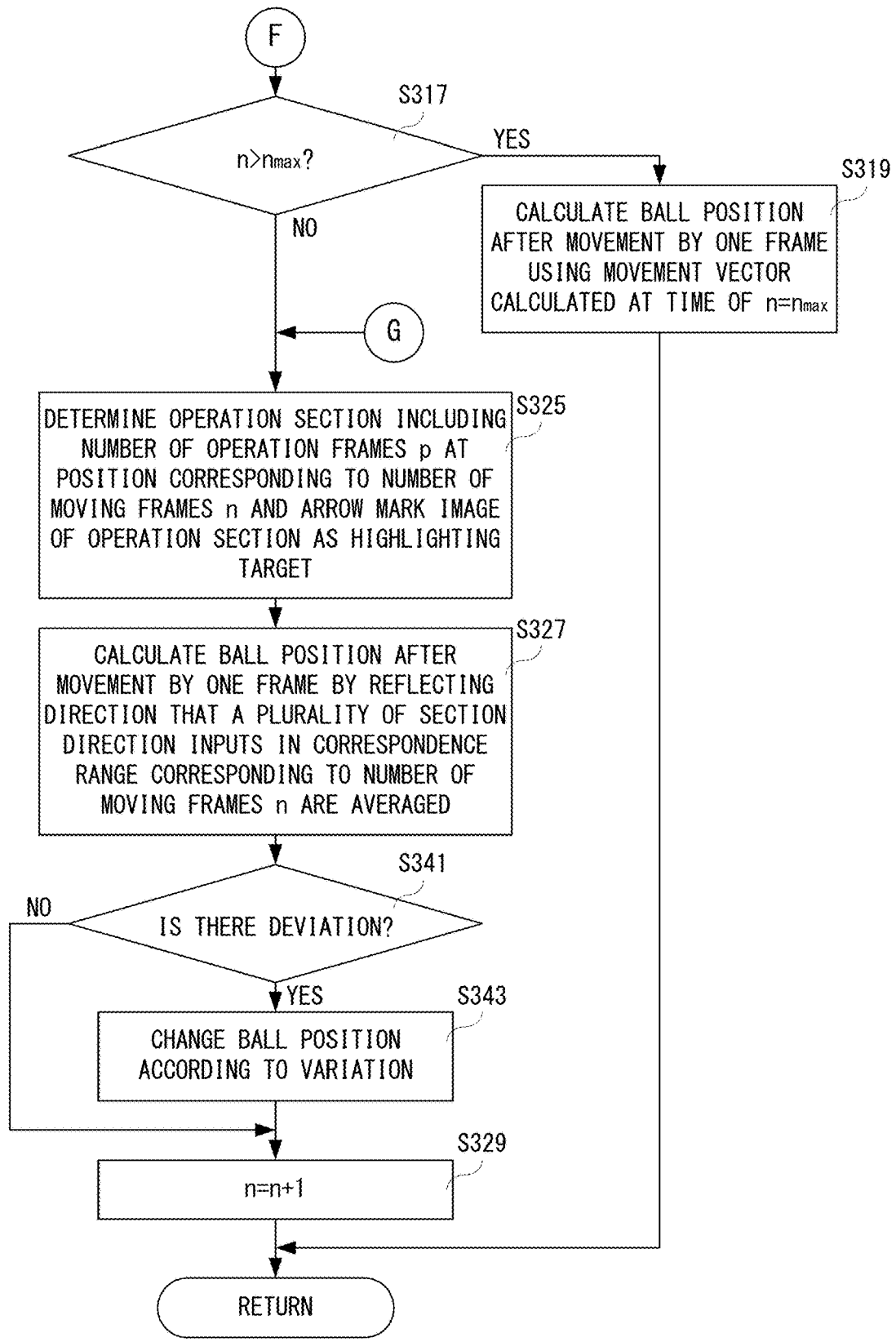
FIG. 40 is a further part of the non-limiting example ball movement processing shown in FIG. 31, following FIG. 38.

FIG. 40 is a flowchart showing a part of non-limiting example ball movement processing according to another embodiment. In the ball move processing of this another embodiment, when there is deviation, an influence of the deviation is applied to the trajectory of the ball 306 after movement. Therefore, the steps S321 and S323 shown in FIG. 39 are deleted, and if the processing of the step S315 shown in FIG. 38 is executed, the process proceeds to the step S325. Moreover, as shown in FIG. 40, steps S341 and S343 are provided between the steps S327 and S329.

Specifically, if the processing of the step S327 is executed, it is determined, in a step S341, whether there is deviation. If "NO" is determined in the step S341, that is, if there is no deviation, the process proceeds to the step S329. On the other hand, if "YES" is determined in the step S341, that is, if there is deviation, the position of the ball 306 calculated in the step S327 is changed according to the deviation in a step S343, and then, the process proceeds to the step S329. Other processing are the same as the processing described using FIG. 39.

In addition, in a case where there is deviation, when changing both of the launch direction of the ball 306 and the trajectory of the ball 306 after movement, steps S341 and S343 shown in FIG. 40 may be further executed between the steps S327 and S329 shown in FIG. 39.

According to this first embodiment, since a possibility that the ball is deviated becomes high as the flight distance becomes longer, there occurs a strategic characteristic whether the flight distance is prioritized or the directionality is prioritized. Therefore, it is possible to prevent a decline of interest in the golf game due to memorizing a suitable operation timing in the hitting operation using the power gauge as in the conventional golf game.

Moreover, according to this first embodiment, since the deviation amount is represented by the width of the movement gauge, it is possible to recognize a risk of deviation when determining the hitting power, and after determination of the hitting power, since the deviation indication image is displayed along the first index image that determines the hitting power, it is possible to grasp smoothly the deviation indication image without moving a line of sight.

In addition, although the hitting power when hitting the ball is determined dependent on the position that the first index image is stopped in this first embodiment, the initial velocity of the ball, the horizontal arrival distance of the ball or the movement distance of the ball may be determined. That is, according to the position that the first index image is stopped, the movement distance of the ball or any of the parameters on the movement distance is determined.

Moreover, although the movement gauge is displayed on a position determined in advance and the first index image and the second index image are moved inside the movement gauge in this first embodiment, it does not need to be limited to this. It is conceivable the following. The first index image and the second index image may be moved along the movement gauge. Moreover, without displaying the movement gauge in advance, and a gauge (or bar) is displayed so as to be gradually extended to an another side end from an initial position, and the extension of the gauge is stopped in response to an operation of the player, thereby to determine the hitting power, and an index image equivalent to the second index image is moved from the initial position up to the upper end of the gauge inside or along the gauge being displayed for determining hitting power, and the trajectory of the ball is changed based on direction inputs detected during that time.

Furthermore, in this first embodiment, using the section direction input that the direction inputs detected during the direction input period are unified for each section, the arrow image is displayed and the whole or a part of the trajectory is changed, but it does not need to be limited to this. In other embodiments, a calculation method of the section direction input may differ in a case of displaying the arrow image and in a case of changing the trajectory from each other. As an example, the average value is calculated described in the first embodiment when displaying the arrow image, but when changing the trajectory, a direction input having a maximum tilt amount out of a plurality of direction inputs in the operation section is calculated (or derived). Moreover, even when the average value is calculated, the number of the direction inputs used for calculating the average value may be different in a case of displaying the arrow image and in a case of changing the trajectory from each other.

Furthermore, although the second index image is moved from the lower end of the movement gauge to the position that first index image is stopped in this first embodiment, the second index image may be moved from the lower end to the upper end of the movement gauge. Even in this case, the direction input period is a period of time until the second index image is stopped at the position that the first index image is stopped from the lower end of the movement gauge. However, the direction input period may be a period of time that the second index image is moved up to the upper end from the lower end of the movement gauge. That is, a fixed direction input period may be provided irrespective of the position that the first index image is stopped.

Moreover, although the average value of all the direction inputs in each of the operation sections is calculated for each operation section in this first embodiment, it does not need to be limited to this. In other embodiments, it may be possible to determine the direction input detected at a predetermined timing in the section as the direction input for each section.

Furthermore, in this first embodiment, the movement gauge is divided evenly, but it is not necessary to divide the movement gauge evenly. For example, the movement gauge may be set to become longer toward the fourth operation section from the first operation section.

Furthermore, in this first embodiment, the movement gauge is divided into the four operation sections, but if the operation sections are two or more, the movement gauge may be divided into five or more. However, since the number of operation times for changing the trajectory of the ball for one stroke becomes larger as the number of the operation sections becomes larger, as the difficulty of the game or the level of the player becomes higher, the number of divisions of the movement gauge may be increased. In this case, the movement gauge is not divided at the beginning of the game, and if the difficulty of the game or the level of the player becomes higher to some extent, the movement gauge is divided into two, and the number of divisions may be gradually increased as the difficulty of the game or the level of the player becomes further higher. Moreover, the number that the movement gauge is divided may be set according to the ability such as the type of the character that the player uses, the level of the character and so on. Furthermore, the number of divisions of the movement gauge may be set according to an item used by the player or the player character. Moreover, the player may be able to set a desired number of divisions.

Moreover, although the movement gauge is made in a shape that has breadth and is extended in a longitudinal direction in this first embodiment, it does not need to be limited to this. The movement gauge is made in a shape prolonged in a horizontal direction, or may be formed in an L-letter shape with rounded corner. That is, the movement gauge may be a shape that the first index image and the second index image can be moved from one end toward the other end.

Furthermore, although the movement gauge is displayed on the fixed position in this first embodiment, it does not need to be limited to this. In other embodiments, the first index image may be displayed in an arbitrary position that does not become an obstacle of the background image when an operation for the second parameter determination is started, and the second index image may be moved in a predetermined direction (for example, in an upper direction) from an initial position when a position that the first index image is first displayed is regarded as the initial position. That is, when the first index image is moved from the initial position, the movement gauge is displayed so as to be extended from the initial position. However, a movable range (length) of the first index image is determined in advance similar to the movement gauge shown in the first embodiment. Moreover, the first index image is stopped in response to a stop operation of the player, and the hitting power is determined according to a distance between the initial position and a stop position. In the width direction of the first index image at this stop position, the position of the deviation indication image is determined by a lottery. However, the sizes and shapes of the basic area and the risk area are determined similar to the above-described first embodiment. Therefore, the first index image is inclined with respect to the first index image at the initial position as it is moved, and the breadth of the first index image is made longer at a position that the risk area is set. Moreover, similar to the above-described first embodiment, in the direction input period that the second index image is moved from the initial position of the first index image to the stop position, the direction input by the player is detected and the trajectory of the ball is affected based on the detected direction input.

Furthermore, although lines in sides of trailing ends of respective areas are slanted in the movement gauge in this first embodiment, it is not necessary to make slant. In this case, the movement distance may be or may not be changed according to the deviation.

Moreover, although the first index image and the designation image are formed as separate images in this first embodiment, it does not need to be limited to this. For example, a point image that functions as the first index image and the designation image is displayed, and the point image may be moved in a long side direction inside the movement gauge when the hitting power is to be determined, and when the deviation is to be determined, the point image may be moved in a short side direction inside the movement gauge.

Furthermore, although the risk area is provided outside the basic area of the movement gauge in this first embodiment, the risk area may be formed inside the basic area. In such a case, the risk area is enlarged so that the deviation rate and the deviation amount increase as the hitting power is increased. For example, the risk area is set in the center (middle) of the breadth of the basic area of the movement gauge, and deviation is made larger as the deviation indication image is shifted in the width direction from the center in the risk area. Moreover, for example, in the basic area of the movement gauge, deviation may be made larger as the deviation indication image is shifted in the width direction from the center of the breadth. In this case, an area other than the center point of the breadth of the basic area can be regarded as the risk area. However, in the longitudinal direction of the basic area, as for where to set the risk area, it is possible to determine dependent on the difficulty of hitting.

Furthermore, in this first embodiment, there is deviation even within the basic area of the movement gauge, but in other embodiments, there may be no deviation within the basic area and there may be deviation within the risk area.

Moreover, in this first embodiment, the deviation is determined when the direction input period expires, but the deviation may be determined at arbitrary timing prior to a movement start of the ball after the hitting power is determined.

Furthermore, although deviation is determined by a lottery in this first embodiment, it does not need to be limited to this. Movement of the designation image may be stopped according to an operation of the player, whereby the position of the designation image, that is, deviation may be determined.

Furthermore, although the hitting power is determined according to the position that the first index image is stopped in this first embodiment, the hitting power may be determined according to a position of the designation image at the time that the deviation is determined. Since the first index image is slanted as it goes to the trailing end of the movement gauge as described above and the magnitude of the hitting power is changed according to the deviation, the horizontal arrival distance of the reference trajectory is changed. Even in this way, it is possible to change the movement distance dependent on the difference between a draw ball and a fade ball.

Moreover, in this first embodiment, in order to determine the deviation regardless of the position that the first index image is stopped, the deviation is determined in also the basic area in front of the risk area, but if the position that the first index image is stopped is in front of the risk area, the deviation may not be determined.

Furthermore, although the first index image and the second index image are moved inside the movement gauge, the color of the move portion is change accordingly in this first embodiment, it is not necessary to change the color.

Furthermore, although an operation input is performed by operating the operating button and the analog stick of the controller(s) in this first embodiment, it does not need to be limited to this. In other embodiments, a motion sensor such as a gyro-sensor (2 axes or 3 axes) is provided on the controller, and an operation input may be performed by holding and swinging by the player the controller (either one of the left controller 3 and the right controller 4) removed from the main body apparatus 2. That is, the hitting power and the trajectory of the ball are determined at once by an operation that the player moves the controller. In this case, the gyro-sensor detects a magnitude of a swing when the player swings up the controller from an address state, and detects a rotation angle of a wrist from a position of the controller that is swung up to a position that the controller is swung down to return to the address state position. As an example, the hitting power is determined by the magnitude of swing up of the controller. Moreover, a time change of a rotation angle of the wrist at the time of swinging correctly (hereinafter, referred to as "reference rotation angle") is stored in advance, and a type of the trajectory of the ball (for example, draw, fade, hook, slice) is determined based on the difference between the reference rotation angle and the rotation angle of the wrist when the player moves the controller. According to this determination result, the arrow image that is determined in advance according to the type of trajectory of the ball is displayed in the movement gauge, and the ball is moved according to the determined trajectory. However, the launch angle of the ball is determined by the selected club. Moreover, by providing an acceleration sensor, the acceleration of the controller when the controller is swung down and returned to the position of the address state may be detected so as to be converted into the hitting power.

Moreover, this first embodiment is described on the golf game, but is applicable to other sport games. As other sports, soccer, baseball, tennis, volleyball, bowling, badminton, etc. correspond. In a case of soccer, a trajectory of a ball that is kicked in the scene of shooting or free kick may be changed according to a temporal direction input. Moreover, in a case of baseball, a trajectory of a ball that a pitcher pitches or a butter hits may be changed according to a temporal direction input. Furthermore, in a case of tennis or volleyball, a trajectory of a ball that is hit by a hand or a racket may be changed according to a temporal direction input. In a case of bowling, a trajectory of a ball that is throwed, like the pitcher of baseball, may be changed according to a temporal direction input. In a case of badminton, a trajectory of a shuttle that is hit by a racket, like tennis, may be changed according to a temporal direction input.

Moreover, although the game system 1 is shown as an example of an information processing system in the above-described first embodiment, its configuration should not be limited, and other configurations may be adopted. For example, in the above-described first embodiment, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessor) 101 and 111 provided on the controllers.

Furthermore, in other embodiments, a server on a network such as the internet may execute a part (S5-S9) of the overall game processing. In such a case, the processor 81 of the main body apparatus 2 transmits the operation data received from the left controller 3 and the right controller 4 to the above-described server via the network communication section 82 and the network, receives a result of execution of a part of the overall game processing by the server (i.e., game image data and the game sound data), thereby displaying the game image on the display 12 and outputting the game sound from the speaker 88. That is, it is possible to constitute the information processing system including the game system 1 shown in the above-described first embodiment and the server on the network.

Moreover, although a case where the game image is displayed on the display 12 is described in the above-described first embodiment, it does not need to be limited to this. The game image can be displayed also on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described first embodiment is described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, and an information processing such as further electronic equipment capable of executing a game program. The further electronic equipment corresponds to smartphones, tablet PCs or the like. In such a case, an operation portion may constitute with software keys.

Furthermore, specific numeral values and images shown in the above-described first embodiment are mere examples and can be appropriately changed according to actual products.

For example, determination of the deviation may be performed prior to an end of detection of the direction input after the hitting power is determined, or prior to hitting the ball after the player character starts the swing motion.

Moreover, the second parameter determination processing includes processing (S203-S209) that determines the hitting power, the processing (S217-S221) that detects the direction input by the player, and the processing that determines the deviation (S237-S243, S249), but may include only the processing that detects the direction input by the player. In such a case, the processing that determines the hitting power and the processing that determines the deviation may be omitted, for example, or may be executed prior to the second parameter determination processing as further parameter determination processing (for example, third parameter determination processing).

Second Embodiment

In the above-described first embodiment, the change of the height of the obstacle object in the front direction of the ball is displayed as the polygonal line on the right side (or sideways) of the movement gauge being displayed with the 3D display, but it does not need to be limited to this. In this second embodiment, aside from the movement gauge, a distance up to a position designated by the player and change in the height of the obstacle object may be displayed (hereinafter, referred to as "distance height indication display"). However, this distance height indication display may be performed instead of the above-described polygonal line display beside the movement gauge, or along with the above-described polygonal line display beside the movement gauge. Hereinafter, the distance height indication display will be described specially. However, here, the distance height indication display will be illustrated and described, but illustration and description on the above-described polygonal line display beside the movement gauge will be omitted.

Figure 41:
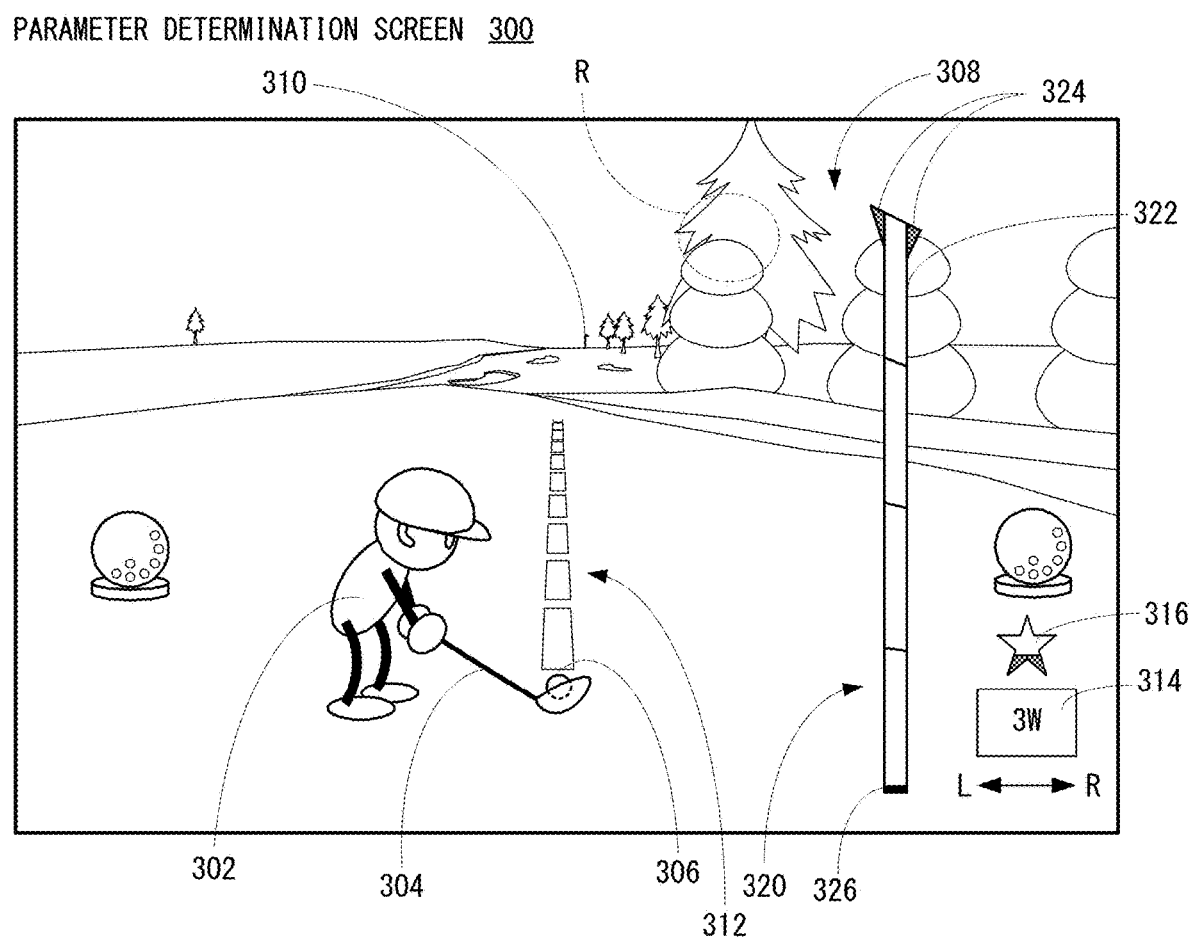
FIG. 41 is a view showing a non-limiting example parameter determination screen of a second embodiment.
Figure 42:
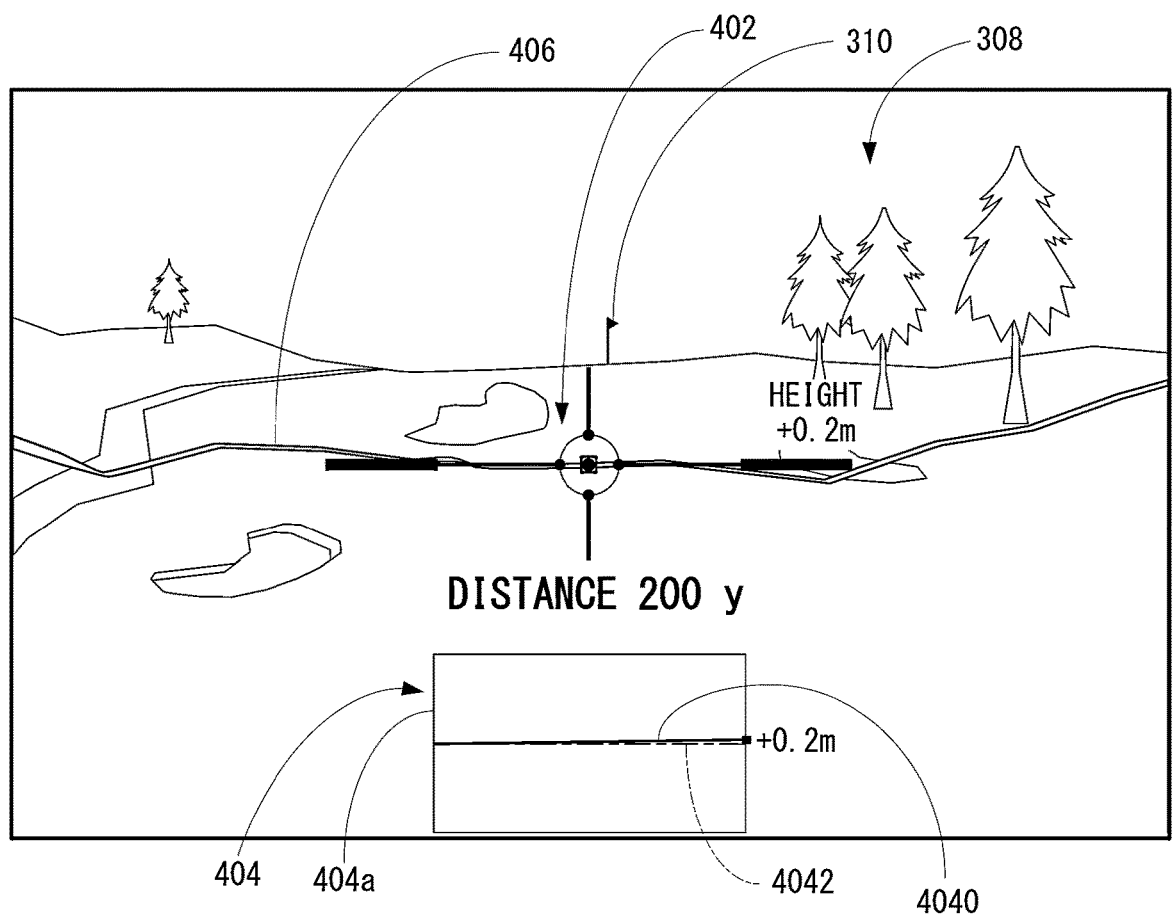
FIG. 42 is a view showing a non-limiting first example distance height measurement screen.

FIG. 41 is a view showing another non-limiting example parameter determination screen 300, and FIG. 42 is a view showing a non-limiting example distance height measurement screen 400.

The parameter determination screen 300 of FIG. 41 is a screen of a hole different from that of the parameter determination screen 300 shown in FIG. 8, the background image 308 differs. In addition, a dotted line frame R shown in FIG. 41 only shows a range of a part of the obstacle objects, and is not displayed in an actual game image.

In a case where the parameter determination screen 300 as shown in FIG. 41 is being displayed on the display 12, if a predetermined button (for example, the ZR-button 61) is depressed prior to an instruction to start the second parameter determination operation is performed, the distance height measurement screen 400 as shown in FIG. 42 is displayed on the display 12. In the following, the distance height measurement screen 400 and an undulation display screen 450 shown in FIG. 42-FIG. 45 will be described, and the same reference numerals are used for the background image 308 and the pin 310 as those of the parameter determination screen 300.

The distance height measurement screen 400 includes a pointer image 402, a graph image 404 and a line object 406 in addition to the background image 308 and the pin 310. The player character 302 and the movement gauge 320 are not displayed in the distance height measurement screen 400. As an example, the distance height measurement screen 400 is an imaged image by a virtual camera in a case where a position of the virtual camera (i.e., viewpoint) is set above the current position of the ball 306 by a predetermined distance (for example, height of the player character 302). However, this is an example, and the position of the virtual camera when displaying the distance height measurement screen 400 may be set to the current position of the ball 306 or a position of the head (or eyes) of the player character 302. Moreover, it is possible to see situations such as an obstacle object etc. around a position designated by the pointer image 402 described later by zooming-in the virtual camera. By thus setting the virtual camera, it is possible to display, on the display 12, the distance height measurement screen 400 of a sight (or content) similar to a sight that is visible to the player of the golf who looks into a laser range finder used in the actual golf.

Moreover, at the beginning of display of the distance height measurement screen 400, a gazing point of the virtual camera is set to a predetermined position. The predetermined position is determined based on the current position of the ball 306. For example, the predetermined position may be set to a center position of the fairway in the horizontal arrival distance of the club 304 in use or a position of the cup. However, this is an example and the predetermined position may be designated by the player. In the example shown in FIG. 42, the predetermined position is set to a center position of the fairway in the horizontal arrival distance of the club 304 in use.

The pointer image 402 is always displayed in the center of the distance height measurement screen 400. That is, the pointer image 402 is arranged in a position that a center position thereof overlaps with a position of the gazing point of the virtual camera.

However, the pointer image 402 may be arranged at a position that the center position does not overlap with the position of the gazing point of the virtual camera.

Moreover, if the player makes the analog stick 52 tilt when the distance height measurement screen 400 is being displayed, the gazing point of the virtual camera is moved in a tilted direction. That is, a direction of the virtual camera is changed and the distance height measurement screen 400 is changed. Therefore, the pointer image 402 is moved according to movement of the gazing point of the virtual camera.

However, the gazing point of the virtual camera is set to a position away a predetermined distance from the virtual camera, and is moved within a plane parallel with a near clipping plane and a far clipping plane, between the near clipping plane and the far clipping plane.

The pointer image 402 designates a position that collides with an obstacle object if a virtual straight line extended from the view point and passing the gazing point collides with the obstacle object. However, when this virtual straight line collides with two or more obstacle objects, the pointer image 402 designates a position that collides with the obstacle object closer to the view point (see FIG. 44 and FIG. 45).

In addition, when the virtual straight line does not collide with the obstacle object, the pointer image 402 designates a position away from the view point by a predetermined distance (for example, the horizontal arrival distance of the club 304 to be used). However, a position designated by the pointer image 402 means a position designated by the center of the pointer image 402 (hereinafter, referred to as "designated position").

If the pointer image 402 designates the obstacle object, a distance and height will be measured on the basis of the current position of the ball 306, and the measured distance and height are displayed. The distance is displayed below the pointer image 402 and the height is displayed above the right of the pointer image 402. The distance is a horizontal distance not including components in the height direction between the current position of the ball 306 and designated position by the pointer image 402 in the virtual space. However, the distance may be a straight-line distance (three-dimensional distance) from the current position of the ball 306 to the designated position. Moreover, the height is a difference of the height of the designated position by the pointer image 402 with reference of the height of the current position of the ball 306 in the virtual space. However, when the designated position by the pointer image 402 is above the reference that is the height of the current position of the ball 306, the height is displayed in a numeral of plus (positive), and when the designated position by the pointer image 402 is below the reference, the height is displayed in a numeral of minus (negative).

Therefore, the player can know the horizontal distance from the current position of the ball 306 to the obstacle object and the height with respect to the current position of the ball 306 by designating the obstacle object by the pointer image 402. Moreover, by getting to know the horizontal distance and the height up to the obstacle object, the horizontal distance and the height can be used as a useful reference when selecting the type of club 304 to be used and when determining the direction of the trajectory and the change amount.

Figure 43:
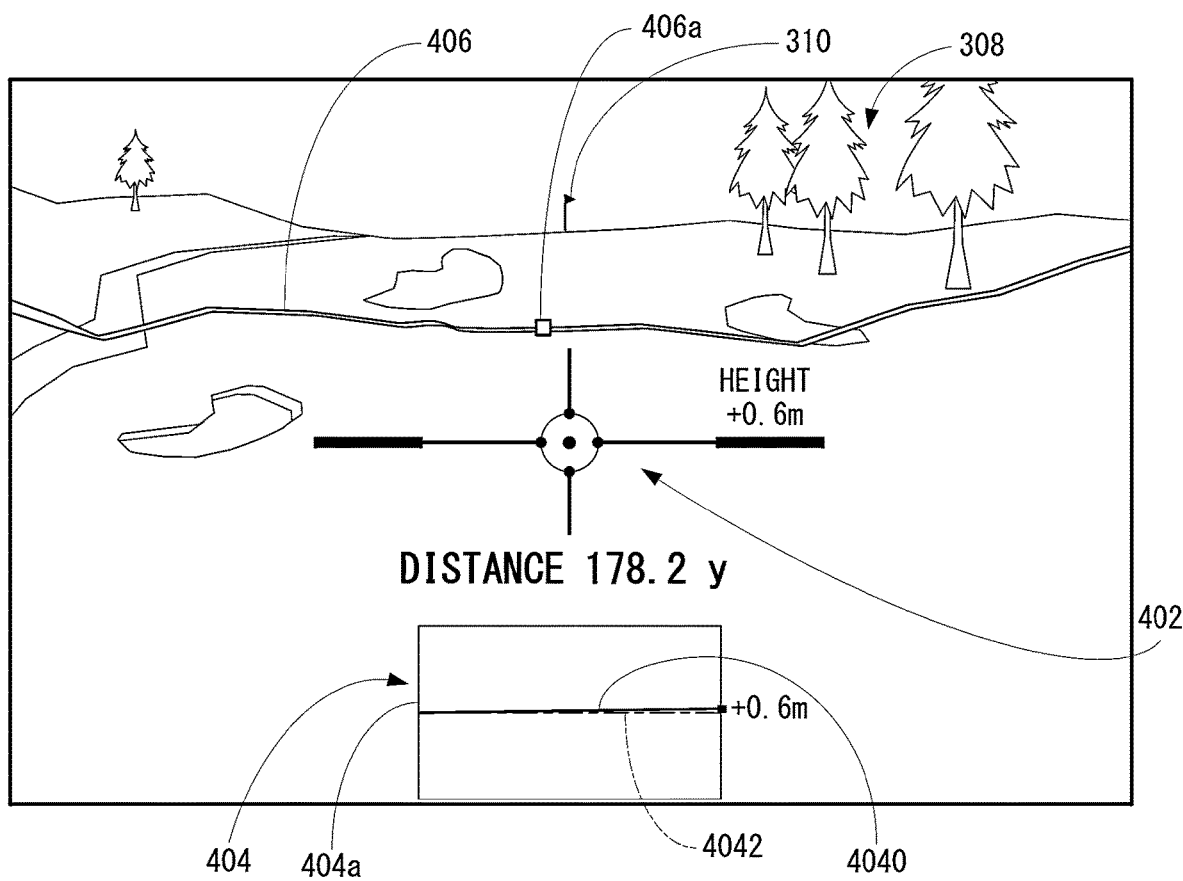
FIG. 43 is a view showing a non-limiting second example distance height measurement screen.

The graph image 404 includes a rectangular frame 404*a* of a predetermined size, and within this frame 404*a*, a polygonal line 4040 that shows a change of the height of the obstacle object existing between the current position of the ball 306 and the designated position is displayed with reference of the height of the current position of the ball 306. However, in FIG. 42, since there are almost no undulation of the obstacle object from the current position of the ball 306 to the designated position, the polygonal line 4040 becomes a gentle straight line (FIG. 43 is also the same). On the frame 404*a*, the current position of the ball 306 is set to a left end, and the designated position is set to a right end. In the graph image 404, a square dot is plotted at a position of the height of the designated position. However, a one-dotted line extended in the horizontal direction at the center of the vertical (up and down) direction in the frame 404*a* is a base line 4042 indicative of the height of the current position of the ball 306. Moreover, although a method of detecting the height of the obstacle object is the same as the method described in the above-described first embodiment, it may be a different method.

Figure 44:
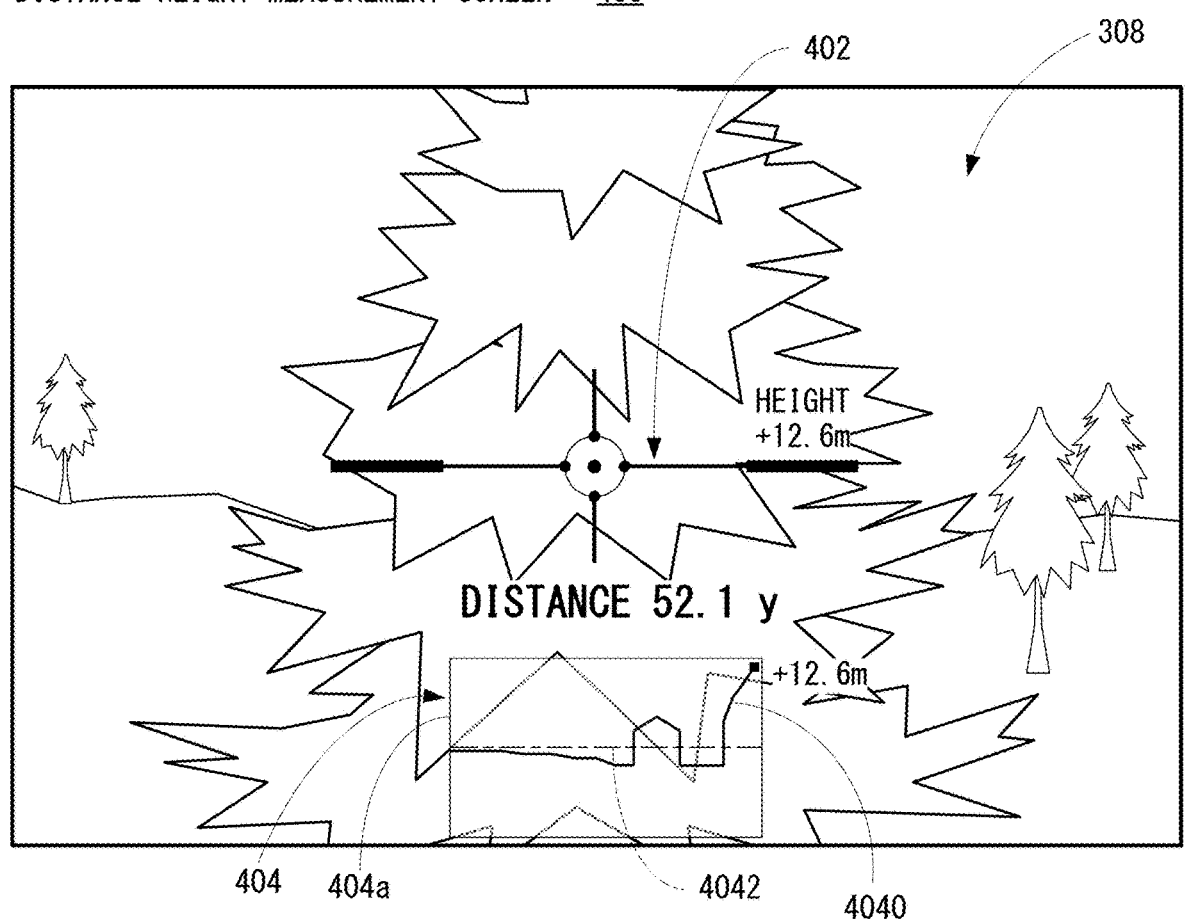
FIG. 44 is a view showing a non-limiting third example distance height measurement screen.
Figure 45:
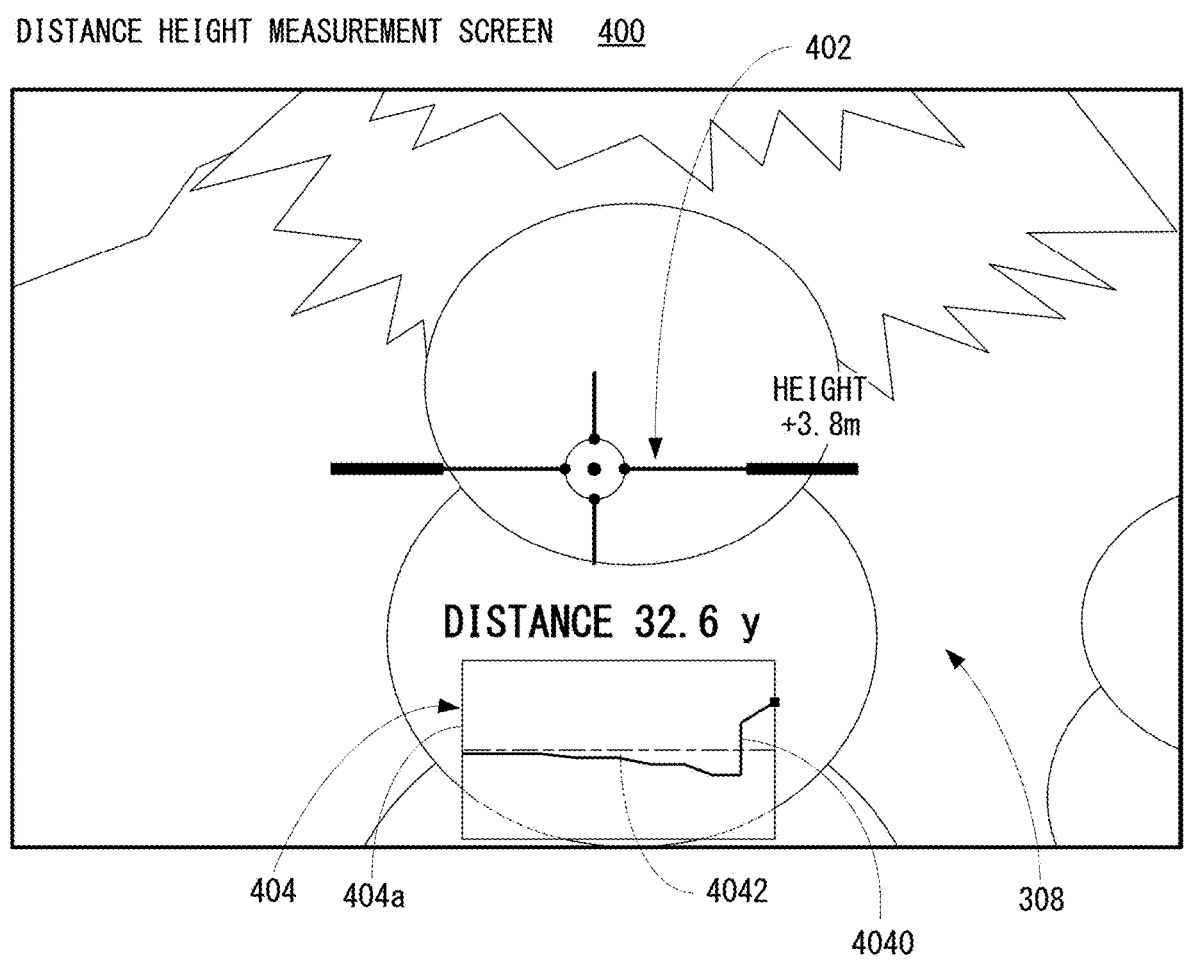
FIG. 45 is a view showing a non-limiting fourth example distance height measurement screen.

In addition, the graph image 404 is displayed translucently so that the images of a back side, such as the background image 308 can be seen (see to FIG. 44 and FIG. 45).

The size of the frame 404*a* is fixed, and is set (for example, reduced) so that a horizontal distance between the current position of the ball 306 and the designated position by the pointer image 402 corresponds to a length of breadth of the frame 404*a*.

Moreover, the height of the obstacle object is set (for example, reduced) so as to correspond to a longitudinal length of the frame 404*a*. However, in order to show the height of the obstacle object intelligibly, a reduction rate of a longitudinal direction is set smaller than that of a breadth direction. Although an aspect ratio of the length of the frame 404*a* is 1:2 as an example, an aspect ratio of the reduction rates is 3:5. However, it does not need to fix the aspect ratio of the reduction rates, and since the height of the obstacle object becomes low and thus becomes difficult to be seen in the polygonal line 4040 when the designated position is comparatively distant from the current position of the ball 306, the reduction rate of the longitudinal direction may be made further smaller.

Furthermore, in the distance height measurement screen 400, a line object 406 that serves as a guide for an arrival position of the ball 306 is displayed at a position that is away from the current position of the ball 306 by the horizontal arrival distance of the club 304 in use. As an example, the line object 406 is an object of a bright thick line. Therefore, it is possible to predict easily the arrival position at a time of hitting the ball 306 by means of the club 304 in use.

Moreover, in the line object 406, an image 406*a* that serves as a mark (hereinafter, referred to as "mark image") is displayed on a landing point of the ball 306. However, the landing point of the ball 306 is a position that is predicted when ball 306 is hit by the player character 302 in the current launch direction and the hit ball 306 flies straight. Therefore, it is possible to easily know a position that is predicted to be landed.

In addition, although omitted in the above-described first embodiment and FIG. 41, the line object 406 and the mark image 406*a* may be displayed in the parameter determination screen 300.

Moreover, as described above, a direction of the virtual camera, that is, the distance height measurement screen 400 is changeable. FIG. 43 is an example of the distance height measurement screen 400 displayed on the display 12 when the direction of the virtual camera is operated by the player so as to move diagonally downwardly to the right in a case where the distance height measurement screen 400 shown in FIG. 42 is being displayed.

In FIG. 43, the pointer image 402 designates the ground object in a front side of the line object 406, and therefore, a distance from the ball 306 to the designated position becomes shorter than that of a case shown in FIG. 42. Moreover, in the graph image 404, the horizontal distance from the current position of the ball 306 to the designated position is set with respect to the breadth of the frame 404*a*.

Moreover, looking at the height displayed near the pointer image 402 and the graph image 404 shown in FIG. 42 and FIG. 43, since the height in the front side of the line object 406 is slightly higher, it can be seen that the ground is slightly downwardly sloped toward the front side from the designated position designated by the pointer image 402 shown in FIG. 43.

Moreover, when the distance height measurement screen 400 shown in FIG. 42 or FIG. 43 is being displayed, it is also possible to designate by the pointer image 402 an area around the dotted line frame R surrounded by the dotted line in FIG. 41 by operating by the player the direction of the virtual camera so as to move diagonally downwardly to the right. FIG. 44 and FIG. 45 show other examples of the distance height measurement screen 400.

The distance height measurement screen 400 of FIG. 44 is displayed on the display 12 at the time that the direction of the virtual camera is moved as described above so that the virtual camera is turned to the on-ground object for a tree on the back side out of the on-ground objects for two trees arranged side by side in front and back, within the dotted line frame R of FIG. 41. The distance height measurement screen 400 of FIG. 45 is displayed on the display 12 at the time that the direction of the virtual camera is moved as described above so that the virtual camera is turned to the on-ground object for a tree on the front side out of the on-ground objects for the two trees arranged side by side in front and back, within the dotted line frame R of FIG. 41.

When the virtual camera is turned to the tree on the back side as shown in FIG. 44, the horizontal distance from the current position of the ball 306 up to the designated position of the tree on the back side is displayed near the pointer image 402, and is set so as to correspond to the breadth of the frame 404*a*. Moreover, when the virtual camera is turned to the tree on the back side, as seen from the graph image 404, since the tree on the front side is arranged between the ball 306 and the tree on the back side, the change in height due to the tree on the front side appears on the polygonal line 4040 between the current position of the ball 306 and the designated position.

Moreover, when the virtual camera is turned to the tree on the front side as shown in FIG. 45, the horizontal distance from the current position of the ball 306 up to the designated position of the tree on the front side is displayed near the pointer image 402, and is set so as to correspond to the breadth of the frame 404*a*. Moreover, when the virtual camera is turned to the tree on the front side, as seen from the graph image 404, since no on-ground object is arranged between the ball 306 and the tree on the front side, only the undulation of the ground object appears on the polygonal line 4040 between the current position of the ball 306 and the designated position.

Although illustration is omitted, since the direction of the virtual camera can be changed according to an operation of the player when the distance height measurement screen 400 is being displayed on the display 12 as described above, the pointer image 402 may designate the obstacle object ahead the line object 406. That is, it is also possible to measure a distance exceeding the horizontal arrival distance of the club 304 to be used. Therefore, such a distance can be used as reference when determining whether change the number of the club 304 to be used is to be changed.

Figure 46:
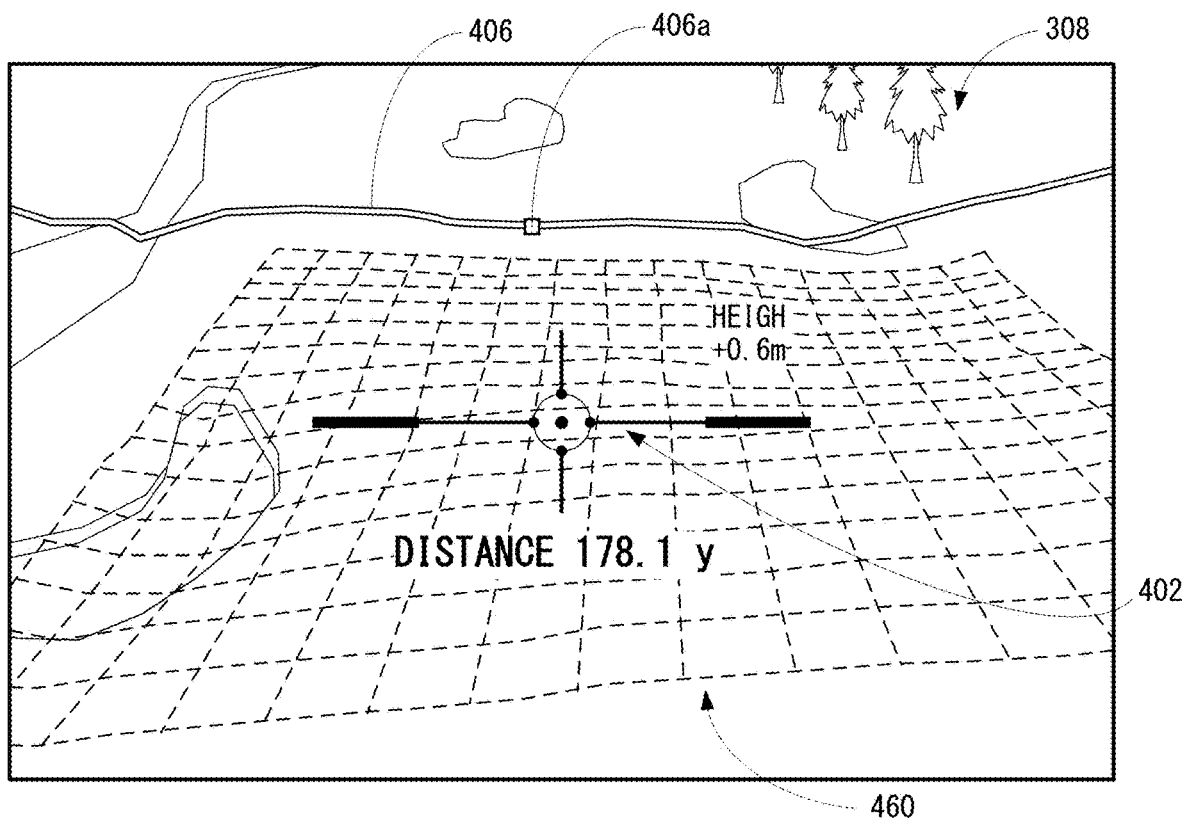
FIG. 46 is a view showing a non-limiting example undulation display screen.

FIG. 46 shows a non-limiting example undulation display screen 450. The undulation display screen 450 is displayed on the display 12 if a predetermined button (here, the ZR-button 61) is further operated at the time that the distance height measurement screen 400 is being displayed. The undulation display screen 450 shown in FIG. 46 is displayed on the display 12 when the predetermined button is operated in a state where the distance height measurement screen 400 shown in FIG. 43 is being displayed.

As shown in FIG. 46, in the undulation display screen 450, the pointer image 402, the line object 406 and the mark image 406*a* are displayed in addition to the background image 308, and a grid image 460 is further displayed. Moreover, the graph image 404 is erased (or undisplayed) in the undulation display screen 450. This is in order to display visibly the undulation of a predetermined range centering on the designated position designated by the pointer image 402 in a visible manner. As an example, the predetermined range is a range determined with a square having a length and width each 40 yards in a case where the pointer image 402 is set on the center and this center is viewed from directly above the virtual space. However, this is an example, and the predetermined range may be variably set according to the designated position by the pointer image 402.

Moreover, in the undulation display screen 450, in order to make it easy to see the undulation of the obstacle object (the ground object in FIG. 46), a position of the virtual camera is set higher than a case of displaying the distance height measurement screen 400 so as to be viewed from a slightly bird's-eye view. In addition, the center position of the pointer image 402 remains at the position overlapping with the position of the gazing point of the virtual camera.

As also seen from FIG. 46, the grid image 460 is an image of guide lines (i.e., grid lines) displayed on the obstacle object such as a ground object, and the undulation of the ground object is represented by change of a shape of the grid lines.

The player can determine a position that the ball 306 is to be landed, for example, because it is possible to know the terrain near the designated position by the pointer image 402 by seeing the undulation display screen 450.

Moreover, if a predetermined button (in this second embodiment, the ZL-button 39) is depressed when the undulation display screen 450 is being displayed, the screen is returned to the distance height measurement screen 400. Furthermore, if the predetermined button (i.e., the ZL-button 39) is depressed when the distance height measurement screen 400 is being displayed, the screen is returned to the parameter determination screen 300. However, if another predetermined button (in this second embodiment, the B button 54) is depressed when the undulation display screen 450 is being displayed, the screen may be returned to the parameter determination screen 300 without returning to the distance height measurement screen 400.

Also in the second embodiment, there is an advantage that it is possible to know the distance, the height or the undulation of the terrain up to the designated position that the player designates by the pointer image, in addition to the advantages of the first embodiment.

Third Embodiment

The third embodiment is the same or similar to the first embodiment and the second embodiment except for that the game image displayed on the display 12 after the ball 306 starts moving can intelligibly shows whether the ball 306 is being in flight or on the ground (i.e., carry and run), and therefore, duplicate description will be omitted.

In the following, although the game image displayed after the ball 306 starts moving before stopping movement will be described, since the parameter setting etc. are the same as those in the first embodiment, description thereon is omitted. Moreover, for the same or similar reason, the game image when the ball 306 is moved will be described assuming that no operation for changing the trajectory of the ball 306 is performed.

Figure 47:
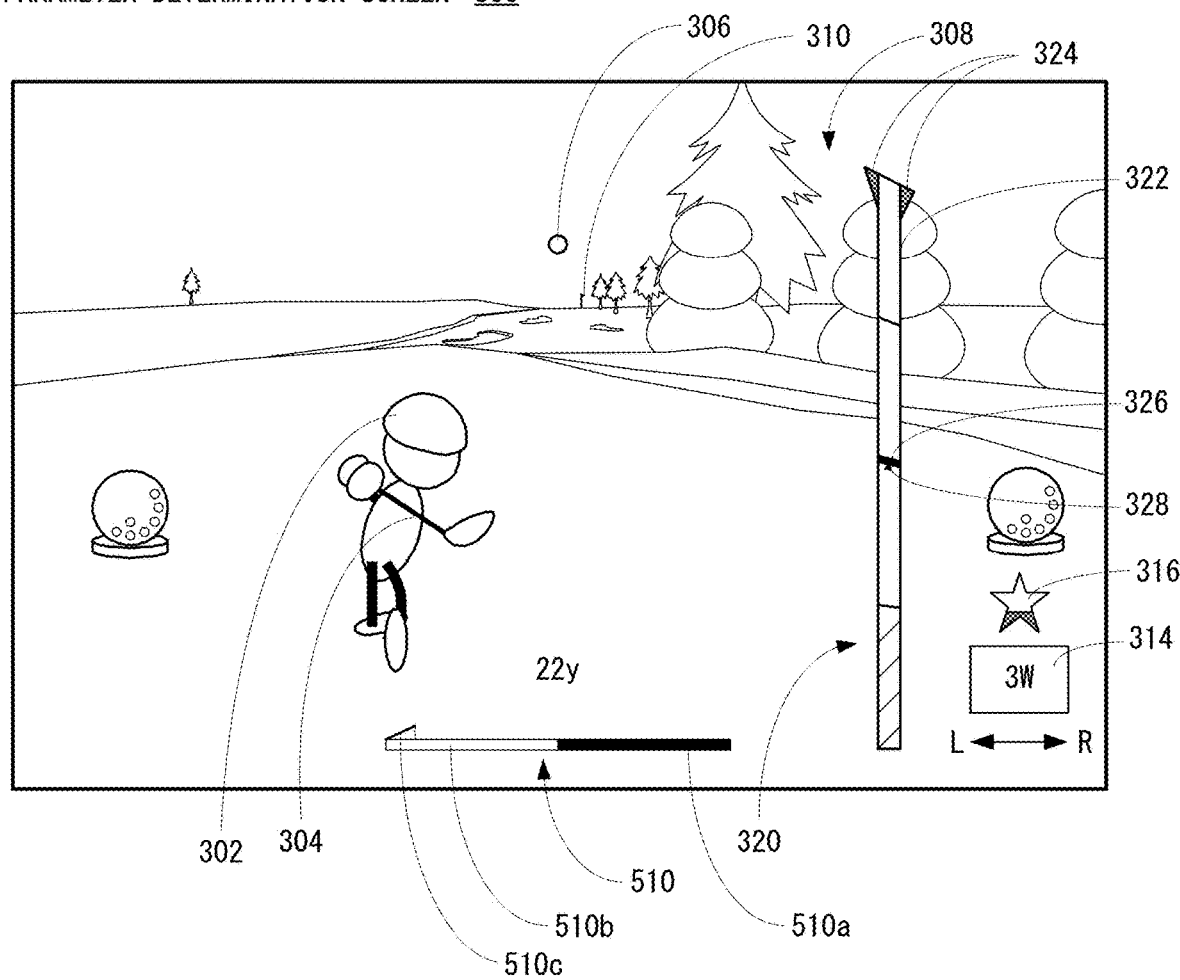
FIG. 47 is a view showing a non-limiting example parameter determination screen of a third embodiment.

FIG. 47 shows an example of the parameter determination screen 300 immediately after the ball 306 starts moving by hitting the ball 306 by the player character 302 after an operation for determining the parameter etc. is performed in the parameter determination screen 300 shown in FIG. 41.

As shown in FIG. 47, in the third embodiment, when the ball 306 starts moving, at the same time or almost at the same time, an image for showing whether the ball 306 is being in flight or rolling on the ground and a movement distance (hereinafter, referred to as "movement indication image") 510 is displayed.

The movement indication image 510 is displayed in the lower center of the game image (here, the parameter determination screen 300). As an example, this movement indication image 510 includes a black horizontal bar 510*a*, a white horizontal bar 510*b* overlapping with a front of the horizontal bar 510*a* and a line 510*c* displayed above the horizontal bar 510*a* and the horizontal bar 510*b*. Moreover, the horizontal distance of the ball 306 up to the current frame is displayed above the movement indication image 510.

The horizontal bar 510*a* shows a maximum flight distance of the ball 306, and is fixed to a predetermined length, and the predetermined length corresponds to the maximum flight distance of the club 304 that is being used by the player character 302. The horizontal bar 510*b* shows a calculative flight distance of the ball 306 that is hit, and is set as the length corresponding to the flight distance of the ball 306 according to the determined hitting power.

However, in the movement indication image 510, a left end is corresponding to the current position of the ball 306. Therefore, in the horizontal bar 510*a* and the horizontal bar 510*b*, the left end is the distance 0 (zero), and the distance becomes longer toward the right. In the parameter determination screen 300 shown in FIG. 47, it is possible to understand that the length of the horizontal bar 510*b* respect to the horizontal bar 510*a* shows that the hitting power is determined to approximately 50%.

Moreover, the line 510*c* shows the trajectory of the ball 306 in two dimensions according to the elapse of time in a case where a manner of movement of the ball 306 in the virtual space is viewed from the sideway. Therefore, when the ball 306 is moved in the air, the line 510*c* of a shape of parabola is drawn. When the ball 306 is moved in the air, the position of the ball 306 before movement, the horizontal distance at the current position of the ball 306 and the height from the ground to the current position of the ball 306 are acquired, and the line 510c is drawn with a parabola (trajectory) according to these acquired elements. The line 510c is drawn so that the height at the start of movement and the height at the landing point become equal to each other, but may be drawn reflecting the difference in height. Moreover, a drawing method of the parabola is not limited to this. For example, the parabola may be drawn by appropriately deforming a parabolic image prepared in advance according to the hitting power and the current position of the ball 306 so as to be gradually drawn from the left with the elapse of time.

Moreover, since the height of the ball 306 from the ground is 0 (zero) yard when the ball 306 rolls on the ground, the line 510c is drawn by a straight horizontal line. As described later, when the ball 306 rolls on the ground, the line 510c is represented by a dotted straight line (see FIG. 49). This is for showing intelligibly whether the ball 306 is moving in the air or rolling on the ground. However, this is an example, and the line 510c may be represented with a solid parabola and a solid straight line while applying colors different from each other. Moreover, a single color may be applied to the line 510c. In the parameter determination screen 300 shown in FIG. 47, it can be seen that the ball 306 is moved twenty-two (22) yards in the horizontal direction and the height is gradually higher according to the launch direction in the vertical direction. Even when the ball 306 bounces after landing, the line 510c may be represented by a straight line assuming that the ball 306 is rolling on the ground.

When the ball 306 is moved to some extent, that is, when a predetermined period of time (for example, 0.5 seconds) elapses from the time that the ball 306 starts moving, a game image showing a manner that the ball 306 is moved (hereinafter, referred to as "ball movement screen") 500 is displayed on the display 12. As described in the first embodiment, after the ball 306 starts moving, the virtual camera is behind the ball 306 and is moved so as to take a bird's-eye view from diagonally above. However, although detailed description is omitted, the virtual camera is moved so as to follow the fictitious ball in a case of assuming that the ball 306 is moved in the reference trajectory. Moreover, the field angle of the virtual camera is appropriately adjusted so that the ball 306 fits in the game image (that is, the screen).

Figure 48:
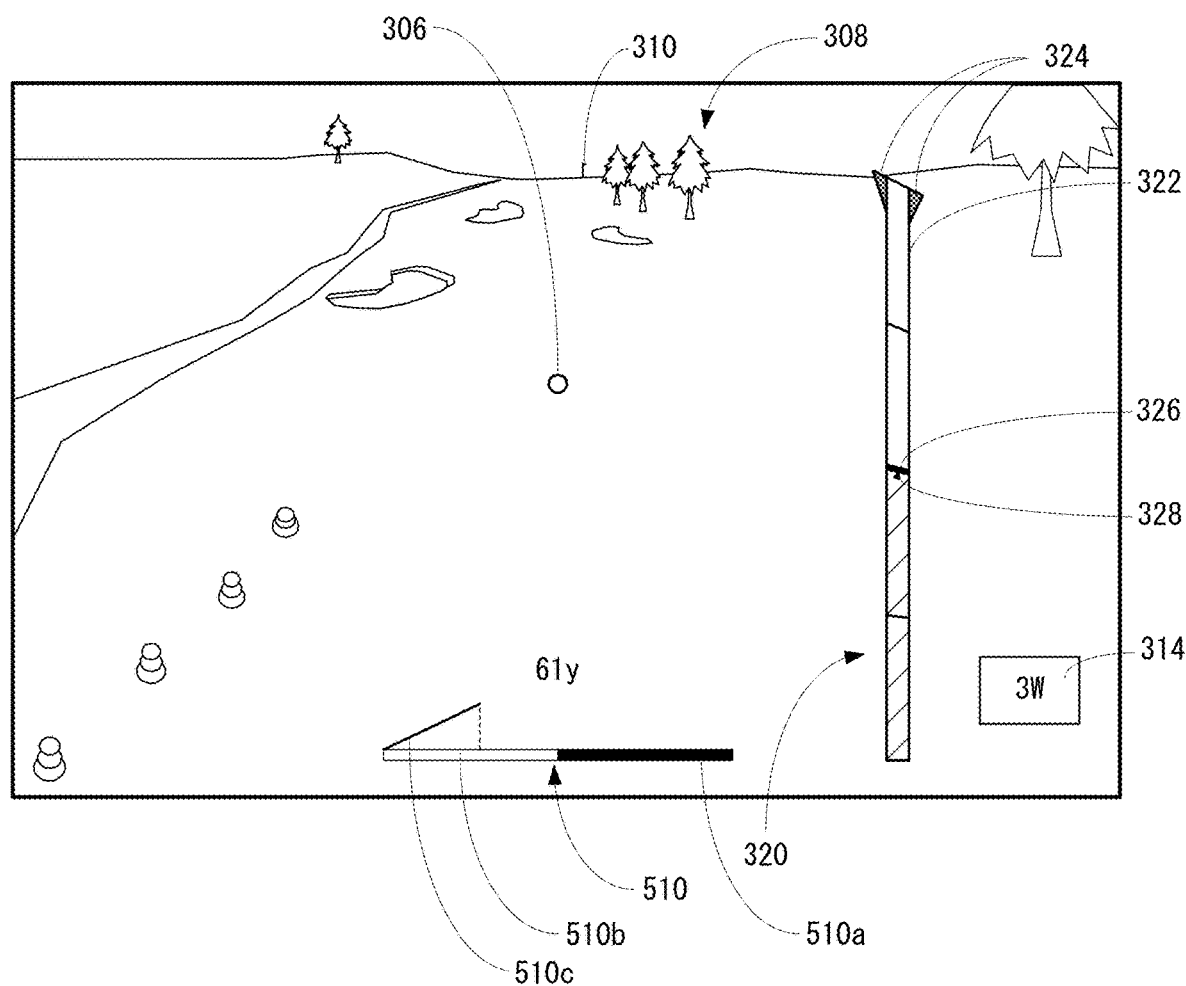
FIG. 48 is a view showing a non-limiting example movement screen.
Figure 49:
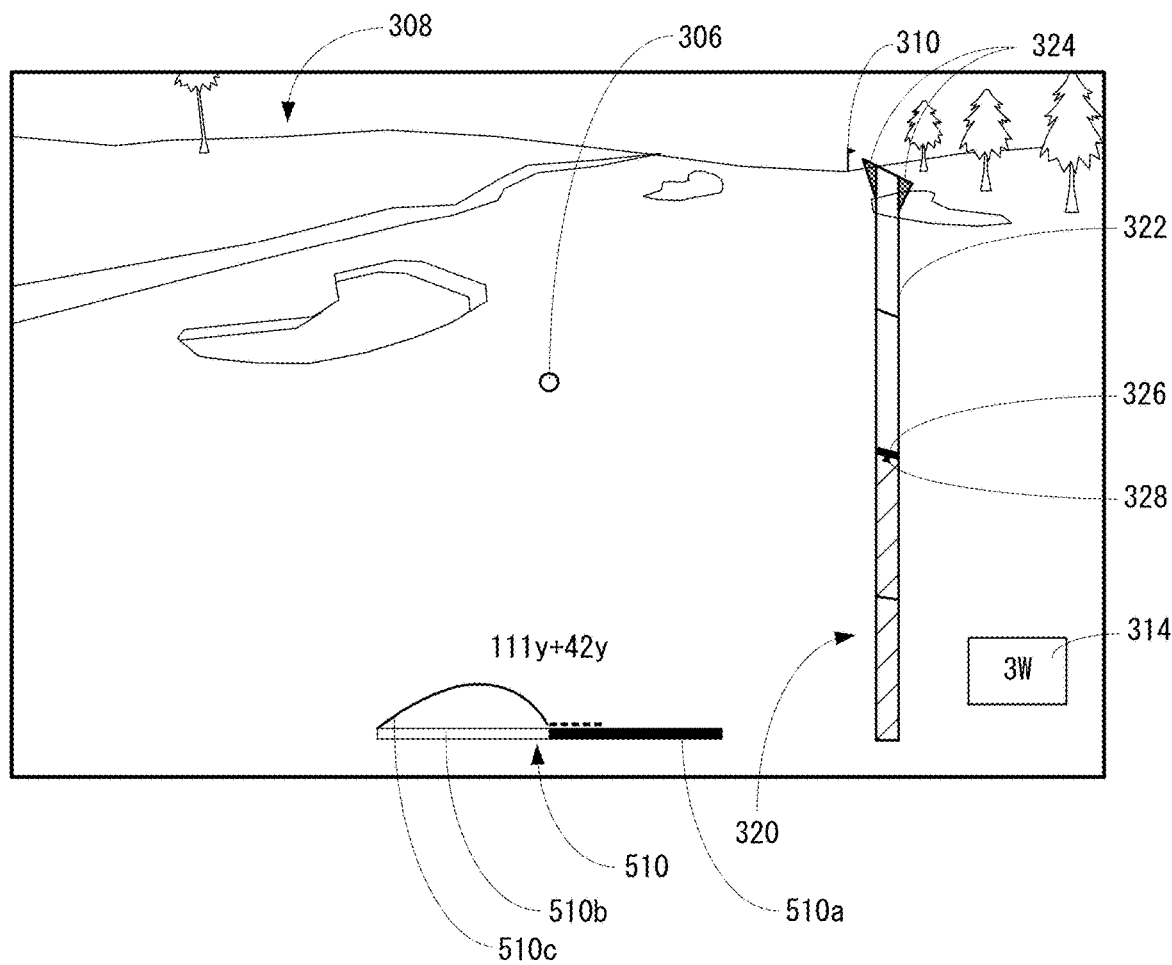
FIG. 49 is a view showing another non-limiting example movement screen.

FIG. 48 shows an example of the ball movement screen 500 when the ball 306 is in flight. FIG. 49 shows an example of the ball movement screen 500 when the ball 306 is rolling on the ground after landing.

In the ball movement screen 500 shown in FIG. 48, it can be seen that the ball 306 is moved further than the parameter determination screen 300 shown in FIG. 47, the horizontal distance is sixty-one (61) yards, and the height becomes higher according to the launch direction in the vertical direction. In the ball movement screen 500 shown in FIG. 49, the ball 306 is moved further than the ball movement screen 500 shown in FIG. 48, and gradually lowers its height after reaching the highest point, lands on the ground, and rolls on the ground. In the ball movement screen 500 shown in FIG. 49, the horizontal distance is 111+42 (=153) yards. As shown also in FIG. 49, the movement distance is displayed with divided into a distance moving in the air and a distance moved by rolling on the ground.

In addition, although illustration is omitted, after landing on the ground, the ball 306 may be moved in an opposite direction due to a backspin or a slope of the ground. At this time, a straight line portion (dotted line portion) of the line 510c may be drawn so as to be extended to the left, or so that the straight line portion once extended to the right may be shortened. Moreover, when the ball 306 returns from the landing point to the front side, a movement distance by the straight line portion may be indicated with a numeral of minus (−). For example, in the ball movement screen 500 shown in FIG. 49, the horizontal distance may be displayed as "111y−42y".

Moreover, although illustration is omitted, when the ball 306 moving in the air collides with the on-ground object or the aerial object, and falls on the ground, the line 510c of the parabolic line is transformed into a solid vertical line extending downward from a point that the ball 306 collides with the on-ground object or the aerial object, and then, when the ball 306 rolls on the ground, a dotted horizontal line is drawn following the solid vertical line. Instead of transforming into the vertical line extending downward, the line 510c of the parabolic line may be drawn as if the ball 306 lands when colliding with the on-ground object or the aerial object by being compressed or reduced while maintaining a parabolic shape.

Moreover, although illustration is omitted, since the movement distance is extended in a case of a tailwind or/and a case where the height of the landing point is low (so-called downhill), the parabola is drawn up to a position beyond the horizontal bar 510b. In contrast, since the movement distance is shortened in a case of a headwind or/and a case where the height of the landing point is high (so-called uphill), the parabola is drawn so that the horizontal arrival distance becomes shorter than the length of the horizontal bar 510b.

Furthermore, although illustration is omitted, when the horizontal distance from the current position of the ball 306 to the pin 310 is shorter than the maximum flight distance of the club 304 in use, an image indicative of the pin 310 may be displayed above the horizontal bar 510a at a position corresponding to the horizontal distance. However, also when the horizontal distance from the current position of the ball 306 to the pin 310 is longer than the maximum flight distance of the club 304 in use, an image indicative of the pin 310 may be displayed at a position corresponding to the horizontal distance. However, the image indicative of the pin 310 is displayed only when the player character 302 hits the ball 306 toward the pin 310 to some extent, and when hitting the ball 306 in a direction in reverse to the pin 310, for example, the image indicative of the pin 310 may not be displayed.

Furthermore, although illustration is omitted, when the hitting power is determined, in the movement gauge 320, a belt-shaped image indicating that the ball 306 rolls may be drawn so as to be extended upward from a position that the first index image 326 is stopped. The belt-shaped image is applied with a predetermined color, and a breadth is set to be the same or almost the same as the breadth of the movement gauge 320. However, since the belt-shaped image is intended to inform the player that the ball 306 rolls, a length of a belt is fixed at a predetermined length. Moreover, as described above, in a case where the line 510c is drawn by a solid parabola and solid straight line having colors different from each other in the movement indication image 510, by setting the predetermined color attached to the belt-shaped image to be the same as the color of the line 510c drawn by the solid straight line, it is possible to impress to the player that the color indicates that the ball 306 rolls.

In addition, since the belt-shaped image is extended upward from a position that the first index image 326 is stopped, the belt-shaped image may be displayed beyond an upper end of the movement gauge 320 when the hitting power is a maximum value or a value near the maximum value.

Also in the third embodiment, in addition to the advantages of the first embodiment, there is an advantage that when the ball is moved, it is possible to understand at a glance whether the ball is moving in the air or rolling on the ground.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium storing a game program executable by a computer provided with one or more processors, wherein the game program, when executed, causes the one or more processors to execute at least:
    determining a movement start direction of a ball object based on progress of a golf game or a user operation;
    advancing a power index from one end to another end of a gauge inside or along the gauge, the gauge being displayed on a display portion so as to be extended from the one end to the another end with a width;
    stopping an advance of the power index according to a user operation;
    determining, at random, a position of a deviation index that is displayed on the display portion corresponding to a width direction of the gauge at a stop position of the power index having been stopped;
    executing movement processing that moves the ball object so that a movement distance of the ball object becomes longer as the stop position of the power index is nearer a side of the another end of the gauge, wherein the gauge includes a risk area that length in the width direction or a rate in the width direction is increased as being closer to the another end; and
    changing, when the position of the deviation index being determined is within the risk area, the movement start direction of the ball object or a movement direction after the movement start in comparison with a case of being outside the risk area.

2. The storage medium according to claim 1, wherein the game program when executed further causes the one or more processors to execute at least:
    displaying the gauge so that a line of the another end is slanted with respect to a line of the one end;
    displaying the power index so as to be slanted in the same direction as the line of the another end toward the another end; and
    changing the movement distance of the ball object according to a determined position of the deviation index within the width of the gauge.

3. The storage medium according to claim 1, wherein the game program when executed further causes the one or more processors to execute at least: displaying the gauge so that a size of the risk area with respect to an entire size of the gauge differs dependent on a state of a point that the ball object exists.

4. The storage medium according to claim 1, wherein the game program when executed further causes the one or more processors to execute at least: displaying the gauge so that the risk area is formed outside a basic area having a predetermined width of the gauge.

5. The storage medium according to claim 4, wherein the game program when executed further causes the one or more processors to execute at least: displaying the gauge so that a color of the basic area is changed according to the advance of the power index while not changing a color of the risk area.

6. The storage medium according to claim 4, wherein the game program when executed further causes the one or more processors to execute at least: displaying, at a position corresponding to a distance from the ball object in the basic area of the gauge, a target image corresponding to at least one of display targets including a green object, a pin object, a bunker object, a hazard object and a rough object existing in a movable range of the ball object.

7. The storage medium according to claim 1, wherein the game program when executed further causes the one or more processors to execute at least: displaying on the display portion a manner that the position of the deviation index is determined at random from a time that the advance of the power index is stopped to a time that the movement processing is started.

8. The storage medium according to claim 1, wherein the game program when executed further causes the one or more processors to execute at least: displaying the gauge so as to be curved according to a determined movement start direction and a slant with respect to the movement start direction at a point that the ball object exists.

9. The storage medium according to claim 1, wherein the game program when executed further causes the one or more processors to execute at least:
    displaying a trajectory prediction image that predictably indicates a predicted trajectory when moving the ball object in a determining movement start direction on the display portion,
    the trajectory prediction image being a belt-like image that is extended lineally in the movement start direction or extended along the prediction trajectory, wherein
    a curve condition of the ball object is expressed by a shape or slant of the belt-like image or a constituent of the belt-like image.

10. The storage medium according to claim 9, wherein the game program when executed further causes the one or more processors to execute at least:
    displaying the belt-like image with a plurality of quadrilaterals as the constituent; and
    changing shapes of the plurality of quadrilaterals to indicate the curve condition.

11. The storage medium according to claim 10, wherein the game program when executed further causes the one or more processors to execute at least: displaying the plurality of quadrilaterals so as to be moved in the determined movement start direction, respectively.

12. The storage medium according to claim 1, wherein the game program when executed further causes the one or more processors to execute at least: displaying the gauge by a three-dimensional representation with depth.

13. The storage medium according to claim 12, wherein the game program when executed further causes the one or more processors to execute at least: displaying, on the display portion along the gauge, height information of an obstacle object that becomes an obstacle for movement in a front direction when moving the ball object in a case of determining the movement start direction.

14. The storage medium according to claim 12, wherein the game program when executed further causes the one or more processors to execute at least:
- displaying the gauge with two-dimensional representation; and
- switching according to a user operation between the two-dimensional representation and the three-dimensional representation with depth.

15. A non-transitory computer-readable storage medium storing a game program executable by a computer provided with one or more processors, wherein the game program, when executed, causes the one or more processors to execute at least:
- determining a movement start direction of a ball object based on progress of a golf game or a user operation;
- advancing a power index being displayed at an initial position that is an arbitrary position in a predetermined direction up to a predetermined movable length;
- stopping an advance of the power index according to a user operation; determining, at random, a position of a deviation index that is displayed on the display portion corresponding to a width direction of a gauge determined based on a stop position that is a position of the power index having been stopped and the initial position, at the stop position;
- executing movement processing that moves the ball object so that a movement distance of the ball object becomes longer as the stop position of the power index is closer to the movable length, wherein the gauge includes a risk area that length in the width direction or a rate in the width direction is increased as being closer to the movable length; and
- changing, when a determined position of the deviation index is within the risk area, the movement start direction of the ball object or a movement direction after the movement start compared with a case of being outside the risk area.

16. A game apparatus executing a virtual golf game, the game apparatus comprising one or more processors configured to execute operations comprising:
- determining a movement start direction of a ball object based on progress of a golf game or a user operation;
- advancing a power index from one end to another end of a gauge inside or along the gauge, the gauge being displayed on a display portion so as to be extended from the one end to the another end with a width;
- stopping an advance of the power index according to a user operation; determining, at random, a position of a deviation index that is displayed on the display portion corresponding to a width direction of the gauge at a stop position of the power index having been stopped;
- executing movement processing that moves the ball object so that a movement distance of the ball object becomes longer as the stop position of the power index is nearer a side of the another end of the gauge, wherein the gauge includes a risk area that length in the width direction or a rate in the width direction is increased as being closer to the another end; and
- changing, when the position of the deviation index being determined is within the risk area, the movement start direction of the ball object or a movement direction after the movement start in comparison with a case of being outside the risk area.

17. A game control method of a game apparatus executing a virtual golf game, comprising:
- (a) determining a movement start direction of a ball object based on progress of a golf game or a user operation;
- (b) advancing a power index from one end to another end of a gauge inside or along the gauge, the gauge being displayed on a display portion so as to be extended from the one end to the another end with a width;
- (c) stopping an advance of the power index according to a user operation; (d) determining, at random, a position of a deviation index that is displayed on the display portion corresponding to a width direction of the gauge at a stop position of the power index having been stopped in (c); and
- (e) executing movement processing that moves the ball object so that a movement distance of the ball object becomes longer as the stop position of the power index is nearer a side of the another end of the gauge,
- wherein the gauge includes a risk area that length in the width direction or a rate in the width direction is increased as being closer to the another end, and
- wherein (e) changes, when a determined position of the deviation index is within the risk area, the movement start direction of the ball object or a movement direction after the movement start in comparison with a case of being outside the risk area.

* * * * *